US008382587B2

(12) United States Patent
Ogino et al.

(10) Patent No.: US 8,382,587 B2
(45) Date of Patent: Feb. 26, 2013

(54) GAMING MACHINE WHICH RUNS COMMON GAME AT PLURALITY OF GAMING TERMINALS AND A PLAYING METHOD THEREOF

(75) Inventors: Shinji Ogino, Tokyo (JP); Kazumasa Yoshizawa, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 153 days.

(21) Appl. No.: 12/780,359

(22) Filed: May 14, 2010

(65) Prior Publication Data

US 2010/0304846 A1 Dec. 2, 2010

(30) Foreign Application Priority Data

May 29, 2009 (JP) ................................ 2009-131048

(51) Int. Cl.
*A63F 9/24* (2006.01)
*A63F 13/00* (2006.01)

(52) U.S. Cl. ................ 463/29; 463/16; 463/20; 463/25; 463/42

(58) Field of Classification Search .............. 463/16–20, 463/25–29, 40–42
See application file for complete search history.

(56) References Cited

U.S. PATENT DOCUMENTS

| | | | | |
|---|---|---|---|---|
| 5,564,700 | A | 10/1996 | Celona | |
| 6,077,162 | A | 6/2000 | Weiss | |
| 6,312,332 | B1 | 11/2001 | Walker et al. | |
| 6,375,568 | B1 | 4/2002 | Roffman et al. | |
| 2004/0198487 | A1* | 10/2004 | Schneider | 463/20 |
| 2006/0040734 | A1* | 2/2006 | Baerlocher et al. | 463/26 |
| 2007/0054732 | A1* | 3/2007 | Baerlocher | 463/26 |
| 2007/0054733 | A1* | 3/2007 | Baerlocher | 463/27 |
| 2007/0077990 | A1* | 4/2007 | Cuddy et al. | 463/25 |
| 2007/0105620 | A1* | 5/2007 | Cuddy et al. | 463/26 |
| 2007/0155485 | A1* | 7/2007 | Cuddy et al. | 463/25 |
| 2009/0111561 | A1* | 4/2009 | Dewaal et al. | 463/20 |

* cited by examiner

*Primary Examiner* — Milap Shah
(74) *Attorney, Agent, or Firm* — Edwards Wildman Palmer LLP

(57) ABSTRACT

A gaming machine allows a common game to be run at a plurality of gaming terminals with a common game bet amount, when it is determined that a common game start condition is met, based on a cumulative amount of pieces of bet amount information each transmitted from a gaming terminal for each unit game.

7 Claims, 43 Drawing Sheets

FIG. 10

REGULAR GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | J |
| 1 | 3278-6555 | Q | A | J | J | A |
| 2 | 6556-9833 | BAT | Q | BAT | BAT | BAT |
| 3 | 9834-13111 | J | HAMMER | SWORD | Q | J |
| 4 | 13112-16389 | Q | SWORD | RHINOCEROS | K | A |
| 5 | 16390-19667 | RHINOCEROS | WILD | BAT | BAT | BUFFALO |
| 6 | 19668-22945 | A | BUFFALO | FEATURE | A | RHINOCEROS |
| 7 | 22946-26223 | DEER | DEER | A | K | FEATURE |
| 8 | 26224-29501 | SWORD | K | J | HAMMER | K |
| 9 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANDOM NUMBER RANGE: 0-65535

FIG. 11

BONUS GAME SYMBOL TABLE

| | | FIRST COLUMN(L1) |
|---|---|---|
| CODE NO. | RANDOM NUMBER | SYMBOL |
| 0 | 0-2184 | J |
| 1 | 2185-4369 | Q |
| 2 | 4370-6553 | BAT |
| 3 | 6554-8737 | WILD |
| 4 | 8738-10921 | J |
| 5 | 10922-13105 | Q |
| 6 | 13106-15289 | RHINOCEROS |
| 7 | 15290-17473 | WILD |
| 8 | 17474-19657 | A |
| 9 | 18658-21841 | DEER |
| 10 | 21842-24025 | WILD |
| 11 | 24026-26209 | SWORD |
| 12 | 26210-28393 | HAMMER |
| 13 | 28394-30577 | A |
| 14 | 30578-32761 | WILD |
| 15 | 32762-34945 | Q |
| 16 | 34946-37129 | SWORD |
| 17 | 37130-39313 | WILD |
| 18 | 39314-41497 | RHINOCEROS |
| 19 | 41498-43681 | K |
| 20 | 43682-45865 | A |
| 21 | 45866-48049 | WILD |
| 22 | 48050-50233 | HAMMER |
| 23 | 50234-52417 | J |
| 24 | 52418-54601 | WILD |
| 25 | 54602-56785 | Q |
| 26 | 56786-58969 | WILD |
| 27 | 58970-61153 | WILD |
| 28 | 61154-63337 | BUFFALO |
| 29 | 63338-65535 | WILD |

• • •

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANDOM NUMBER RANGE: 0-65535

FIG. 12

SYMBOL COLUMN DETERMINATION TABLE

| SYMBOL COLUMN NO. | RANDOM NUMBER |
|---|---|
| 1 | 0-13106 |
| 2 | 13107-26214 |
| 3 | 26215-39321 |
| 4 | 39322-52428 |
| 5 | 52429-65535 |

RANDOM NUMBER RANGE:0-65535

FIG. 13

CODE NO.
DETERMINATION TABLE

| | |
|---|---|
| RANDOM NUMBER | CODE NO. |
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANDOM NUMBER RANGE: 0-65535

FIG. 14

WILD SYMBOL INCREASE COUNT DETERMINATION TABLE

| THE NUMBER OF WILD SYMBOLS TO BE ADDED | RANDOM NUMBER |
|---|---|
| 10 | 0-13106 |
| 30 | 13107-26214 |
| 50 | 26215-39321 |
| 70 | 39322-52428 |
| 90 | 52429-65535 |

RANDOM NUMBER RANGE: 0-65535

FIG. 15

TRIGGER SYMBOL INCREASE COUNT DETERMINATION TABLE

| THE NUMBER OF TRIGGER SYMBOLS TO BE ADDED | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANDOM NUMBER RANGE: 0-65535

FIG. 16

PAYOUT TABLE

| SYMBOL | THE NUMBER OF SYMBOLS REARRANGED | | | |
|---|---|---|---|---|
| | TWO | THREE | FOUR | FIVE |
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 10 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE (FREE GAME): FREE GAME IS RUN WHEN THREE OR MORE OF THE SAME TYPE OF SYMBOLS ARE REARRANGED

FIG. 17

GAMING TERMINAL MANAGEMENT TABLE

| GAMING TERMINAL | TYPE OF GAME | GAME STATUS | CUMULATIVE GAME REPETITION COUNT |
|---|---|---|---|
| 001 | REGULAR GAME | RUN | 35 |
| 002 | REGULAR GAME | STOP | 60 |
| 003 | REGULAR GAME | RUN | 21 |
| 004 | BONUS GAME | RUN | 18 |
| 005 | BONUS GAME | STOP | 51 |

FIG. 18

COMMON GAME MANAGEMENT TABLE

| GAMING TERMINAL | 001 | 002 | 003 | 004 | 005 |
|---|---|---|---|---|---|
| BET AMOUNT Sn PLACED ON SLOT GAME | 10.4 | 2.5 | 3.0 | 12.4 | 10.0 |
| PAYOUT MULTIPLYING FACTOR An | 2 | 2 | 2 | 2 | 2 |
| SHOOTER | 0 | 1 | 0 | 0 | 0 |
| CUMULATIVE BET AMOUNT Bn $\Sigma$(Sn−Cn−Dn) | 69.39 | 92.61 | 46.26 | 46.26 | 23.13 |
| INDIVIDUAL SPECIAL BET AMOUNT Cn Bn×3% | 2.31 | 3.09 | 1.54 | 1.54 | 0.77 |
| BASE BET AMOUNT Dn Bn×7% | 5.40 | 7.20 | 3.60 | 3.60 | 1.80 |
| COMMON GAME BET AMOUNT Tn INITIAL AMOUNT Dn | 5.40 | 7.20 | 3.60 | 3.60 | 1.80 |
| PRIMARY TOTAL AMOUNT F $\Sigma$Dn | 21.60 | | | | |
| TOTAL SPECIAL BET AMOUNT G $\Sigma$Cn | 9.26 | | | | |
| MODE H | P | P | E | E | E |
| TOTAL AMOUNT IN EASY MODE I G×(i/5) | 5.56 | | | | |
| TOTAL AMOUNT IN PROFESSIONAL MODE J G×(5−i)/5 | 3.70 | | | | |
| PAYOUT RATIO Kn(CONTRIBUTION LEVEL En) Dn/Dmax (IN SAME MODE) | 75% | 100 % | 50% | 50% | 25% |
| CORRECTED SPECIAL BET AMOUNT Ln I or J×Kn (IN SAME MODE) | 2.78 | 3.70 | 2.78 | 2.78 | 1.39 |
| TOTAL BET AMOUNT Mn Ln+Dn | 8.18 | 10.90 | 6.38 | 6.38 | 3.19 |
| NEXT-GAME CARRY-OVER AMOUNT Nn | 0.92 | 0 | 2.78 | 2.78 | 4.17 |

FIG. 19

EVENT OCCURRENCE AMOUNT
DETERMINATION TABLE

| EVENT OCCURRENCE AMOUNT | RANDOM NUMBER |
|---|---|
| 80 | 0-13106 |
| 90 | 13107-26214 |
| 100 | 26215-39321 |
| 110 | 39322-52428 |
| 120 | 52429-65535 |

RANDOM NUMBER RANGE: 0-65535

GAMING MACHINE WHICH RUNS COMMON GAME AT PLURALITY OF GAMING TERMINALS AND A PLAYING METHOD THEREOF

CROSS REFERENCE TO RELATED APPLICATION

The present application claims priority from Japanese Patent Application No. 2009-131048, which was filed on May 29, 2009, the disclosure of which is herein incorporated by reference in its entirety.

BACKGROUND OF THE INVENTION

1. Field of the Invention

The present invention relates to a gaming machine which runs a common game such as crap game at a plurality of gaming terminals, and a gaming method thereof.

2. Description of Related Art

As disclosed in U.S. Pat. Nos. 5,564,700, 6,077,162, 6,375, 568, 6,312,332, and the like, a known gaming machine includes a plurality of gaming terminals, terminal controllers each provided to a gaming terminal and causes the gaming terminal to run a game, and a center controller which controls the terminal controllers.

The gaming machine has functions of: allowing a jackpot to be run as a common game at the gaming terminals in addition to a base game which is runnable individually at each gaming terminal; and distributing a jackpot payout to a plurality of players. For example, the gaming machine is configured to determine a winning percentage and/or a payout to be awarded in the common game at each gaming terminal. Accordingly, a known gaming machine has an entertainment characteristic which allows players to play a common game in accordance with a total bet amount placed on a base game, in addition to such an entertainment characteristic that the players each play the base game individually. Thus, how to run a common game at each gaming terminal has traditionally been an important element in improving the entertainment characteristic.

The object of the present invention is to provide a gaming machine having a function of running a common game capable of realizing a high entertainment characteristic, and a playing method of the gaming machine.

SUMMARY OF THE INVENTION

The present invention provides a gaming machine having the following structure. Specifically, the gaming machine includes a plurality of gaming terminals and a center controller. The gaming terminals each have an input device through which an external input can be inputted, and a terminal controller programmed to carry out steps (a1) to (a4) below. The center controller, which includes a memory and which is connected in communication with the gaming terminals, is programmed to carry out steps (b1) to (b3) below.

Specifically, the terminal controller carries out the steps of: (a1) receiving a bet based on an input through the input device; (a2) when the bet is received, running a unit game of a base game; (a3) outputting, to the center controller for each unit game, a piece of bet amount information based on a bet amount corresponding to the bet; and (a4) running a common game in response to a game start command from the center controller.

Meanwhile, the center controller carries out the steps of: (b1) receiving the piece of bet amount information, and cumulatively storing in the memory the piece of bet amount information as a cumulative value in association with the gaming terminal; (b2) determining whether a common game start condition is met, which common game start condition is a condition for starting the common game; and (b3) when the common game start condition is met, outputting a common game start command to a gaming terminal which is associated with a cumulative value equal to or greater than a predetermined threshold value.

According to the above structure, the center controller cumulatively stores, in the memory, pieces of bet amount information as a cumulative value in association with a gaming terminal, each of the pieces of bet amount information transmitted from the gaming terminal for each unit game. Then, when the common game start condition is met, a game start command is outputted to a gaming terminal which is associated with a cumulative value equal to or greater than the predetermined threshold value.

According to the above, the cumulative value is cumulation of pieces of bet amount information each based on a bet amount. Thus, the gaming machine allows participation of only one or more of the gaming terminals in the common game, at each of which one or more gaming terminals unit games are repeated to an extent that the associated cumulative value reaches or surpasses the predetermined threshold value. This allows the gaming machine to eliminate a gamin terminal from the common game, at which gaming terminal a ratio of the associated cumulative value to a sum of the cumulative values associated with all the gaming terminals is smaller compared with another gaming terminal. As a result, the gaming machine is able to cause a player to be conscious of the fact that he/she is allowed to participate in the common game when the associated cumulative value reaches or surpasses the predetermined threshold value. This enhances the player's motivation to continue playing the base game. Hence, the gaming machine has a function of the common game capable of realizing a high entertainment characteristic.

Further, the gaming machine prohibits a gaming terminal from participating in the common game when the cumulative value associated with the gaming terminal is smaller than the predetermined threshold value. This lessens a difference among the cumulative values associated with gaming terminals which participate in the common game. Thus, when the common game has such a feature which offers a player a more advantageous state in accordance with an amount of the cumulative value associated with the gaming terminal operated by the player, the gaming machine is able to deny participation of a gaming terminal associated with a cumulative value smaller than the threshold value in the common game, since a cumulative value smaller than the threshold value would put the player in a disadvantageous state in the common game.

The center controller of the present invention may, in step (b2), make it the common game start condition that any one of the cumulative value has reached the predetermined value.

According to the above structure, the common game start condition is met when any one of the cumulative values each associated with a gaming terminal has reached the predetermined value. As a result, the gaming machine is able to cause a player to be conscious of the fact that the common game approaches each time a base game is run. This causes the player to constantly hold his/her interest towards the common game.

The center controller of the present invention may, in step (b4) further carry out a step of randomly determining the predetermined value within a predetermined range which is equal to or greater than the predetermined threshold value.

According to the above structure, the common game start condition is met when any one of the cumulative values each associated with a gaming terminal has reached the predetermined value randomly determined within the predetermined range equal to or greater than the predetermined threshold value. This causes a player to pay attention to the cumulative value's reaching or surpassing the predetermined threshold value, and also causes a player to be conscious of the fact that the common game is approaching when the cumulative value reaches or surpasses the threshold value. Thus, a player constantly holds his/her interest towards the common game.

Further, the center controller of the present invention may, in step (b1), cumulatively store in the memory a value indicating the bet amount as the cumulative value.

According to the above structure, the cumulative value is cumulatively stored bet amounts. Thus, the cumulative value associated with each gaming terminal is a total bet amount placed at the gaming terminal. One or more gaming terminals allowed to participate in the common game are only those where a total amount of bet placed equals or surpasses the predetermined threshold value. As a result, a bet amount of predetermined threshold value or more is required to participate in the common game. This further enhances a superior feeling of a player who participates in the common game.

The present invention relates to a playing method or a control method of a gaming machine having a plurality of gaming terminals and a center controller. The gaming terminals each includes an input device through which an external input can be inputted. The center controller includes a memory and is connected in communication with the gaming terminals. In order to implement the playing method or the control method, each of the terminal controllers and the center controller carry out the steps below.

Specifically, the terminal controllers each carry out the steps of: a first step of receiving a bet based on an input through the input device; a second step of, when the bet is received, running a unit game of a base game; a third step of outputting, to the center controller for each unit game, a piece of bet amount information based on a bet amount corresponding to the bet; and a fourth step of running a common game in response to a game start command from the center controller.

Meanwhile, the center controller carries out the steps of: a fifth step of receiving the piece of bet amount information, and cumulatively storing in the memory the piece of bet amount information as a cumulative value in association with the gaming terminal; a sixth step of determining whether a common game start condition is met, which common game start condition is a condition for starting the common game; a seventh step of, when the common game start condition is met, outputting a common game start command to a gaming terminal which is associated with a cumulative value equal to or greater than a predetermined threshold value.

According to the above structure, the center controller cumulatively stores, in the memory, pieces of bet amount information as a cumulative value in association with a gaming terminal, each of the pieces of bet amount information transmitted from the gaming terminal for each unit game. Then, when the common game start condition is met, a game start command is outputted to a gaming terminal which is associated with a cumulative value equal to or greater than the predetermined threshold value.

According to the above, the cumulative value is cumulation of pieces of bet amount information each based on a bet amount. Thus, the gaming machine allows participation of only one or more of the gaming terminals in the common game, at each of which one or more gaming terminals unit games are repeated to an extent that the associated cumulative value reaches or surpasses the predetermined threshold value. This allows the gaming machine to eliminate a gaming terminal from the common game, at which gaming terminal a ratio of the associated cumulative value to a sum of the cumulative values associated with all the gaming terminals is smaller compared with another gaming terminal. As a result, the gaming machine is able to cause a player to be conscious of the fact that he/she is allowed to participate in the common game when the associated cumulative value reaches or surpasses the predetermined threshold value. This enhances the player's motivation to continue playing the base game. Hence, the gaming machine has a function of the common game capable of realizing a high entertainment characteristic.

Further, the gaming machine denies participation in the common game to a gaming terminal when the associated cumulative value is smaller than the predetermined threshold value. This lessens a difference among the cumulative values associated with gaming terminals which participate in the common game. Thus, when the common game has such a feature which offers a player a more advantageous state in accordance with an amount of the cumulative value associated with the gaming terminal operated by the player, the gaming machine is able to deny participation of a gaming terminal in the common game, the gaming terminal associated with a cumulative value smaller than the threshold value, since a cumulative value smaller than the threshold value would put the player in a disadvantageous state in the common game.

The present invention is able to include a function of the common game capable of realizing a high entertainment characteristic.

BRIEF DESCRIPTION OF THE DRAWINGS

FIG. 10 is an explanatory diagram of a regular game symbol table.

FIG. 11 is an explanatory diagram of a bonus game symbol table.

FIG. 12 is an explanatory diagram of a symbol column determination table.

FIG. 13 is an explanatory diagram of a code No. determination table.

FIG. 14 is an explanatory diagram of a wild symbol increase count determination table.

FIG. 15 is an explanatory diagram of a trigger symbol increase count determination table.

FIG. 16 is an explanatory diagram of a payout table.

FIG. 17 is an explanatory diagram of a gaming terminal management table.

FIG. 18 is an explanatory diagram of a common game management table.

FIG. 19 is an explanatory diagram of an event occurrence amount determination table.

DESCRIPTION OF THE PREFERRED EMBODIMENTS

Gaming Machine Overview

The gaming machine is structured as follows: The gaming machine connects the plurality of gaming terminals with the center controller so as to allow data communication therebetween. The gaming machine is configured to: cumulatively store, in the memory, pieces of bet amount information as a cumulative value in association with a gaming terminal, each of the pieces of bet amount information based on a bet amount placed on the base game; determine one or more gaming terminals where the common game is to be run, based on the associated cumulative value(s); and run the common game simultaneously at the gaming terminals which are determined to run the common game. Here, the "cumulative value" refers to a countable numerical value, such as the number of base games (game repetition count of base games) and apart of a bet amount.

Figure 1:
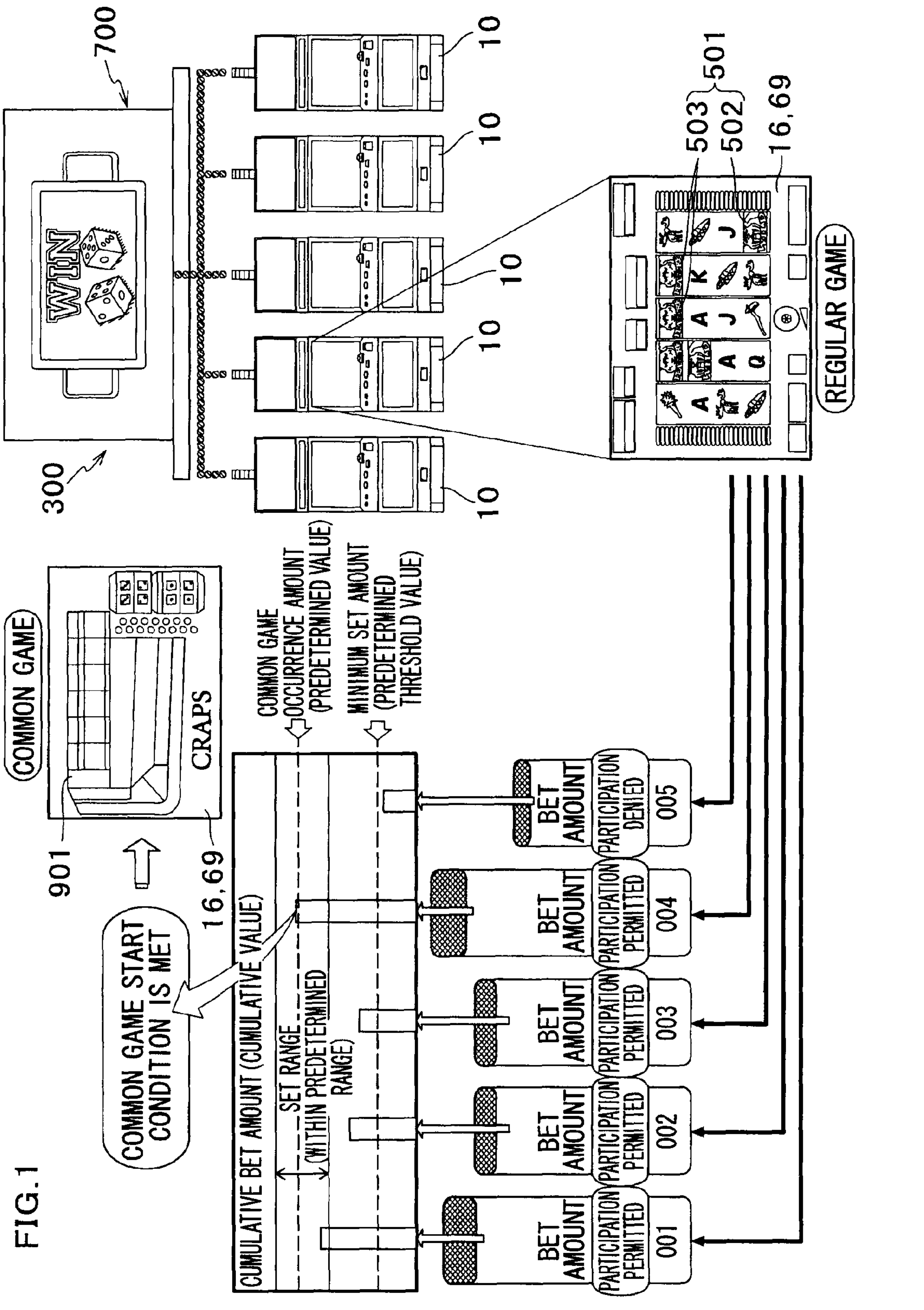
FIG. 1 is an explanatory diagram of a playing method of a gaming machine.
Figure 5:
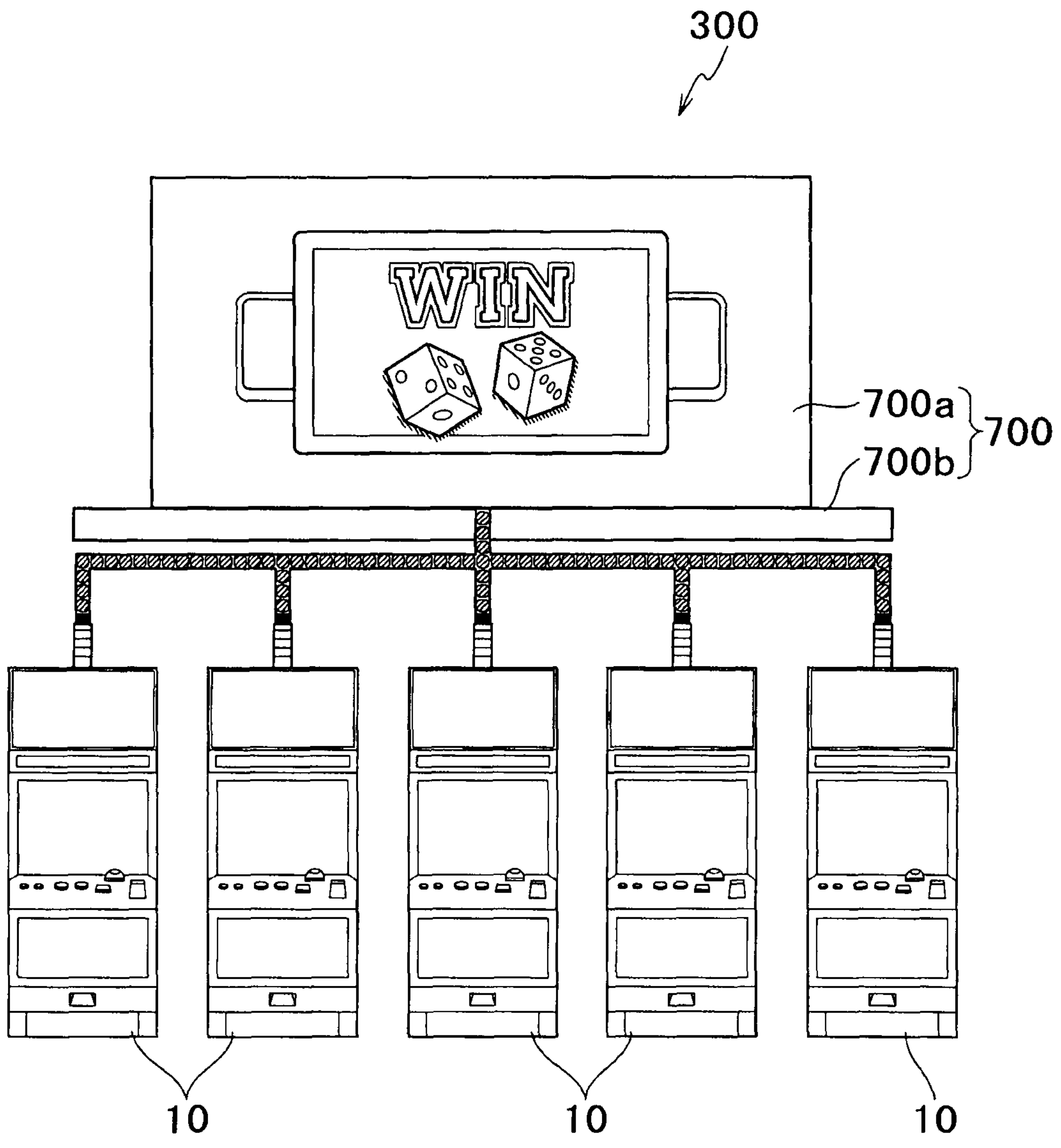
FIG. 5 is a front view of the gaming machine.
Figure 6:
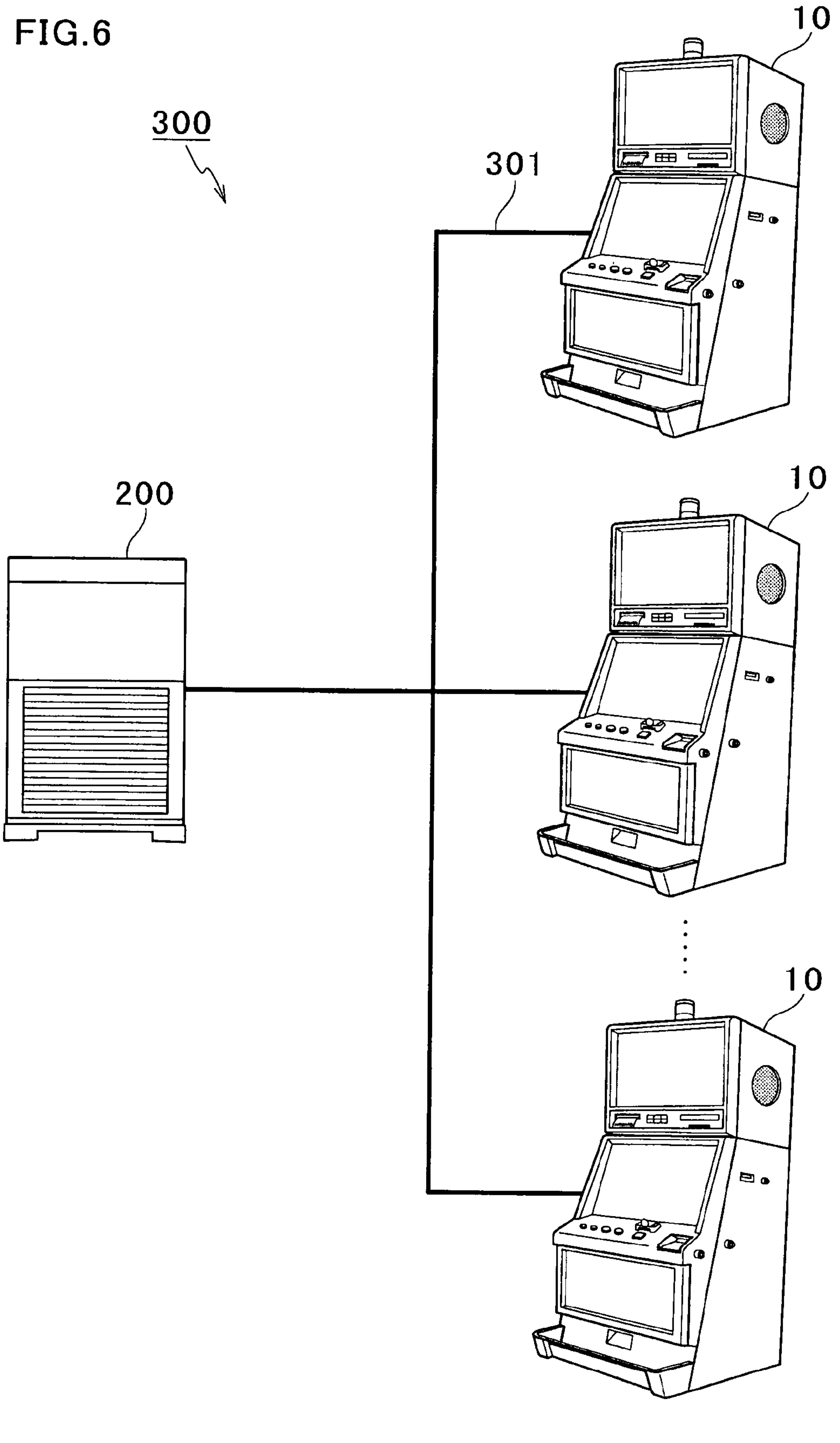
FIG. 6 is a perspective view illustrating the entire gaming machine.

Specifically, as illustrated in FIGS. 1, 5, and 6, a gaming machine 300 has a first structure where the gaming machine configured as a multi-player gaming machine connects a center controller 200 with a plurality of slot machines 10 each serving as a gaming terminal, so as to allow data communication therebetween. The gaming machine 300: (i) cumulatively stores, in the memory of the center controller 200, pieces of bet amount information as a cumulative value in association with a slot machine 10, each of the pieces of bet amount information based on a bet amount placed on the base game; (ii) determines one or more slot machines 10 where a crap game as the common game is to be run, based on the associated cumulative value(s); and (iii) run the crap game simultaneously at the slot machines 10 which are determined to run the crap game. Note that the connection between the slot machines 10 and the center controller 200 may be wireless, wired, or a combination of these. Further, a unit of the bet amount may be a national or regional currency such as dollar, yen, and Euro. The unit of the bet amount may also be a game point used exclusively at a hall where the gaming machine 300 is provided, or in the related industry.

In other words, the gaming machine 300 includes slot machines 10 and the center controller 200. The slot machines 10 each have an input device through which an external input can be inputted, and a terminal controller programmed to carry out steps (a1) to (a4) below. The center controller 200, which has a memory and which is connected in communication with the slot machines 10, is programmed to carry out steps (b1) to (b3) below.

Specifically, the terminal controller of each of the slot machines 10 carries out the steps of: (a1) receiving a bet based on an input through the input device; (a2) when the bet is received, running a unit game of a base game; (a3) outputting, to the center controller 200 for each unit game, a piece of bet amount information based on a bet amount corresponding to the bet; and (a4) running a crap game in response to a game start command from the center controller 200.

Note that the common game such as a crap game may be run in place of the base game, and the base game and the crap game may be run in parallel. Further, the bet amount information may be a bet amount itself, or data relevant to an increment amount when the base game is completed at each slot machine 10.

In the present embodiment, the terminal controller of each slot machine 10 further carries out the following process when running the crap game in step (a4): First, when the terminal controller determines that the slot machine 10 is designated to be a shooter based on a shooter command from the center controller 200, the terminal controller carries out a process of enabling a roll operation command output to the center controller 200. Here, the "shooter" refers to a player who rolls dice at the crap game, that is, a player who plays at a slot machine 10 which starts running the common game. Further, the "roll operation" refers to an action of rolling the dice at the crap game, that is, to start running the common game.

Next, the terminal controller carries out a process of receiving a bet input through the input device, based on a bet amount corresponding to a piece of common game bet amount data stored in a storage device and indicating an amount bettable on the common game. Then, the terminal controller carries out the process of awarding a payout in accordance with a game result of the crap game based on a bet amount placed on the common game, the game result outputted from the center controller 200.

Further, the center controller 200 carries out the steps of: (b1) receiving the piece of bet amount information transmitted for each unit game in step (a3), and storing the piece of bet amount information as a cumulative value in the memory in association with the slot machine 10; (b2) determining whether a common game start condition is met, which common game start condition is a condition for starting the common game; and (b3) when the common game start condition is met, outputting a game start command to a slot machine 10 associated with a cumulative value equal to or greater than a predetermined threshold value.

Note that the "predetermined threshold value" is also referred to as "minimum set amount" in the present embodiment. Further, the "crap game" as the common game is also referred to as "event." Furthermore, a slot machine 10 is also referred to as "being qualified to participate in the common game (event)" when the cumulative value associated with the slot machine 10 has surpassed the "minimum set amount" when the "common game (event) start condition" has been met.

Further, the center controller 200 carries out the following processes in relation to running the crap game in the present embodiment: First, the center controller 200 selects a specific slot machine 10 from among the plurality of slot machines 10, and outputs a shooter command signal to the specific slot machine 10. Next, the center controller 200 transmits before the crap game begins, to the specific slot machine 10 having outputted the shooter command signal, bet amount data of a special bet amount bettable on the crap game in order to additionally store to the common game bet amount data stored in the storage device. Then, the center controller 200 determines a game result of the crap game based on a roll operation command from the specific slot machine 10.

Note that the present embodiment deals with the gaming machine 300 having the center controller 200 aside from the slot machines 10; however, the present invention is not limited to this. In other words, the gaming machine 300 may be configured in such a manner that at least one slot machine 10 has a function of the center controller 200, and the slot machines 10 may be connected with each other so as to carry out data communication therebetween.

The "slot machines 10" each are a type of gaming terminal in the gaming machine 300. Note that the present embodiment is described using slot machines 10 as an example of gaming terminals; however, the present invention is not limited to this: The present invention may adopt a model which includes a terminal controller capable of independently running some base game.

The "base game" in the present invention is run by the slot machines 10. The base game is a slot game where a plurality of symbols 501 are rearranged. Note that the base game is not limited to slot game: The base game may be any type as long as it is independently runnable at gaming terminals such as slot machines 10.

Rearrangement of the symbols 501 in the slot game is performed on a symbol display device 16. The slot game includes processes of: running a regular game subject to a game value bet, in which regular game the symbols 501 are rearranged on the symbol display device 16, and a regular payout according to the symbols 501 rearranged is awarded; when the symbols 501 are rearranged on a predetermined condition, running a bonus game where the symbols 501 are rearranged under such a condition that a payout rate thereof is greater than that of the regular game, and a bonus payout is awarded according to the symbols 501 rearranged; and when a rescue start condition is met, running a rescue process.

Figure 20:
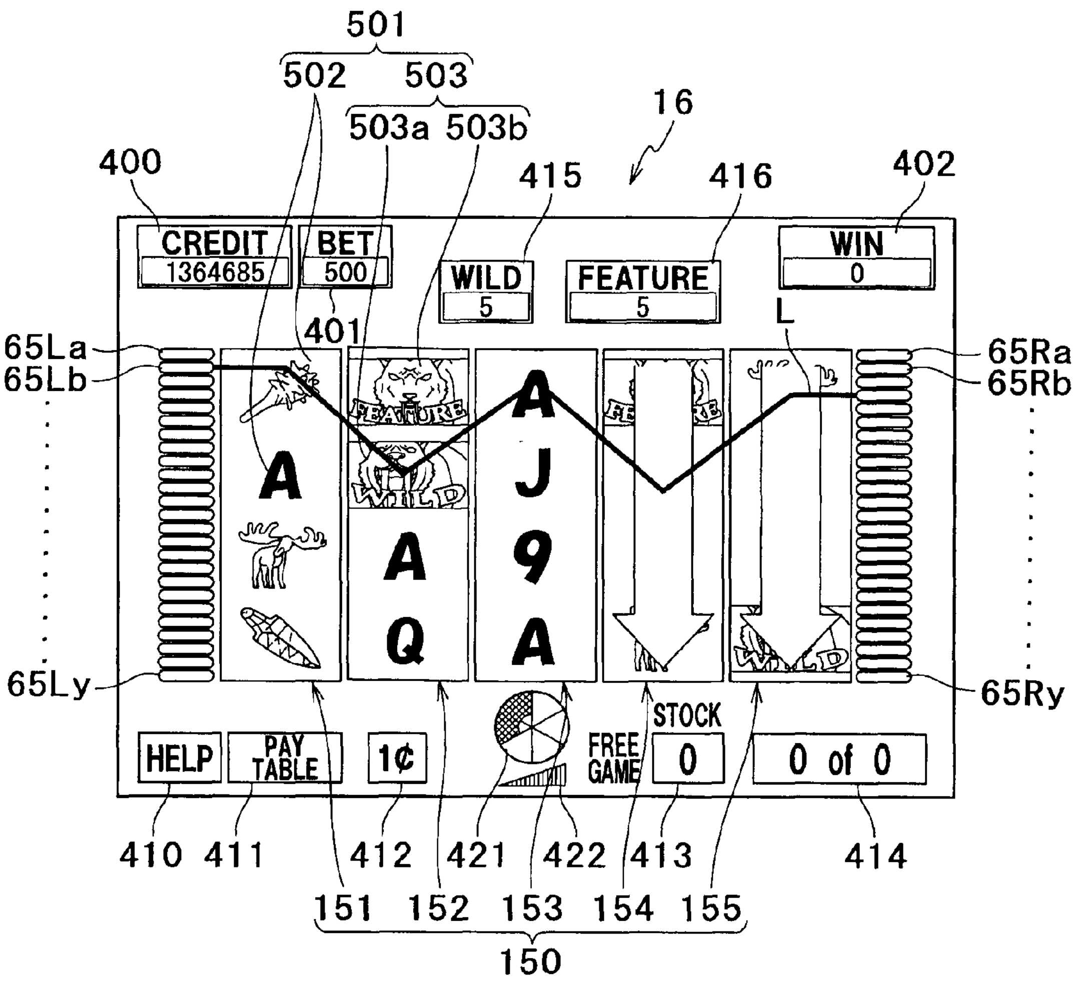
FIG. 20 is an explanatory diagram of a display status of the symbol display device.

The symbols 501 include "specific symbols 503" and "regular symbols 502." That is, the "symbols 501" is a superordinate concept of the specific symbols 503 and regular symbols 502. The Specific symbols 503 include wild symbols 503*a* and trigger symbols 503*b*, as illustrated in FIG. 20. Each of the wild symbols 503*a* is a symbol substitutable for any type of symbols 501. Each of the trigger symbols 503*b* is a symbol which triggers at least a bonus game. That is, a trigger symbol 503*b* triggers transition from the regular game to the bonus game, and triggers stepwise increases in the number of specific symbols 503 at an interval from the start of the bonus game. Further, the trigger symbol 503*b* triggers increases in the number of specific symbols 503 in the bonus game, that is, the trigger symbol 503*b* triggers increases in the number of trigger symbols 503*b* and/or wild symbols 503*a*. Note that the trigger symbol 503*b* may trigger an increase in the number of repetitions of game (hereinafter simply referred to as "game repetition count") in the bonus game.

The "game value" is a coin, bill, or electronic valuable information corresponding to these. Note that the game value in the present invention is not particularly limited. Examples of the game value include game media such as medals, tokens, electronic money, tickets, and the like. A ticket is not particularly limited, and a later-mentioned ticket with a barcode may be adopted, for example.

The "bonus game" has a same meaning as a "feature game." In the present embodiment, the bonus game is a game in which free games are repeated. However, the bonus game is not particularly limited and may be any type of game, provided that the bonus game is more advantageous than the regular game to a player. Another bonus game may be adopted in combination, provided that a player is given a more advantageous playing condition than those of the regular game. For example, the bonus game may be a game that provides a player with a chance of winning more game values than the regular game or a game that provides a player with a higher chance of winning game values than the regular game. Alternatively, the bonus game may be a game that consumes fewer amounts of game values than the regular game. In the bonus game, these games may be provided alone or in combination.

The "free game" is a game runnable with a bet of fewer game values than the regular game. Note that "bet of fewer amounts of game values" encompasses a bet of zero (0) game value. The "free game" therefore may be a game runnable without a bet of a game value, which free game awards an amount of game values based on symbols 501 rearranged. In other words, the "free game" may be a game which is started without consumption of a game value. To the contrary, the "regular game" is a game runnable on condition that a game value is bet, which regular game awards an amount of game media based on symbols 501 rearranged. In other words, the "regular game" is a game which is started with consumption of a game value.

The expression "rearrangement" means releasing an arrangement of symbols 501, and arranging symbols 501 once again. "Arrangement" in this specification means a state where the symbols 501 can be visually confirmed by a player.

The "regular payout according to rearranged symbols 501" means a regular payout corresponding to a winning combination achieved as a result of the rearrangement. In addition, the "bonus payout according to rearranged symbols 501" means a bonus payout corresponding to a winning combination achieved as a result of the rearrangement. When a "winning combination" is formed, a winning is achieved. The winning combination is detailed later.

The "condition that a payout percentage is higher than that of the regular game" is, for example, a free game, a state where the number of wild symbols 503*a* or trigger symbols 503*b* has increased, or a game using a replaced symbol table. The "rescue start condition" is, for example, the extremely large number of repetitions of regular games, that is, a state where the number of repetitions of regular games is a predetermined number or more. Alternatively, it is, for example, an extremely small total amount of payout obtained, that is, a case where a total amount of payouts (base payouts or bonus payouts), which has been obtained by one player as a result of repeating games a predetermined number of times or more, is equal to or less than a predetermined value. The "rescue process" is a process for rescuing a player. Examples of the rescue process include: running a free game, providing a state where the number of wild symbols 503*a* or trigger symbols 503*b* is increased, running a game using a replaced symbol table, or awarding an insurance payout.

The gaming machine 300 having the first structure as described above realizes a playing method including the steps of: cumulatively storing, in the memory of the center controller 200, a piece of bet amount information as a cumulative value in association with a slot machine 10, the piece of bet amount information based on a bet amount placed on the base game; determining one or more slot machines 10 where the crap game as the common game is to be run, based on the associated cumulative value(s); and running the crap game simultaneously at the slot machines 10 which are determined to run the crap game. In other words, the gaming machine 300 is functional at least by a control method including the steps of: cumulatively storing, in the memory of the center controller 200, a piece of bet amount information as a cumulative value in association with a slot machine 10, the piece of bet amount information based on a bet amount placed on the base game; determining one or more slot machines 10 where the crap game as the common game is to be run, based on the associated cumulative value(s); and running the crap game simultaneously at the slot machines 10 which are determined to run the crap game.

Specifically, the gaming method and the control method of the gaming machine 300 is carried out in the gaming machine 300 having the plurality of slot machines 10 and the center controller 200, each of which slot machines 10 includes an input device through which an external input can be inputted, and which center controller 200 includes a memory and is connected in communication with the slot machines 10.

The terminal controller of each slot machine 10 carries out the following steps: a first step of receiving a bet based on an input through the input device; a second step of, when the bet is received, running a unit game of the base game; a third step of outputting, to the center controller 200 for each unit game, a piece of bet amount information based on a bet amount corresponding to the bet; and a fourth step of running the common game based on a game start command from the center controller 200.

Meanwhile, the center controller carries out the following steps of: a fifth step of receiving the piece of bet amount information and storing the piece of bet amount information as a cumulative value in the memory in association with the slot machine 10; a sixth step of determining whether a common game start condition is met, which common game start condition is a condition for starting the common game; and a seventh step of, when the common game start condition is met, outputting a game start command to a slot machine 10 associated with a cumulative value equal to or greater than a predetermined threshold value.

According to the gaming method and/or the control method of the gaming machine 300 having the first structure, the center controller 200 determines whether the common game start condition is met. Then, when the common game start condition is met, a game start command is outputted to more than one slot machines 10 having been determined based on cumulative values relative to pieces of bet amount information each transmitted from a slot machine 10 for each unit game. Thus, a common game is run at more than one slot machines 10.

Accordingly, the gaming machine 300 allows participation of only one or more slot machines 10 in the crap game, at each of which one or more slot machines 10 unit games are repeated to an extent that the associated cumulative value reaches or surpasses the predetermined threshold value. Thus, a gaming machine 300 is capable of eliminating a slot machine 10 from the crap game, at which slot machine 10 a ratio of the associated cumulative value to a sum of the cumulative values associated with all the slot machines 10 is smaller compared to another slot machine 10. As a result, the gaming machine 300 is able to cause a player to be conscious of the fact that he/she is allowed to participate in the common game when the associated cumulative value reaches or surpasses the predetermined threshold value. This enhances the player's motivation to continue playing the base game. Hence, the gaming machine 300 has a function of the crap game capable of realizing a high entertainment characteristic.

Further, the gaming machine 300 denies participation of a slot machine 10 in the crap game when the cumulative value associated with the slot machine 10 is smaller than the predetermined threshold value. This lessens a difference among the cumulative values associated with slot machines 10 which participate in the common game. Thus, when the crap game has such a feature which offers a player a more advantageous state in accordance with an amount of the cumulative value associated with the slot machine 10 operated by the player, the gaming machine 300 is able to deny participation of a slot machine 10 in the crap game, the slot machine 10 associated with a cumulative value smaller than the threshold value, since a cumulative value smaller than the threshold value would put the player in a disadvantageous state in the common game.

In addition to the first structure, the gaming machine 300 may have a second structure where the center controller 200, in step (b3), makes it the common game start condition that any one of the cumulative value has reached the predetermined value.

According to the above structure, the common game start condition is met when any one of the cumulative values each associated with a slot machine 10 has reached the predetermined value. As a result, the gaming machine 300 is able to cause a player to be conscious of the fact that the crap game approaches each time a base game is run. This causes the player to constantly hold his/her interest towards the crap game.

Note that the "predetermined value" is also referred to as a "common game occurrence amount." The cumulative value is required to reach the predetermined value in order to meet the common game start condition.

In addition to the first or the second structure, the gaming machine 300 may have a third structure where the center controller further carries out step (b4) as follows. Specifically, in step (b4) of the third structure, the center controller 200 randomly determines the predetermined value within a predetermined range equal to or greater than the predetermined threshold value.

According to the above structure, the common game start condition is met when any one of the cumulative values each associated with a slot machine 10 has reached the predetermined value randomly determined within the predetermined range equal to or greater than the predetermined threshold value. This causes a player to pay attention to the cumulative value's reaching or surpassing the predetermined threshold value, and also causes a player to be conscious of the fact that the common game is approaching when the cumulative value reaches or surpasses the threshold value. Thus, a player constantly holds his/her interest towards the common game.

In the present embodiment, "within a predetermined range equal to or greater than the predetermined threshold value" means that "any one of upper limit and lower limit values indicating the predetermined range equals or surpasses the predetermined threshold value." Note that "within the predetermined range" is also referred to as "set range."

In addition to any one of the first to the third structures, the gaming machine 300 may have a fourth structure where the center controller 200, in step (b1), cumulatively stores in the memory a value indicating the bet amount as the cumulative value.

According to the above structure, the cumulative value is cumulatively stored bet amounts. Thus, the cumulative value associated with a slot machine 10 is a total bet amount having been placed at the slot machine 10. Therefore, only those slot machines 10 each of whose total bet amount is equal to or greater than the predetermined threshold value are allowed to participate in the crap game. As a result, a bet amount equal to or greater than the predetermined threshold value is required in order to participate in the crap game. This further enhances a superior feeling of a player who participates in the common game.

(Operations of the Gaming Machine 300: Slot Machine)

Figure 2:
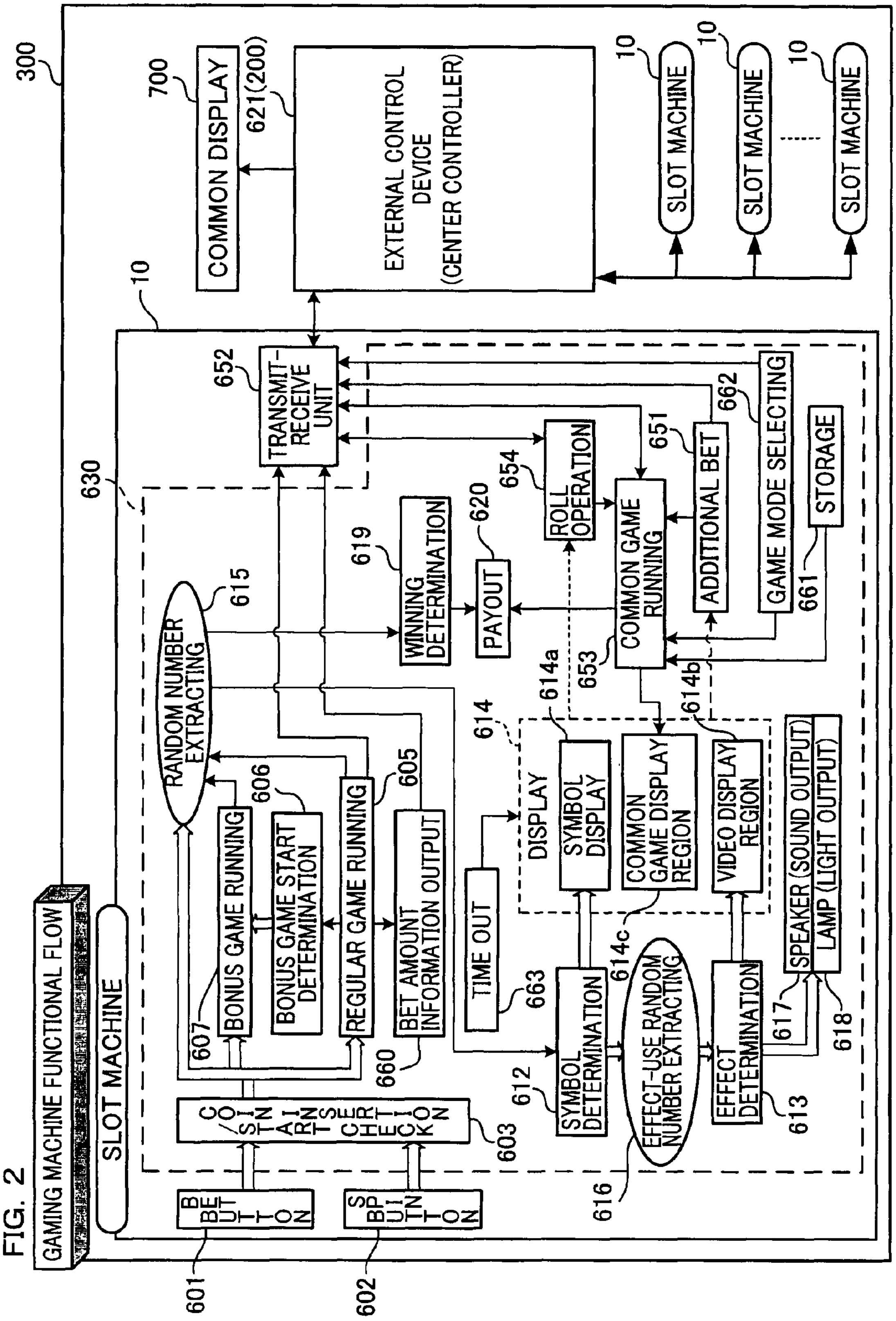
FIG. 2 is a block diagram of the gaming machine.
Figure 3:
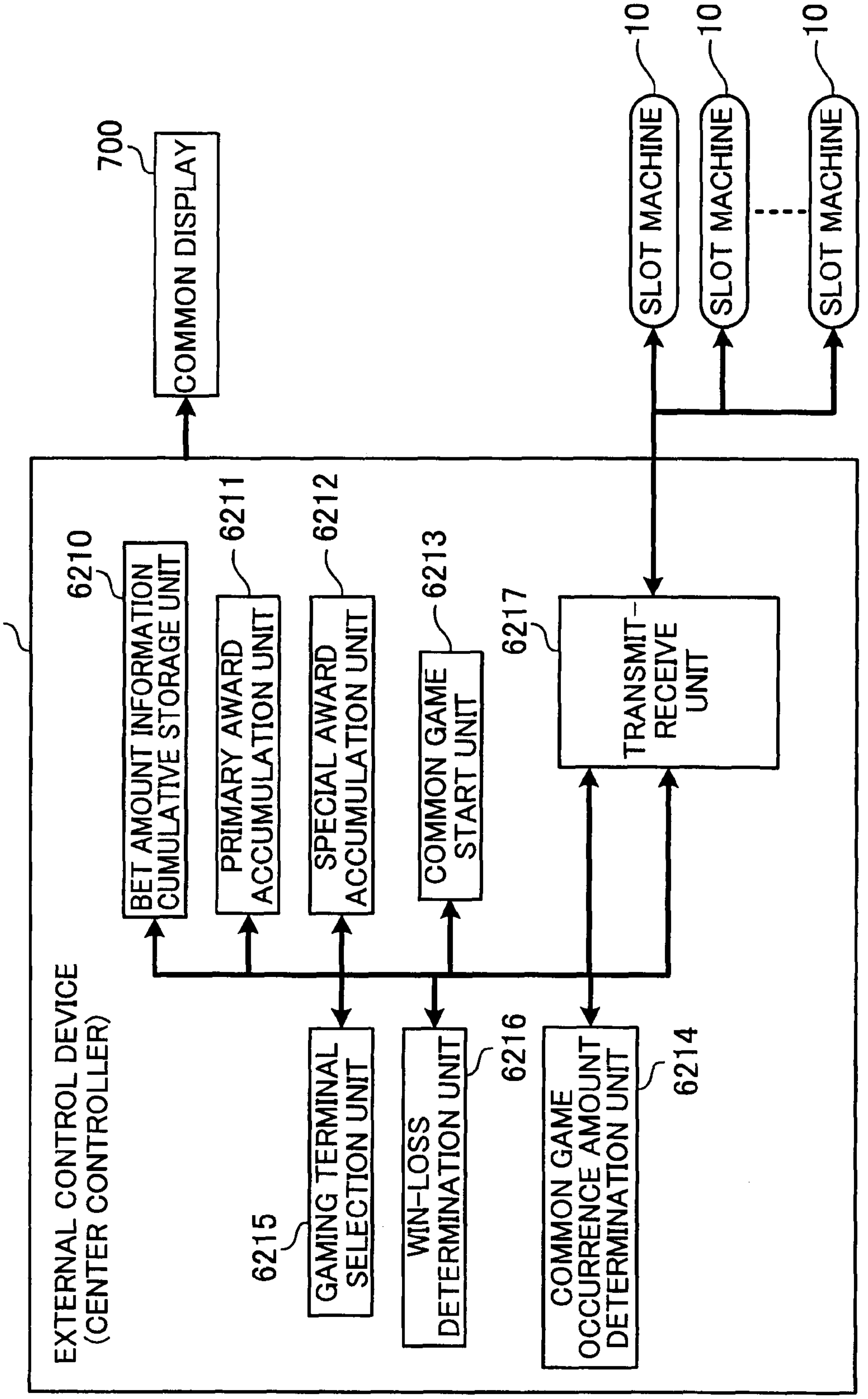
FIG. 3 is a block diagram of the gaming machine.

The gaming machine 300 having the above structure includes slot machines 10 and an external control device 621 (center controller 200) connected to the slot machines 10 so as to allow data communication therebetween, as illustrated in FIGS. 2 and 3. The external control device 621 is connected to the slot machines 10 installed in a hall, so as to allow data communication therebetween.

Each slot machine 10 includes a bet button unit 601, a spin button unit 602, a display unit 614, and a game controller 630 which controls these units. Note that the bet button unit 601 and the spin button unit 602 each are a kind of an input device. Further, the slot machine 10 includes a transmit-receive unit 652 which enables data communication with the external control device 621.

The bet button unit 601 has a function of accepting a player's operation for entering a bet amount. The spin button unit 602 has a function of receiving a start of a game such as base game through a player's operation; i.e., start operation. The display unit 614 has a function of displaying still image information such as various types of symbols 501 and numeral values, and moving-image information such as an effect movie. Further, the display unit 614 includes a touch panel as an input device, and has a function of receiving various commands inputted by player's press operations. The display unit 614 has a symbol display region 614*a*, a video display region 614*b*, and a common game display region 614*c*. The symbol display region 614*a* displays symbols 501, as illustrated in FIG. 1. The video display region 614*b* displays various types of effect movie information to be displayed during a game, in the form of a moving image or a still image. The common game display region 614*c* displays therein a common game such as crap game. Note that the common game display region 614*c* may be formed with the symbol display region 614*a* and a video display region 614*b*. The game display region 614*c* may appear only when the common game is run, in replacement of the symbol display region 614*a* or the image display area 614*b*.

The game controller 630 includes a coin insertion/start-check unit 603, a regular game running unit 605, a bet amount information output unit 660, a bonus game start determination unit 606, a bonus game running unit 607, a random number extracting unit 615, a symbol determination unit 612, an effect-use random number extracting unit 616, an effect determination unit 613, a speaker unit 617, a lamp unit 618, a winning determination unit 619, and a payout unit 620.

The regular game running unit 605 has functions of: receiving a bet input through the bet button unit 601 relative to a bet amount corresponding to bet amount data relative to an amount bettable on the base game; and running a regular game of the base game on condition that the bet button unit 601 has been operated. In other words, the regular game running unit 605 receives a bet based on an input through the bet button unit 601 (input device), and runs the regular game of the base game when the bet is received.

The bet amount information output unit 660 has functions of: determining a piece of bet amount information based on a bet amount corresponding to a bet received by the regular game running unit 605, and outputs the piece of bet amount information to the external control device 621 for a unit game via a later-described transmit-receive unit 652.

The bonus game start determination unit 606 determines whether to run a bonus game, based on a combination of rearranged symbols 501 resulted from the regular game. In other words, the bonus game start determination unit 606 has functions of (i) determining that the player is entitled to a bonus game when one or more trigger symbols 503*b* rearranged satisfy a predetermined condition, and (ii) activating the bonus game running unit 607 so as to run a bonus game from the subsequent unit game.

Here, a unit game includes a series of operations performed within a period between a start of receiving a bet to a point where a winning may be resulted. For example, a unit game of the regular game contains one each of the following: a bet time where a bet is accepted; a game time where symbols 501 having been stopped are rearranged; and a payout time where a payout process is performed to award a payout. Note that a unit game in a base game is referred to as unit base game.

The bonus game running unit 607 has a function of running a bonus game which repeats free games for the number of times equal to a game repetition count more than one, merely in response to an operation on the spin button unit 602.

The symbol determining unit 612 has functions of: determining symbols 501 to be rearranged with a random number given from the random number extracting unit 615; rearranging the determined symbols 501 in the symbol display region 614*a* of the display unit 614, outputting information on rearrangement of the rearranged symbols 501 to the winning determination unit 619; based on symbol-increase information from a specific symbol increase unit, adding the increased specific symbols 503 as part of symbols 501 used for symbol determination; replacing part of or all of the symbols 501 used for symbol determination with part of or all of the specific symbols 503; outputting an effect designation signal to the effect-use random number extracting unit 616, based on the rearrangement of the symbols 501.

The effect-use random number extracting unit 616 has functions of: when receiving the effect instruction signal from the symbol determining unit 612, extracting an effect-use random number; and outputting the effect-use random number to the effect determining unit. The effect determining unit has functions of: determining an effect by using the effect-use random number; outputting video information on the determined effect on the video display region 614*b* of the display unit 614; outputting audio and illumination information on the determined effect to the speaker unit 617 and the lamp unit 618, respectively.

The winning determination unit 619 has functions of: determining whether a winning is achieved when information on symbols 501 rearranged and displayed on the display unit 614 is given; a function of calculating an amount of payout based on a winning combination formed when it is determined that a winning has been achieved; outputting to the payout unit 620 a payout signal which is based on the amount of payout. The payout unit 620 has a function of awarding the player a game value in the form of a coin, a medal, a credit, or the like.

Further, the game controller 630 includes: a game mode selecting unit 662, a time-out unit 663, and a storage unit 661 which stores therein various kinds of bet amount data. The storage unit 661 is a device which re-writably stores therein data in a hard-disk device or a memory, or the like. The game mode selection unit 662 has a function of enabling a specific game mode selection from among a plurality of game modes in the common game. The time-out unit 663 has a function of displaying the uninput period with the time-out period on the display unit 614, the uninput period indicating a period of time where no start operation input is performed on the spin button unit 602.

Here, the "game mode" may be set in accordance with a difficulty level or the complexity of the common game itself, or the complexity of a betting method of the common game. Examples of the complexity of the betting method of are later-described easy mode and professional mode.

Further, the game controller 630 includes a common game running unit 653, a roll operation unit 654, and an additional bet unit 651. The roll operation unit 654 and the additional bet unit 651 each have a function associated with a process of the common game running unit 653. Specifically, the roll control panel 654 has a function of receiving a roll operation inputted through the touch panel of the display unit 614. The additional bet unit 651 has a function of allowing a bet increase through the display unit 614, at a start of the common game or when no win or loss is resulted from the common game.

The common game running unit 653 has functions of: running the common game in response to a game start command which is stored in the storage unit 661 and transmitted from the external control device 621; when it is determined that the slot machine 10 is designated to be the shooter based on a shooter command from the external control device 621, enabling a roll operation output to the external control device 621; and receiving a bet input through the bet button unit 601 relative to a bet amount corresponding to common game bet amount data relative to an amount bettable on the common game.

Further, the common game running unit 653 has functions of: determining, based on a piece of game result information from the external control device, a win or loss which causes the common game to end, and (i) when a win is resulted, awarding a winning payout, and (ii) when the slot machine 10 is designated to be a shooter, awarding a special payout; running an easy mode where a bet amount is automatically bet on the common game, the bet amount corresponding to the winning payout of the common game; running a professional mode where an additional bet is accepted in addition to an automatic bet; and causing the game mode selecting unit 662 to select between the easy mode or the professional mode and to run the selected game mode.

Further, the common game running unit 653 has a function of awarding a payout in accordance with a game result, based on the bet amount placed on the common game. Specifically, the common game running unit 653 has functions of: determining a win or loss which causes the common game to end, based on a piece of game result information from the common game running unit 653; when no win or loss is resulted from the common game, running a common game again; and when a win is resulted from the common game, awarding a payout according to a bet amount placed on the common game. Further, the common game running unit 653 has functions of: when no win or loss is resulted in the common game, allowing a bet increase; and displaying a movie related to the roll operation during a period of time after outputting a roll operation command to the external control device 621 before receiving game result information from the external control device 621.

(Functional Block of Gaming Machine 300: External Control Device)

The slot machines 10 structured as described above are connected to the external control device 621. The external control device 621 has a function of remotely controlling and remotely monitoring an operating condition of each slot machine 10 or a process of changing set values of various games, for example. Further, she external control device 621 determines, when the common game start condition is met, a slot machine 10 qualified for the common game, based on the cumulative value which is cumulatively stored relative to pieces of bet amount information in association with the slot machine 10. The external control device 621 then outputs a game start command to the slot machine 10 determined.

Specifically, as illustrated in FIG. 3, the external control device 621 includes: a bet amount information cumulative storage unit 6210, a base bet amount accumulation unit 6211, a special bet accumulation unit 6212, a common game start unit 6213, a common game occurrence amount determination unit 6214, a gaming terminal selection unit 6215, a win-loss determination unit 6216, and a transmit-receive unit 6217.

The bet amount information cumulative storage unit 6210 has a function of a memory to cumulatively store pieces of bet amount information as a cumulative value in association with a slot machine 10, the pieces of bet amount information transmitted from the slot machine 10 for each unit game. Note that the bet amount information cumulative storage unit 6210 cumulatively stores values as a cumulative value, which values each indicating a bet amount.

The base bet amount accumulation unit 6211 has a function of accumulating a part of a bet amount placed on the base game to obtain a base bet amount bettable on the common game, based on a piece of bet amount information transmitted from each slot machine 10 for each unit base game. Further, the base bet amount accumulation unit 6211 has a function of outputting, to each slot machine 10, a base bet amount as a piece of payout information of a winning payout, that is, transmitting bet amount data for the base bet amount to form common game bet amount data, before the common game begins.

The special bet amount accumulation unit 6212 has a feature where the special bet amount of all the slot machines 10 is an accumulation of a total amount of a part of the bet amount placed on the base game, based on the piece of bet amount information transmitted from each slot machine 10 for each unit base game. Further, the special bet amount accumulation unit 6212 has a function of outputting to the specific slot machine 10 the special bet amount as a piece of payout information on the special payout. That is, the special bet amount accumulation unit 6212 has a function of transmitting to the specific slot machine 10 before the common game begins, the bet amount data of the special bet amount bettable on the common game to additionally store to the common game bet amount data, the specific slot machine 10 having outputted a shooter command signal. Further, the special bet amount accumulation unit 6212 has a function of setting the special bet amount in accordance with a size of the base bet amount.

Here, the "size of the base bet amount" may be measured on any scale as long as it indicates the size of the base bet amount. Examples of the scale include a ratio of the base bet amount to a predetermined value set in advance, or a ratio of the base bet amount to a total amount of the base bet amounts placed at all the slot machines 10.

Further, the special bet amount accumulation unit 6212 has a function of adding the difference between the special bet amount and the special payout to the special bet amount. Thus, the special bet amount accumulation unit 6212 adds the difference between the special bet amount and the special payout to the special bet amount, to reimburse the player for the increment in the special bet amount caused by the difference. This further enhances the player's expectations for the common game.

The common game start determination unit 6213 has functions of: determining whether the common game start condition is met, based on the cumulative value relative to the bet amount information transmitted from each slot machine 10 for each unit base game; outputting a game start command to the slot machines 10; and displaying on the common display device 700 a screen illustrating a state until the common game start condition is met.

Specifically, the common game start determination unit 6213 determines whether the common game start condition is met, based on whether any one of the cumulative values each associated with a slot machine 10 has reached the predetermined value, the cumulative value stored in the bet amount information cumulative storage unit 6210.

Note that the determination of whether the common game start condition is met is made based on the cumulative value relative to the bet amount information, as well as all the cumulative values each of which increases in accordance with repetition of unit base games. Examples of the cumulative values are a game repetition count of base games, and a gaming time of a base game.

Further, the common game start unit 6213 has a function of outputting a game start command to all the slot machines 10 except one or more slot machines 10 each associated with a cumulative value smaller than a minimum set value, the cumulative value increasing in accordance with repetition of base games. In other words, the common game start unit 6213 has a function of outputting a game start command to one or more slot machines 10 each associated with a cumulative value equal to or greater than the predetermined threshold value, when the common game start condition has been met. Accordingly, the common game start unit 6213 does not qualify the one or more slot machines 10 associated with a cumulative value smaller than the minimum set value. This motivates the player to proactively repeat base games.

Further, the common game start unit 6213 has functions of monitoring the uninput period during which no start operation is performed, and outputting a game start command to all the slot machines 10 except one or more slot machines 10 whose uninput period equals or exceeds the time-out period. Thus, the common game start unit 6213 is capable of determining that no player is present at a slot machine 10 where no base game is run for a period of time equal to or longer than the time-out period, thus preventing such a slot machine 10 from running the common game.

The common game occurrence amount determination unit 6214 has a function of randomly determining the predetermined threshold value (minimum set amount) used for determination of whether the common game start condition is met, within the predetermined range equal to or greater than the predetermined threshold value. This causes a player to pay attention to the cumulative value's reaching or surpassing the predetermined threshold value, and also causes a player to be conscious of the fact that the common game is approaching when the cumulative value reaches or surpasses the threshold value. Thus, a player constantly holds his/her interest towards the common game.

The gaming terminal selection unit 6215 has a function of selecting a specific slot machine 10 from among the slot machines 10, and outputting a shooter command signal to the specific slot machine 10. The win/loss determination unit 6216 has a function of determining a game result of the common game, based on a roll operation command from the specific slot machine 10. The transmit-receive unit 6217 has a function of enabling data transmit-receive among the slot machines 10.

(Operation of Gaming Machine 300)

Figure 4:
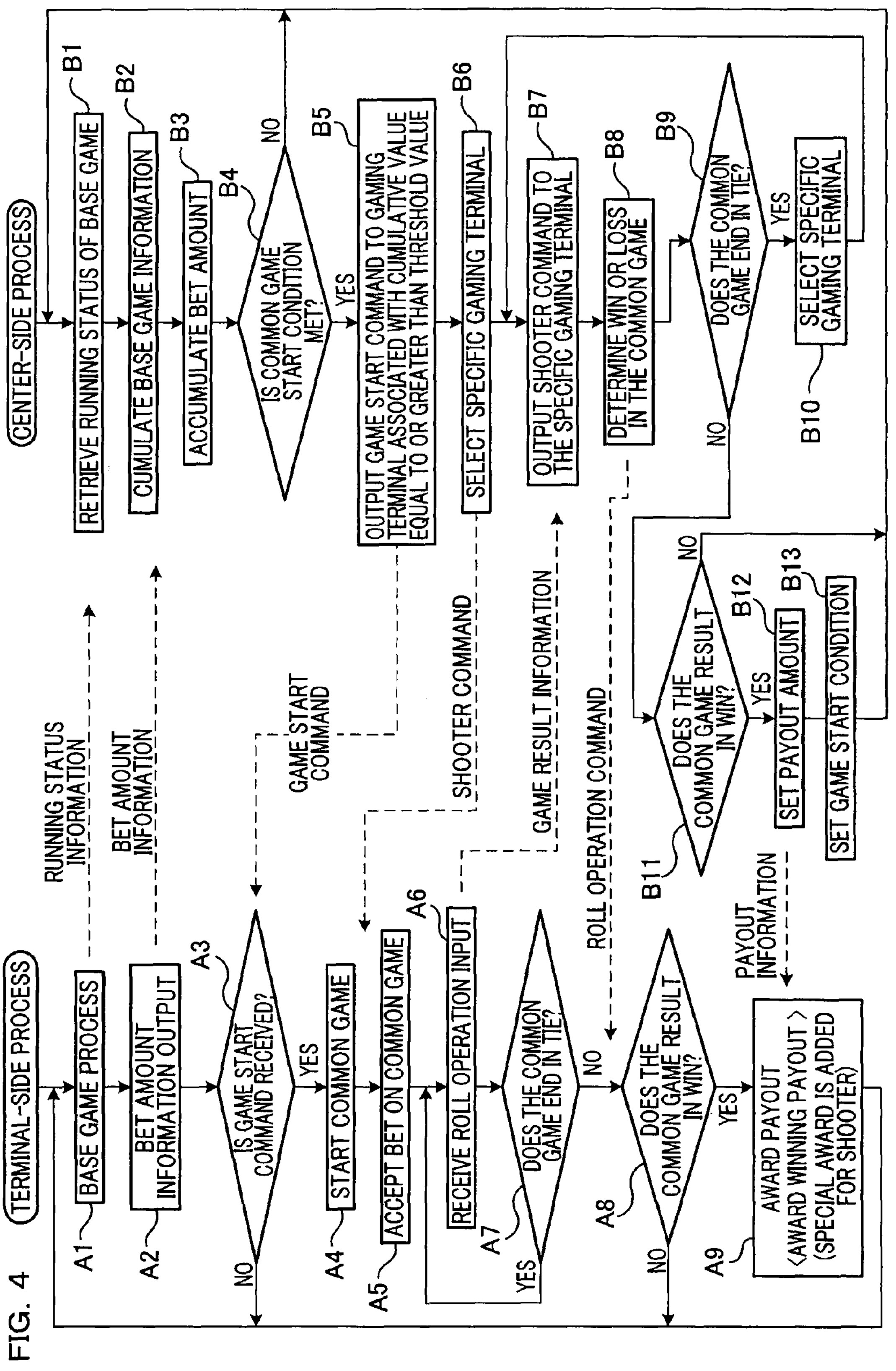
FIG. 4 is a flowchart illustrating the playing method of the gaming machine.

With reference to a flowchart of FIG. 4, the following describes an operation of the gaming machine 300 having the above described functional blocks. Note that in the present invention, the "gaming terminal" in the flow chart refers to a slot machine 10 which runs a slot game. The "gaming terminal"; however, is not limited to this.

(Operation of Slot Machine 10)

The slot machine 10 serving as a gaming terminal carries out terminal-side processes (A1) to (A7). Specifically, abase game process (regular game and the like) is run first (A1). A series of operations described below are carried out.

(Coin Insertion/Start-Checking)

First, the gaming machine 300 checks whether the BET button unit 601 is pressed by the player, and whether the spin button unit 602 is subsequently pressed by the player.

(Symbol Determination)

Next, when the player presses the spin button unit 602, the slot machine 10 extracts a random number for symbol determination. Then, for each video reel displayed on the display unit 614, the slot machine 10 determines symbols 501 to be presented to the player when scrolling of symbol columns is stopped.

(Symbol Display)

Next, the slot machine 10 starts scrolling a symbol column of each video reel, and stops the scroll so that the symbols 501 determined are presented to the player.

(Winning Determination)

Next, when the symbol column of each video reel stops scrolling, the slot machine 10 determines whether a combination of the symbols 501 presented to the player yields a winning.

(Payout)

Next, when a combination of the symbols 501 presented to the player yields a winning, the slot machine 10 awards the player a profit according to the combination of the symbols 501.

For instance, when a combination of symbols 501 which yields a payout of one or more coins, the slot machine 10 pays out the number of coins according to the combination of symbols 501.

Next, whether a bonus combination is formed is determined. When a bonus combination is formed, a bonus game process is run. Meanwhile, when no bonus combination is formed, a regular game is run again. Running status information is transmitted to the external control device 621 in a period of time where a base game including a regular game and a bonus game is being run, the running status information indicating a start and an end of a regular game and the bet amount placed on a unit game. This allows the external control device 621 to perform centralized control of each slot machine 10.

The slot machine 10 outputs a piece of bet amount information for each unit game to the external control device 621, in accordance with a bet placed on a regular game in the base game (A2). The slot machine 10 thereafter determines whether a game start signal from the external control device 621 is received (A3). When a game start signal is not received (A3, NO), the base game process in A1 is repeated.

When the slot machine 10 receives a game start signal from the external control device 621 (A3, YES), the slot machine 10 starts and runs a common game such as common crap game (A4). Thus, as illustrated in FIG. 1, a screen display illustrating the base game is switched to a screen display illustrating a bet table 901. Then, a movie or an image which suggests the player to the common game such as the crap game is displayed.

A bet accepting process is run thereafter, and a bet on the common game is placed based on bet amount information from the external control device 621. Note that a special bet amount is added to the bet amount placed on the common game (common game bet amount), when the slot machine 10 has been designated to be a shooter. Then, an additional bet is permitted, and a bet amount increase is enabled in response to a player's operation (A5).

Next, the slot machine 10 determines whether it is designated to be the shooter of the common game, based on a shooter command. In other words, when the shooter command is attended to the slot machine 10, the slot machine 10 determines that it is designated to be the shooter, and thus receives a roll operation input (A6). Thus, the slot machine 10 receives a roll operation input through the input device such as a touch panel to allow a roll operation command input to the external control device 621. When the player performs a roll operation, the slot machine 10 designated to be the shooter transmits a roll operation command to the external control device 621. Note that when the shooter command is not attended to the slot machine 10, the slot machine 10 determines that it is not designated to be a shooter, thus keeps displaying a movie illustrating the common game.

Next, the slot machine 10 determines, based on a piece of game result information from the external control device 621, a win or loss which causes the common game to end, and (i) when no win or loss is resulted, running a common game again, and (ii) when a win is resulted, awarding a payout according to the win.

Specifically, the slot machine 10 determines whether the common game ends in a tie (A7). When the crap game ends in a tie, that is, when no win or loss is resulted (A7, YES), the common game is continued and a process is carried out, such process as determination of if the slot machine 10 is designated to be the shooter, or display of a movie illustrating the common game.

Meanwhile, when the cap game does not end in a tie, that is, when a win or loss is resulted (A7, NO), it is determined whether the slot machine 10 has won the common game (A8). When the slot machine 10 has lost the common game (A8, NO), the base game of process A1 is run again. Meanwhile, when the slot machine 10 has won the common game (A8, YES), a payout is awarded based on a piece of payout information from the external control device 621. Under such a circumstance, when the slot machine 10 has been designated to be the shooter, a special payout is added to the common game bet amount, and the slot machine 10 is awarded the special payout corresponding to the special bet amount (A9). The base game of A1 is run again thereafter.

(Operations of External Control Device 621)

The external control device 621 runs the following center-side processes of (B1) to (B12) in synchronization with the slot machines 10, while the slot machines 10 are being in operation as described above.

First, the external control device 621 receives running status information from each of the slot machines 10 to retrieve a running status of the base game at each slot machine 10 (B1). Afterwards, the external control device 621 cumulatively stores a piece of bet amount information as a cumulative value, the piece of bet amount information transmitted from each slot machine 10 (B2). In this case, as illustrated in FIG. 1, the cumulative value is accumulated individually for each slot machine 10, as illustrated in FIG. 1. Note that the cumulative value is cumulatively stored bet amounts.

Then, the external control device 621 accumulates a part of the bet amount placed on the base game, respectively as the base bet amount and the special bet amount, based on the piece of bet amount information (B3). Under such a circumstance, the base bet amount as a bet amount to be placed on the common game is stored individually for each slot machine 10. Meanwhile, the special bet amount is accumulated so as to form a total amount of bet amounts placed at all the slot machines 10.

Next, it is determined whether the common game start condition is met, based on a running status of the base game of each slot machine 10 (B4). In other words, it is determined whether any one of the cumulative values each associated with a slot machine 10 has reached or exceeded the predetermined value. When the common game start condition is not met (B4, NO), the process of B1 is repeated to retrieve the running status of the base game at each slot machine 10.

Meanwhile, when the common game start condition is met (B4, YES), a game start command is outputted simultaneously to one or more of the slot machines 10 each associated with a cumulative value equal to or greater than the predetermined threshold value (minimum set amount) (B5). Afterwards, a specific slot machine 10 is selected from among the one or more slot machines 10 (B6). A shooter command is outputted to the specific slot machine 10 (B7).

Next, the external control device 621 waits until it receives a roll operation command transmitted from the specific slot machine 10. When a roll operation command is received, a determination of a win or loss in the common game is made in response thereto. In other words, a determination is made on whether each of the slot machines 10 wins or loses the common game, or the common game ends in a tie. In other words, a determination is made on whether each of the slot machines 10 wins or loses the common game, or the common game ends in a tie (B8).

Next, it is determined whether the common game ends in a tie (B9). When it is determined that the common game ends in a tie (B8, YES), a specific slot machine 10 is selected (B10). Note that the previous shooter may play the role as the shooter in the next slot game even when the slot game ends in a tie. Process B7 is then run, and a shooter command is transmitted to the specific slot machine 10. Processes B7 to B9 are repeated until a win or loss is resulted from the common game.

When the common game does not end in a tie (B9, NO), it is subsequently determined whether the common game results in a win (B11). When the common game results in a loss (B11, NO), the processes are repeated from B1, and a running status of the base game of each slot machine 10 is newly retrieved. Meanwhile, when the slot machine 10 has won the common game (B11, YES), a payout is calculated based on a bet amount on the common game at each slot machine 10, and transmitted to each slot machine 10 (B12). Afterwards, an event occurrence amount is randomly changed, which event occurrence amount influences whether the common game start condition is satisfied (B13). In other words, any one of the cumulative values each associated with a slot machine 10 is required to reach the event occurrence amount in order to begin the next common game. Note that the minimum set amount may be determined here, based on the determined event occurrence amount. For example, the minimum set amount may be a predetermined percentage (e.g., 70%) of the determined event occurrence amount whose minimum set amount has been determined. Then the processes are repeated from B1.

As described above, the gaming machine 300 includes the slot machines 10 and the external control device 621, each of which slot machines 10 carries out the terminal-side processes of (A1) to (A9), and the external control device 621 carries out the center-side processes of (B1) to (B12).

Accordingly, the center controller 200 cumulatively stores a piece of bet amount information as a cumulative value in association with a slot machine 10, the piece of bet amount information transmitted from each slot machine 10 for each unit game of the base game. Then, when the common game start condition is met, a game start command is outputted to one or more of the gaming terminals each associated with a cumulative value equal to or greater than the predetermined threshold value.

Accordingly, the cumulative value is cumulation of pieces of bet amount information each based on a bet amount. Thus, the gaming machine 300 allows participation of only one or more of the slot machines 10 in the common game, at each of which one or more slot machines 10 unit games are repeated to an extent that the associated cumulative value reaches or surpasses the predetermined threshold value. This allows the gaming machine 300 to eliminate a slot machine 10 from the common game, at which slot machine 10 a ratio of the associated cumulative value to a sum of the cumulative values associated with all the slot machines 10 is smaller compared with another slot machine 10. As a result, the gaming machine 300 is able to cause a player to be conscious of the fact that he/she is allowed to participate in the common game when the associated value reaches or surpasses the predetermined threshold value. This enhances the player's motivation to continue playing the base game. Hence, the gaming machine 300 has a function of the common game capable of realizing a high entertainment characteristic.

Further, the gaming machine 300 denies participation of a slot machine 10 in the crap game when the cumulative value associated with the slot machine is smaller than the predetermined threshold value. This lessens a difference among the cumulative values associated with slot machines 10 which participate in the crap game. Thus, when the crap game has such a feature which offers a player a more advantageous state in accordance with an amount of the cumulative value associated with the slot machine 10 operated by the player, the gaming machine 300 is able to deny participation of a slot machine 10 associated with a cumulative value smaller than the threshold value in the crap game, since a cumulative value smaller than the threshold value would put the player in a disadvantageous state in the common game.

(Mechanical Structure of Slot Machine 10)

Figure 7:
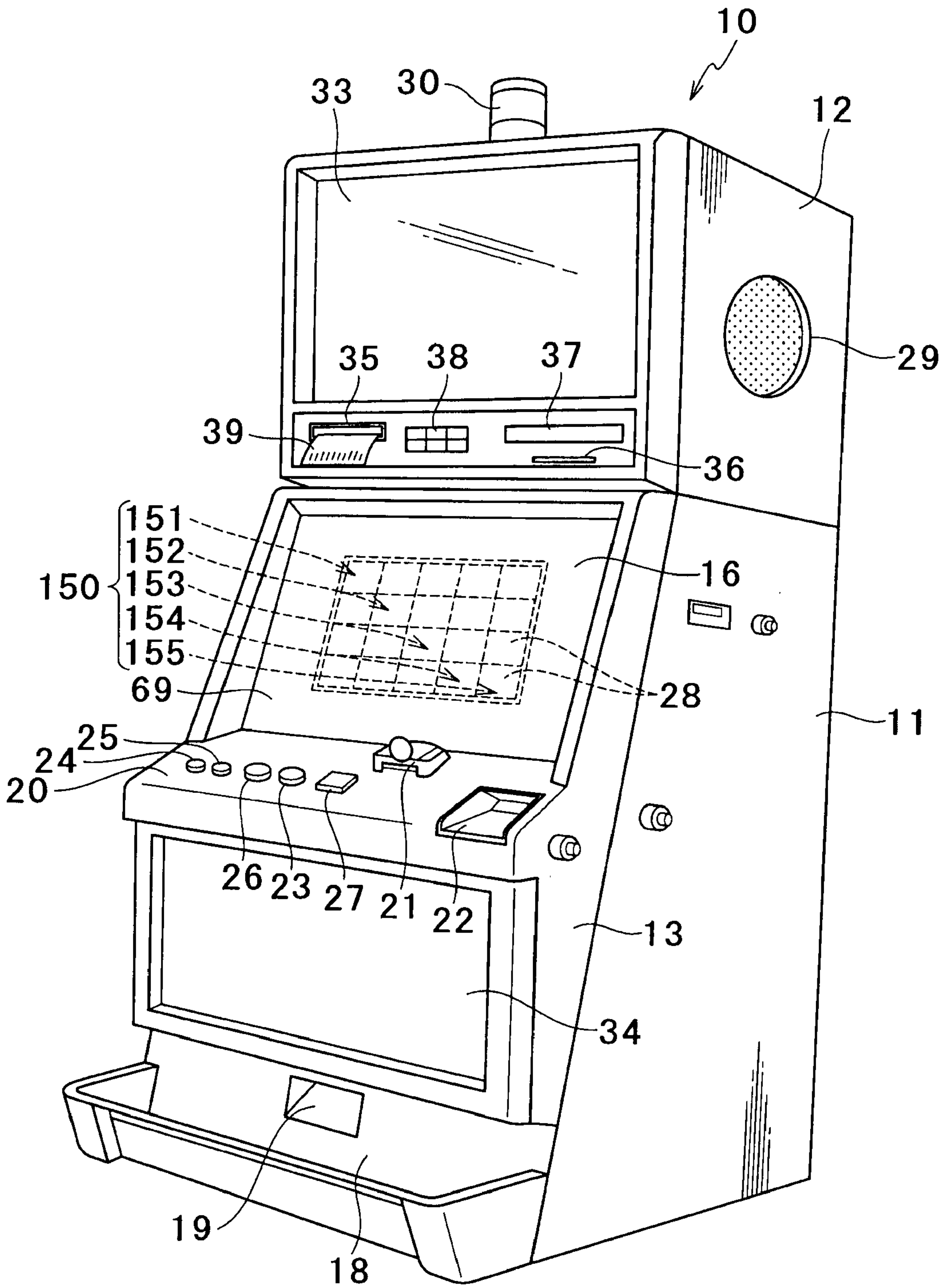
FIG. 7 is a perspective view of a slot machine in the gaming machine.

As illustrated in FIG. 7, the slot machine 10 runs a unit game with consumption of a game value. The slot machine 10 includes a cabinet 11, a top box 12 provided above the cabinet 11, and a main door 13 provided on the front face of the cabinet 11.

The main door 13 has the symbol display device 16 which is also referred to as lower image display panel. The symbol display device 16 is made of a transparent liquid crystal panel. The symbol display device 16 is capable of switching between a slot game screen and a later-described crap game screen. The slot game screen has a display window 150 at its center portion. The display window 150 includes twenty display blocks 28 which are arranged in five columns and four rows. The columns form simulated reels 151 to 155, each having four display blocks 28. The four display blocks 28 in each of the simulated reels 151 to 155 are displayed as if all the display blocks 28 are moving downward at various speeds. This enables rearrangement, in a manner that symbols 501 respectively displayed in the display blocks 28 are rotated in a longitudinal direction and stopped thereafter.

On the left and right sides of the display window 150, symmetrically-arranged payline occurrence columns are respectively disposed. As illustrated in FIG. 20, a payline occurrence column on the left when viewed from the player includes 25 payline occurrence parts 65L (65La to 65Ly).

On the other hand, a pay line occurrence column on the right includes 25 payline occurrence parts 65R (65Ra to 65Ry).

Each payline occurrence part 65L is paired with one of the payline occurrence parts 65R. Paylines L are prescribed, each extending from one of the payline occurrence parts 65L to one of the payline occurrence parts 65R which are paired with each other. Although there are 25 paylines L, FIG. 20 only shows one payline L for the sake of easier understanding.

Each payline L is activated when the payline L connects a pair of payline occurrence parts 65L and 65R. The payline L otherwise is inactive. The number of active paylines L is determined based on a bet amount. When the bet amount placed is the maximum amount, the maximum number of paylines L; i.e., 25 paylines L are activated. Various winning combinations of symbols 501 are formed along activated paylines L. The winning combination is detailed later.

The present embodiment deals with a case where the slot machine 10 is a video slot machine. However, the slot machine 10 of the present invention may partially adopt a mechanical reel in place of the simulated reels 151 to 155.

Further, a not-illustrated touch panel 69 is disposed on a front face of the symbol display device 16, and a player is able to input various instructions by operating the touch panel 69. From the touch panel 69, an input signal is transmitted to the main CPU 41.

Below the lower image panel 16 are control panel 20, a coin receiving port 21, and a bill validator 22. The control panel 20 includes plural buttons 23 to 27 by which a player is able to input an instruction related to progression of a game. The coin receiving port 21 receives a coin and takes it into the cabinet 11.

The control panel 20 has: a start button 23, a change button 24, a cash-out button 25, a 1-bet button 26, and a maximum bet button 27. The start button 23 is for inputting an instruction to start scrolling symbols. The change button 24 is used when requesting a gaming facility staff member to exchange money. The cash-out button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable on one game (500 coins in this embodiment), out of the credited coins.

The bill validator 22 is for validating the legitimacy of a bill input, and takes into the cabinet 11 a bill recognized as valid. The bill identifier 22 may be also capable of reading a barcode on a later-mentioned barcoded ticket 39. On the lower front surface of the main door 13, that is, below the control panel 20, there is provided a belly glass 34 with a character or the like of the slot machine 10 being drawn thereon.

On the front surface of top box 12 is provided an upper image display panel 33. The upper image display panel 33 has a liquid crystal panel, and displays thereon an image which provides introduction of the game, the rules of the game, and the like.

Further, the top box 12 is provided with speakers 29. Below the upper image display panel 33 are provided a ticket printer 35, a card reader 36, a data displayer 37, and a keypad 38. The ticket printer 35 prints on a ticket a barcode and outputs the ticket as a barcoded ticket 39. A barcode is encoded data containing a credit amount, date, an identification number of the slot machine 10, and the like. A player is allowed to exchange the barcoded ticket 39 with a bill or the like at a predetermined location in the gaming facility (e.g. cash booth of a casino).

The card reader 36 reads/writes data from/into a smart card. The smart card is carried by a player, and stores thereon data for identifying the player, data relating to a history of games played by the player, or the like. The smart card may store data of coins, bills, or a credit card. Further, it is possible to adopt a magnetic stripe card instead of the smart card. The data displayer 37 includes a fluorescent display or the like, and displays the data read by the card reader 36 and the data input by the player through the key pad 38. The key pad 38 is for entering instructions or data relating to issuance of a ticket.

(Electric Structure of Slot Machine 10)

Figure 8:
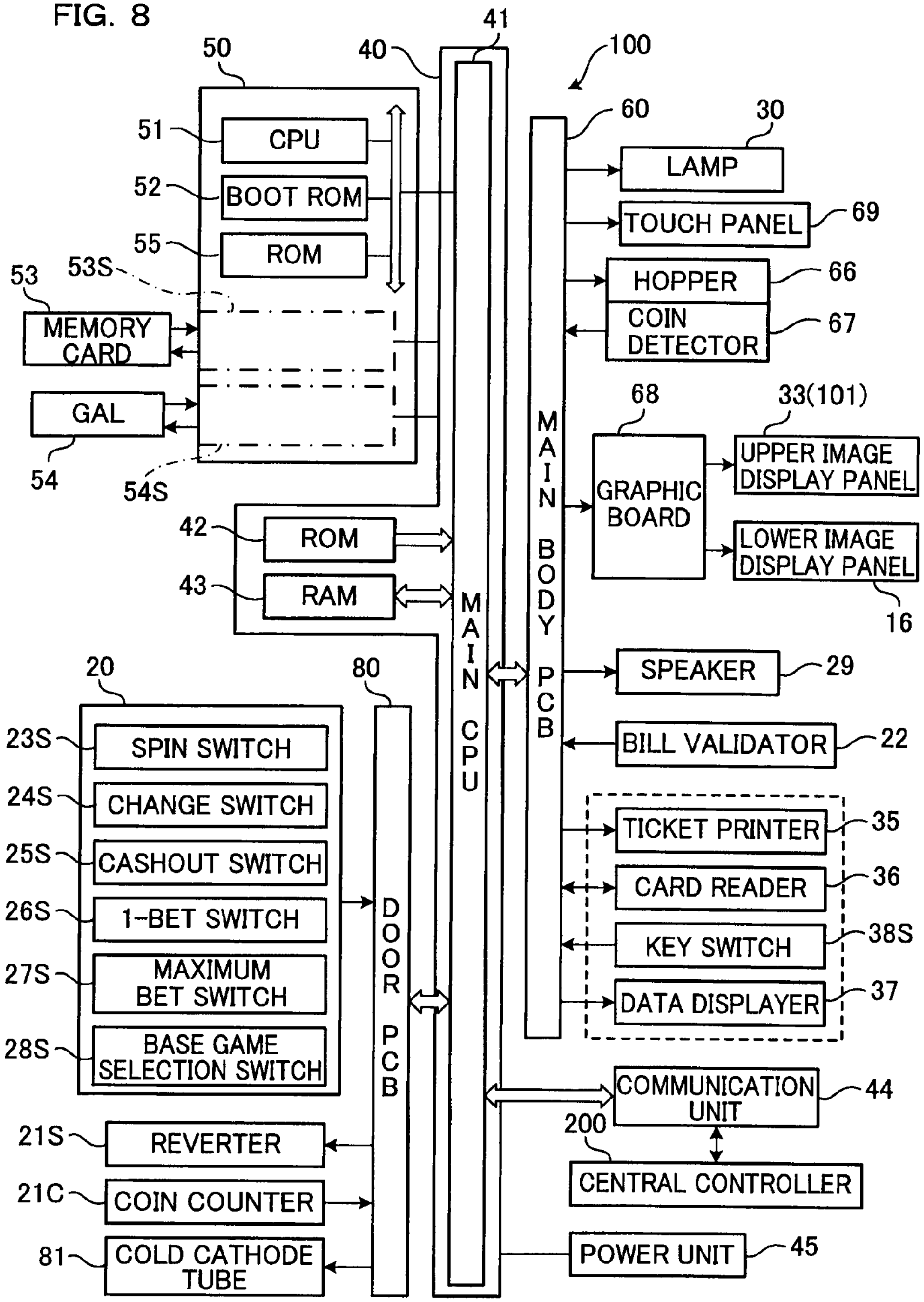
FIG. 8 is a block diagram illustrating a control circuit of a terminal controller.

FIG. 8 illustrates an internal structure of the slot machine 10 shown in FIG. 7, that is, FIG. 8 is a block diagram of the terminal controller 100. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of a non-volatile memory such as a compact Flash® (a), and stores a game program. The game program includes a symbol determination program. The symbol determination program is a program for determining symbols to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program relating to a game progress. This game program includes image data of, for example, free game occurrence image 200, achievement effect image 201, and free game addition image 202.

The game program includes regular game symbol table data, odds data, wild symbol increase count determination table data, trigger symbol increase count determination table data, symbol No. determination table data, and the like. The regular game symbol table data indicates a regular game symbol table (see FIG. 10) illustrating a corresponding relationship among each symbol on each symbol column in each display block, a code number, and a random value. The odds data indicates a corresponding relationship between the type and number of symbols rearranged on the payline L and a payout amount (see FIG. 16). This wild symbol increase count determination table data indicates a wild symbol increase count determination table (see FIG. 14). The trigger symbol increase count determination table data illustrates a trigger symbol increase count determination table (see FIG. 15). The symbol No. determination table data indicates a symbol column determination table (see FIG. 12).

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the terminal controller 100 of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading the game program stored in the memory card 53 via the gaming board 50. Note that, the ROM may be rewritable or non-rewritable in the present invention.

The RAM 43 stores data used during operation of the main CPU 41 and a program such as the symbol determination program. Further, the RAM 43 is capable of storing the game program.

Further, the RAM 43 stores a credit amount, and an insertion amount and a payout amount for each game (unit game). Further, the RAM 43 stores bonus game symbol table data and the like, the bonus game symbol table data indicating a bonus game symbol table (see FIG. 11). The bonus game symbol table data indicates the relation among the symbols of each symbol column in the display blocks, the code numbers, and random values. The bonus game is also referred to as "feature game."

Further, the RAM 43 has a free game repetition count recording region, a total game repetition count recording region, and a total payout amount recording region, and a trigger symbol count recording region. The trigger symbol may be also referred to as "feature symbol." In the free game repetition count recording region is stored remaining game repetition count data which indicates a remaining free game repetition count T. In the total game repetition count recording region is stored total game repetition count data indicating a total game repetition count C. The total game repetition count C is the number of regular games played after a transition to the insured mode. In the trigger symbol count recording region is stored trigger symbol count data indicating a trigger symbol count. The trigger symbol count is the total number of the trigger symbols that may be rearranged during a free game.

Further, the main RAM 43 is provided with an insurance flag recording region. The insurance flag is set when a rescue start condition has been met, or when a not-illustrated insurance button has been pressed, for example. The rescue start condition is met, for example, when a repetition count of base game has reached a predetermined value. The insurance flag recording region is, for example, a storage region of a predetermined bits, and the insurance flag is turned on and off according to contents of the storage region. The insurance flag in the on state corresponds to the insured mode. The insurance flag in the off state corresponds to the uninsured mode.

When the bonus game is run in the insured mode, an increase in the number of trigger symbols and/or that of wild symbols may be greater than in the uninsured mode. Further, when a bonus combination is achieved during the bonus game, an increase in the number of trigger symbols and/or that of wild symbols may be greater than in the uninsured mode.

The motherboard 40 is connected to a later-described main body PCB (Printed Circuit Board) 60 and a door PCB 80 respectively via USBs. Further, the motherboard 40 is connected to a power unit 45.

The main body PCB 60 and door PCB 80 are connected to various devices or units which generate signals to be input to the main CPU 41, and various devices or units whose operations are controlled by signals from the main CPU 41. Based on a signal input to the main CPU 41, the main CPU 41 runs the game program and the game system program stored in the RAM 43, to perform an arithmetic process. Then, the CPU 41 stores the result of the arithmetic process in the RAM 43, or transmits a control signal to the various devices and units to control them based on the result.

To the main body PCB 60 are connected a lamp 30, a hopper 66, a coin detector 67, a graphic board 68, a speaker 29, a touch panel 69, a bill validator 22, a ticket printer 35, a card reader 36, key switch 38S, a data displayer 37, and a random number generator 64. The lamp 30 flashes in a predetermined pattern, based on a control signal output from the main CPU 41.

The hopper 66 is mounted in the cabinet 11 and pays out a predetermined number of coins from a coin outlet 19 to the coin tray 18, based on a control signal from the main CPU 41. The coin detector 67, when detecting that a predetermined number of coins are output from the coin payout port 19, outputs an input signal to the main CPU 41.

The graphic board 68 controls image displaying on the upper image display panel 33 and the symbol display device 16, based on a control signal output from the main CPU 41. On the upper image display panel 33 and the display blocks 28 of the symbol display device 16 are displayed symbols which are scrolled or stopped. A credit amount display unit 400 of the symbol display device 16 displays thereon a credit amount stored in the RAM 43. Further, a bet amount display unit 401 of the symbol display device 16 displays thereon the number of coins bet. Further, a payout display unit 402 of the symbol display device 16 displays the number of coins paid out. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 validates whether a bill is valid, and only accepts a valid bill into the cabinet 11. When taking in a valid bill, the bill validator 22 outputs an input signal indicating the denomination of the bill to the main CPU 41. The main CPU 41 stores into the RAM 43 a credit-value corresponding to the denomination of the bill indicated by the signal.

The ticket printer 35 prints a barcode onto a ticket to issue a barcoded ticket 39. The barcode contains encoded data such as credit-value stored in the RAM 43, date and time, identification number of the slot machine 10 and the like, based on a control signal from the main CPU 41. The card reader 36 reads out data from the smart card and transmits the data to the main CPU 41. Further, the card reader 36 writes data into the smart card based on the control signal output from the main CPU 41. The key switches 38S are provided to the key pad 38, and transmit a predetermined input signal to the main CPU 41 when the key pad 38 is operated by the player. The data displayer 37 displays, based on a control signal from the main CPU 41, the data read by the card reader 36 or the data input by the player through the key pad 38.

The random number generator 64 generates a random number at a predetermined timing. Note that random numbers generated by the random number generator 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cash-out switch 25S corresponding to a cash-out button 25, a 1-bet switch 26S corresponding to the 1-bet button 26, and a maximum bet switch 27S corresponding to the maximum bet button 27. Each of the switches 23S to 27S outputs a signal to the main CPU 41, when a player presses the associated button.

The coin counter 21C is provided inside the coin receiving port 21, and validates whether a coin input by a player to the coin receiving port 21 is valid. Any coin except a valid one is dispensed from the coin outlet 19. In addition, the coin counter 21C outputs an input signal to the main CPU 41 upon detection of a valid coin.

The reverter 21S is operated on the basis of the control signal output from the main CPU 41 and distributes a coin recognized as valid by the coin counter 21C, to a not-shown cash box or hopper 66 mounted to the slot machine 10. In other words, when the hopper 66 is full of coins, a valid coin is distributed into the cash box by the reverter 21S. On the other hand, when the hopper 66 is not yet full of coins, the valid coin is distributed into the hopper 66. The cold cathode tube 81 functions as a back light disposed at the back sides of the symbol display device 16 and the upper display panel 33. This cold cathode tube 81 lights based on a control signal output from the main CPU 41.

(Electrical Structure of Center Controller 200)

Figure 9:
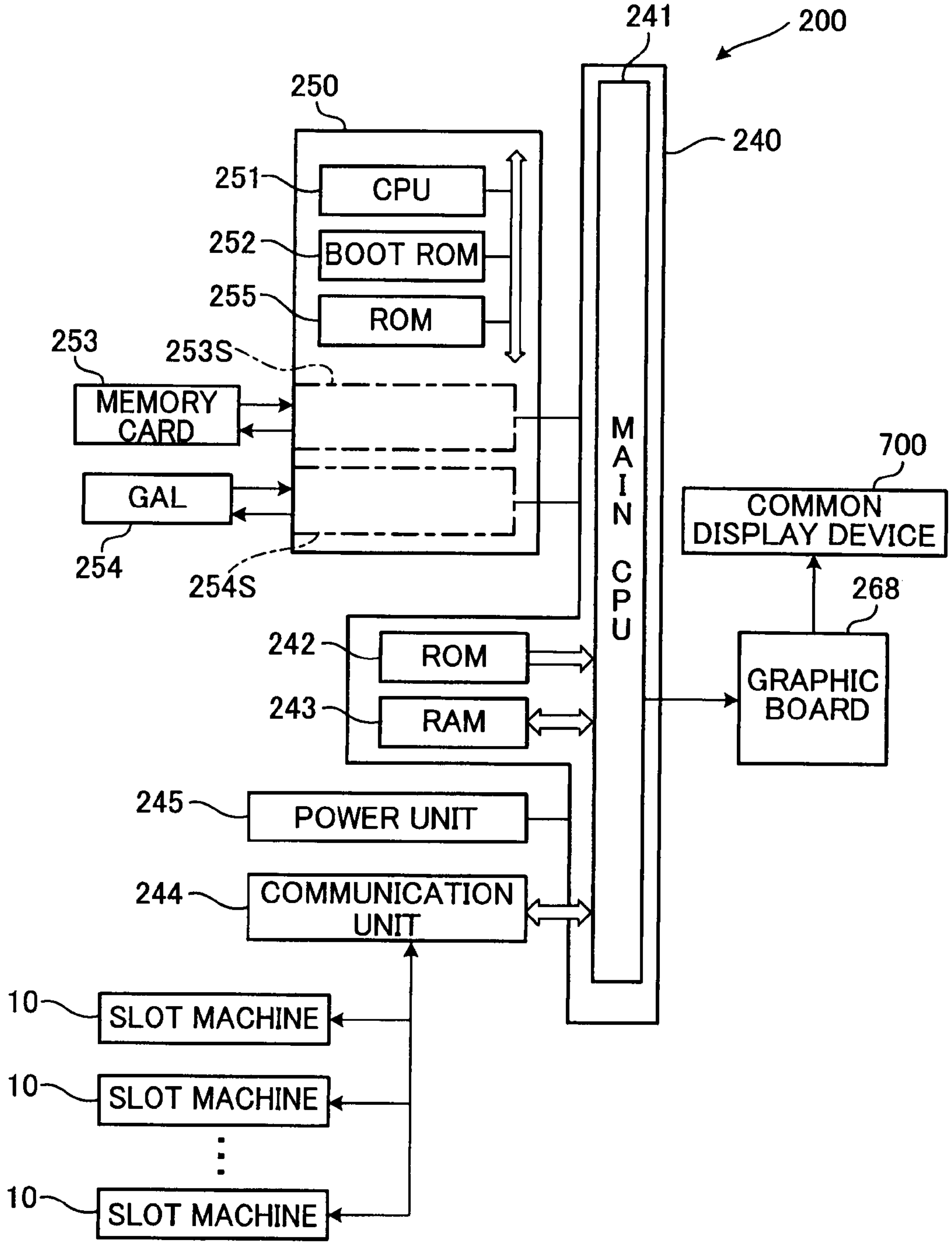
FIG. 9 is a block diagram illustrating a control circuit of a center controller.

FIG. 9 is a block diagram illustrating an electrical structure of the center controller 200. The center controller 200 is provided therein with a control unit. The control unit includes a motherboard 240, a gaming board 250, a power unit 245, and the like.

The gaming board 250 has the same structure as the gaming board 50 of the slot machine 10 (terminal controller 100). In other words, the gaming board 250 includes a CPU 251, a ROM 255, a boot ROM 252, a card slot 253S corresponding to a memory card 253, and an IC socket 254S corresponding to a GAL 254.

The motherboard 240 has the same structure as the motherboard 40 of the slot machine 10. In other words, the motherboard 240 includes a main CPU 241, a ROM 242, and a RAM 243. The RAM 243 stores therein various types of data in forms of a gaming terminal management table of FIG. 17, a common game management table of FIG. 18 and the like. The communication unit 244 is for carrying out communication with the slot machines 10 through a communication line.

The graphic board 268 has the same structure as that of the graphic board 68 of the slot machine 10; however, the graphic board 268 differs from the graphic board 68 in that the former controls an image display on the common display device 700 based on a control signal outputted from the main CPU 241.

(Common Display Device 700)

The common display device 700 includes a display device main body 700*a* and a bracket 700*b*, as illustrated in FIGS. 1 and 5. The display device main body 700*a* includes a liquid crystal display, plasma display, or the like. The bracket 700*b* is attached on a back face of the display device main body 700*a*, and is capable of supporting the display device main body 700*a* at any angle. The bracket 700*b* can be fixed on a ceiling of a facility such as a hall with a suspending device such as a chain. Note that the bracket 700*b* may be fixed onto a floor surface of a facility such as a hall.

Figure 24:
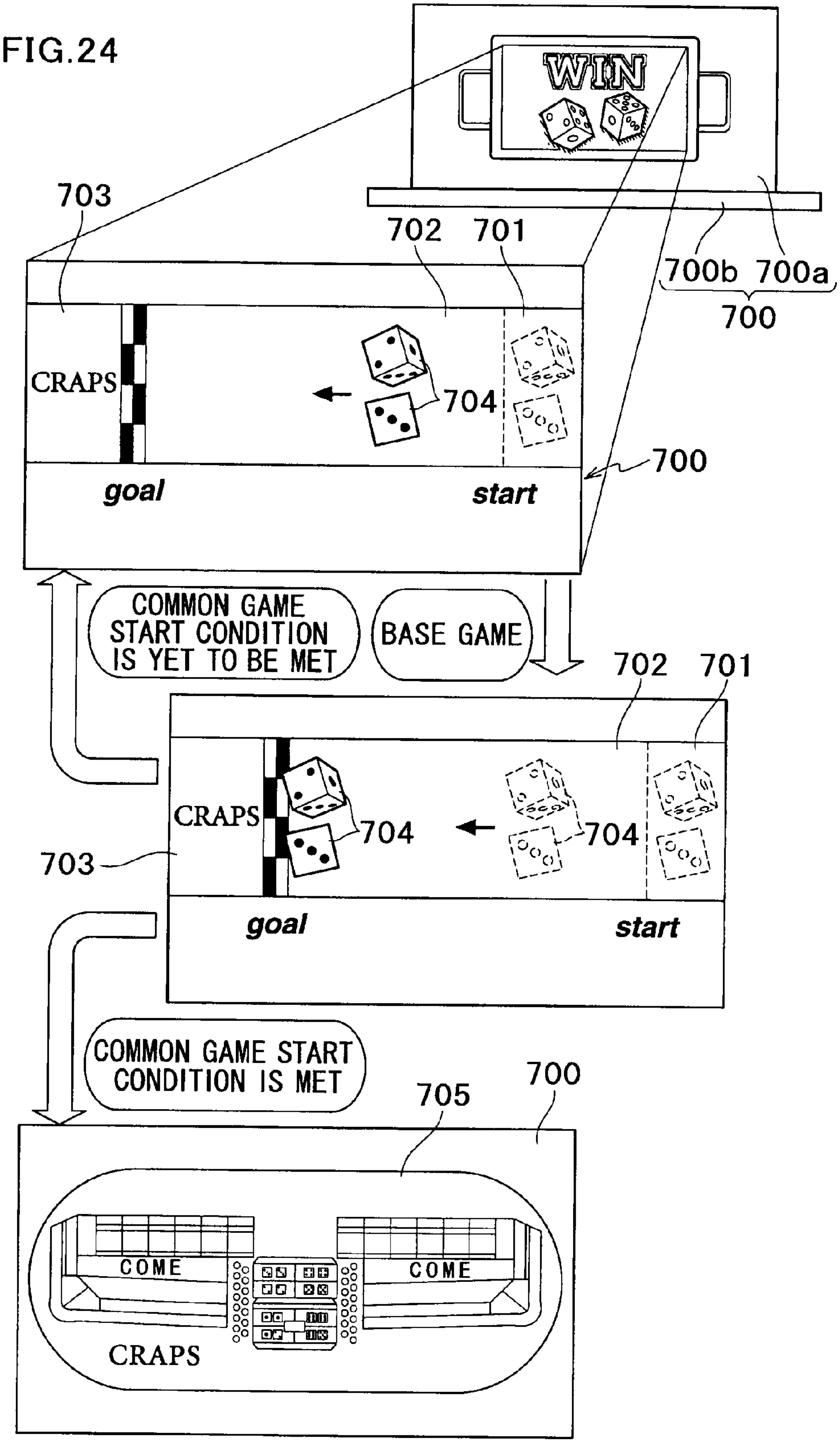
FIG. 24 is an explanatory diagram of a display status of the common display device.

As illustrated in FIG. 24, the display device main body 700*a* switchably displays a progress screen and the crap game screen. The progress screen illustrates a status of a game before the crap game start condition is met. Specifically, the progress screen has a start area 701, a travel area 702, and a goal area 703. The progress screen also displays die images 704 which serve as a moving object. The die images 704 are positioned in the start area 701 immediately after the crap game has ended. The die images 704 move through the travel area 702 from the start area 701 towards the goal area 703 each time a base game is run. The die images 704 are positioned in the goal area 703 when the crap game start condition has been met. The progress screen thereby enables the player to anticipate when the crap game will start, based on the position of the die images 704.

Meanwhile, the crap game screen is displayed in place of the progress screen when the crap game start condition has been met. The crap game screen displays an entire bet table 705 for the crap game. Thus, the crap game screen informs all players that a crap game will begin, by using an entire screen on the display device main body 700*a*.

(Symbol, Combination, and the Like)

Symbols displayed on the simulated reels 151 to 155 of the slot machine 10 form symbol columns each including plural symbols 501. Each symbol 501 forming a symbol column is given any one of the code Nos. 0 to 19 or greater, as shown in FIGS. 10 and 11. Each symbol column has a combination of symbols 501 which are "WILD," "FEATURE," "A," "Q," "J," "K," "BAT," "HAMMER," "SWORD," "RHINOCEROS," "BUFFALO," and "DEER."

Any four consecutive symbols 501 of a symbol column are displayed (arranged) in the uppermost stage, upper stage, lower stage, and lowermost stage of the corresponding one of the simulated reels 151 to 155, respectively, thereby forming a symbol matrix of five columns and four rows under the display window 150. Symbols 501 forming a symbol matrix are scrolled when a game is started at least by pressing the start button 23. This scrolling of the symbols stops (rearrangement) after a predetermined period has elapsed since the beginning of the scrolling.

Further, for symbols 501, various winning combinations are set beforehand. Each winning combination formed yields a winning. A winning combination is a combination of symbols 501 stopped on the payline L, which combination of symbols 501 is advantageous to a player. The wording "advantageous" means that: a predetermined number of coins corresponding to the winning combination are paid out; the number of coins to be paid out is added to a credit amount; a bonus game is started; or the like.

In the present embodiment, a winning combination is a combination of symbols 501 which informed on an activated payline L and includes a predetermined number of at least one kind of the following symbols 501: "WILD," "FEATURE," "A," "Q," "J," "K," "BAT," "HAMMER," "SWORD," "RHINOCEROS," "BUFFALO," and "DEER." When a predetermined kind of symbols 501 is set as a scatter symbol, a winning combination is regarded as to be formed if a predetermined number or more of those are rearranged, irrespective of the activation/inactivation status of the paylines L.

Specifically, a winning combination with "FEATURE" (a trigger symbol 503*b*) stopped on a payline L serves as a bonus trigger and causes (i) transition of the gaming mode from the regular game to the bonus game and (ii) a payout according to the bet amount. Further, when a winning combination with "BAT" stops on a payline L in the regular game, there is paid out an amount of coins (value) which is a product of a basic payout amount of the "BAT" multiplied by the bet amount.

(Regular Game Symbol Table)

FIG. 10 shows a table used for determining symbols 501 to be rearranged during a regular game. The regular game symbol table indicates symbols 501 of each symbol column for the display blocks 28, code Nos. respectively associated with the symbols 501, and twenty number ranges respectively associated with the code Nos. ranging from 0 to 65535.

Note that the above numbers may be equally divided into twenty ranges or unequally divided into twenty ranges. The latter case enables adjustment of a rearrangement probability for each symbol 501 by adjusting the associated range of random numbers. Further, the range of random numbers associated with "FEATURE" corresponding to the trigger symbol 503*b* among the specific symbols 503, or "WILD" corresponding to the wild symbol 503*a* among the specific symbols 503 may be narrower than ranges of random numbers associated with other symbols 501. This allows easier adjustment of winning or losing, by lowering probability of winning of a valuable symbol 501 in accordance with the status of a game.

For example, when a random number randomly selected for the first column is "10000," the symbol "J" whose code No. "3" is associated with a range of random numbers including "10000" is selected as a symbol to be rearranged in the first simulated reel 151. Further, for example, when a random number randomly selected for the fourth column is "40000," the symbol "FEATURE" whose code No. "12" is associated with a range of random numbers including "40000" is selected as a symbol to be rearranged in the fourth simulated reel 151.

(Bonus Game Symbol Table)

FIG. 11 is a table used at the time of determining symbols 501 to be rearranged during a bonus game. As is the case with the regular game symbol table, the bonus game symbol table contains symbols 501 of each symbol column for the display blocks 28, code Nos. respectively associated with the symbols 501, and number ranges respectively associated with the code Nos. The number ranges cover the numbers 0 to 65535. These numbers 0 to 65535 are divided into the ranges similarly to the case of the regular game symbol table.

Further, the bonus game symbol table includes additional specific symbols 503 or specific symbols 503 replacing the other symbols. The wording "replacing" means that new symbol data is written over already existing symbol data. The number of additional symbols or the number of symbols replacing the other symbols, or the symbol column in which the addition or replacement takes place may be randomly determined or determined beforehand. In the present embodiment, the number of symbols to be added is randomly determined based on the wild symbol increase count determination table of FIG. 14 and the trigger symbol increase count determination table of FIG. 15. When symbol data is replaced with another set of symbol data, an image based on the overwritten data (replacement data) may be displayed, in place of a symbol 501 having been stopped and displayed.

For example, in the bonus game symbol table of FIG. 11, ten wild symbols 503*a* are evenly added to symbol columns (L1) to (L5). This achieves conditions whereby a wild symbol 503*a* is more likely to be selected through random selection, in all the symbol columns (L1) to (L5).

(Symbol Column Determination Table)

FIG. 12 illustrates a symbol column determination table used at the time of determining a symbol column, out of the symbol columns (L1) to (L5), in which addition of or replacement with the specific symbols 503 takes place. The symbol column determination table indicates symbol column Nos. and random number ranges respectively associated with the symbol column No. A symbol column Nos. 1 to 5 respectively indicate first to fifth columns of display blocks 28.

The present embodiment deals with a case where an increase in the number of specific symbols 503 or the number of specific symbols 503 to replace the other symbols is determined for each symbol column based on the random number extracted and the symbol column determination table. The present invention however is not limited to this. For example, the number of specific symbols 503 to be increased or to replace the other symbols may be determined in advance for each symbol column. Further, an increase in the number of specific symbols 503 or the number of specific symbols 503 to replace the other symbols may be determined for each type of the specific symbols 503.

(Code No. Determination Table)

FIG. 13 illustrates a code No. determination table. The code No. determination table indicates code Nos. and random number ranges respectively associated with the code Nos. For example, when the random numbers for the first symbol column No. (the first column) are 40567, 63535, 65323, then "12," "end," and "end" are respectively selected as the code Nos.

The present embodiment deals with a case where the code Nos. of specific symbols to be increased is determined for each of the symbol columns based on the random numbers obtained and the code No. determination table. The present invention however is not limited to this. For example, the code No. of a specific symbol 503 to be increased may be set in advance for each symbol column.

(Wild Symbol Increase Count Determination Table)

FIG. 14 illustrates a wild symbol increase count determination table. The wild symbol increase count determination table indicates a list of wild symbol increase counts and random number ranges respectively associated therewith. The wild symbol increase count has five numerical values: "10," "30," "50," "70," and "90." For example, when the random number is 17235, the wild symbol increase count selected is "30." Note that the list of wild symbol increase counts is not particularly limited provided that the list includes more than one integers of 1 or greater. Further, the increases in the number may be variable at a predetermined timing; e.g. at every unit game.

(Trigger Symbol Increase Count Determination Table)

FIG. 15 illustrates a trigger symbol increase count determination table. The trigger symbol increase count determination table indicates a list of trigger symbol increase counts and associated random numbers. The trigger symbol increase count has five numerical values: "2," "4," "6," "8," and "10." For example, when the random number is 17235, the trigger symbol increase count selected is "4." Note that the list of trigger symbol increase counts is not particularly limited provided that the list includes more than one integers of 1 or greater. Further, the list of increases, in the table, may be variable at a predetermined timing; e.g. at every unit game.

(Payout Table)

FIG. 16 is a payout table for managing payouts awarded based on winning combinations. This payout table is stored in the ROM 242 of the main control board 71, and a piece of payout information (payout multiplying factor) is associated with each winning combination. For example, a payout multiplying factor corresponding to a winning combination including three "A"s is "4." Therefore, a payout calculated by multiplying a bet amount by 4 is awarded to a player in this case. A payout multiplying factor corresponding to a winning combination including five "BUFFALO"s is "100." Note that the setting of payout multiplying factor for the base game is the same as that of the free game; however, the present invention is not limited to this. That is, the setting of payout multiplying factor may be different between the regular game and the free game.

The data of each of the above tables is stored in the ROM 42, the RAM 43 in the terminal controller 100 of the slot machine 10. This allows the slot machine 10 to run a base game independently when it is separated from the center controller 200.

(Gaming Terminal Management Table)

FIG. 17 illustrates a gaming terminal management table which manages, in the center controller 200, a running status of a base game of each slot machine 10. This management table has a gaming terminal column, a game type column, a game status column, and a cumulative game repetition count column. The gaming terminal column stores therein unique machine numbers respectively allotted to the slot machines 10. For instance, when five slot machines 10 are connected, the gaming terminal column stores machine numbers "001" to "005."

The game type column stores therein a type of base game being run at each slot machine 10 in association with the machine number. Examples of types of the base game are the regular game and the bonus game. The slot machine 10 allotted machine number "001," for instance, has been repeating unit games of the regular game, since the game type column thereof indicates the "regular game."

The game status column stores a status of a base game ongoing at each slot machine 10, that is, a game status of a unit game, in association with the machine number. The gaming statuses are "run" and "stop." For example, at the slot machine 10 allotted machine number "002," a win or loss has resulted in a unit game of the regular game and the next unit game is to begin, since the indicated game type is "regular game," and the indicated game state is "stop." At the slot machine 10 allotted machine number "004," a unit game of the bonus game is being run, since the indicated game type is "bonus game," and the indicated game status is "run."

The cumulative game repetition count column stores a total number of game repetition count of unit games of the regular game as a cumulative game repetition count. The cumulation starts when the crap game has ended and the slot game has resumed. The present embodiment deals with the case where the common game start condition is met when any one of the cumulative values each associated with a slot machine 10 has reached or surpassed the event occurrence amount, the event occurrence amount randomly determined for each common game. The present invention, however, is not limited thereto: The common game start condition may be met when the total amount of the cumulative game counts respectively associated with the slot machines 10 has reached or surpassed the predetermined amount.

(Common Game Management Table)

FIG. 18 illustrates a common game management table which manages a status of a common game at each slot machine 10 in the center controller 200. The management table includes a gaming terminal column, a bet amount Sn column, a payout multiplying factor An column, a shooter column, a cumulative bet amount Bn column, a special bet amount Cn column, a base bet amount Dn column, a common game bet amount Tn column, a base bet total amount F column, a special bet total amount G column, a mode H column, an easy-mode total amount I column, a professional mode total amount J column, a payout ratio Kn (contribution level En) column, corrected special bet amount Ln column, a total bet amount Mn column, a next-game carry-over amount Nn column.

The gaming terminal column stores therein unique machine numbers respectively allotted to the slot machines 10. In the present embodiment, the gaming terminal column stores machine numbers "001" to "005," which are the machine numbers of five slot machines 10. The bet amount Sn column stores, for each unit game, a bet amount on a slot game as base game. For example, a bet amount of "10.4" is placed on the current slot game at the slot machine 10 allotted machine number "001." A bet amount of "12.4" is placed on the current slot game at the slot machine 10 allotted machine number "004."

The payout multiplying factor An column stores payout multiplying factors An of the common game. In the present embodiment, the payout multiplying factor An is "double," thus winning the common game yields the same amount of payout as the bet amount placed on the common game. In other words, winning the common game causes the bet amount to remain the same, as when the common game ends in a tie.

The shooter column stores numbers "1" and "0," respectively indicating that the slot machine 10 is designated to be the shooter and not. In the present embodiment, the slot machine 10 allotted machine number "002" is designated to be the shooter.

The cumulative bet amount Bn column stores cumulated bet amounts Bn as a cumulative value calculated by the equation $Bn=\Sigma(Sn-Cn-Dn)$. In other words, the cumulative bet amount Bn is a bet mount to which a bet amount calculated by subtracting the special bet amount Cn and the base bet amount Dn from a base game bet amount is added for each unit base game. The special bet amount Cn column stores a special bet amount Cn calculated by the equation $Cn=Bn\times 3\%$. Note that the percentage 3 in the equation is an example, thus can be changed accordingly. The special bet amount Cn is employed as a basis of calculation of the special bet total amount G which is added to the bet amount placed at the slot machine 10 designated to be the shooter of the common game.

The base bet amount Dn column stores a base bet amount Dn calculated by the equation $Dn=Bn\times 7\%$. Note that the percentage 7 in the equation is an example, thus can be changed accordingly. The base bet amount Dn is interchangeable with a common bet amount Tn of the common game bet amount Tn column. The common game bet amount Tn is a bet amount to be bet on the common game first, and is a minimum bet amount bettable on the common game. For instance, the slot machine 10 allotted machine number "002" has placed a common game bet amount of "7.20" on the current common game. The slot machine 10 allotted machine number "004" has placed a common game bet amount of "3.60" on the current common game.

The base bet total amount F column stores the base bet total amount F calculated by the equation $F=\Sigma Dn$. The base bet total amount F is a total amount of base bet amount Dn at all the slot machines 10, and used for calculation of a payout ratio Kn (contribution level En) at each slot machine 10. The special bet total amount G column stores a special bet total amount G calculated by the equation $G=\Sigma Cn$. The special bet total amount G is a total amount of special bet amounts Cn placed at all the slot machines 10, and is added to a common game bet amount Tn at the specific slot machine 10 designated to be the shooter.

The mode H column stores various types of game modes in the common game. Specifically, the mode H column stores one of letters "P" and "E," respectively indicating a professional mode and an easy mode. In the present embodiment, the slot machines 10 respectively allotted machine numbers "001" and "002" play the common game in the professional mode, and the slot machines 10 respectively allotted machine numbers "003," "004," and "005" play the common game in the easy mode.

The easy mode total amount I column stores an easy mode total amount I calculated by the equation $I=G\times(I/5)$. Here, the ratio i/5 refers to the ratio of the number of slot machines 10 running the common game in the easy mode (i) to the total number of slot machines 10 (five slot machines 10). As the total number of slot machines 10 increases or decreases, the number "five (5)" is changed accordingly. In the present embodiment, there are three slot machines 10 running the common game in the easy mode. Thus, the easy mode total amount I is calculated by the equation of $G\times 3/5$.

The professional mode total amount J column stores the professional mode total amount J calculated by the equation $I=G\times(5-i)/5$. Here, $(5-i)/5$ refers to the ratio of the number of slot machines 10 running the common game in the professional mode $(5-i)$ to the total number of slot machines 10 (five slot machines 10). As the total number of slot machines 10 increases or decreases, the number "five (5)" is changed accordingly. In the present embodiment, three slot machines 10 are running the common game in the easy mode "E." Thus, the professional mode total amount J is calculated by the equation $G\times(5-3)/5$.

The payout ratio Kn (contribution level En) column stores the payout ratio Kn calculated by the equation $Kn=Dn/Dmax$. Here, the Dmax refers to a maximum base bet amount Dn in the same game mode. For example, the slot machines 10 respectively allotted machine numbers "001" and "002" play the common game in the professional mode, and the slot machines 10 respectively allotted machine numbers "003," "004," and "005" play the common game in the easy mode.

The corrected special bet amount Ln column stores a corrected special bet amount Ln calculated by the equation $Ln=(I \text{ or } J)\times Kn$. The corrected special bet amount Ln is the total bet amount in each mode calculated taking into account the contribution level (payout ratio) at each of slot machines 10 running a game in the same game mode. The total bet amount Mn column stores a total bet amount Mn calculated by the equation $Mn=Ln+Dn$. The total bet amount Mn is a bet amount applied when the slot machine 10 is designated to be the shooter. The next-game carry-over amount Nn column stores a next-game carry-over amount Nn carried over to each common game bet amount Tn. The next-game carry-over amount Nn is an amount calculated by subtracting the common game bet amount Tn of the corresponding slot machine 10 from a maximum common game bet amount Tmax in the same game mode. The next-game carry-over amount Nn is applied as an initial value of the common game bet amount Tn in the next common game, when the current common game ends.

(Event Occurrence Amount Determination Table)

FIG. 19 illustrates an event occurrence amount determination table. The event occurrence amount determination table is used for determining an event occurrence amount. The event occurrence amount determination table shows event occurrence amounts and associated random numbers. The event occurrence amount ranges between "80" and "120," and a set range is 40. Specifically, the event occurrence amount has five numerical values: "80," "90," "100," "110," and "120." When the random number is 17235, for example, the event occurrence amount determined is "90."

Further, in order to determine the event occurrence amount in a smaller increment within the set range of 40, the lower limit 80 of the event occurrence amount may be added to a remainder of a calculation of a random value obtained divided by the set value. In this case, when the random number determined is 17235, for example, 35 is left over when the random number 17235 is divided by 40. Thus, the event occurrence amount is determined as "115."

(Display Status)

The following specifically describes an example of a display status of the symbol display device 16 in the operation of the slot machine 10.

(Slot Game: Regular Game Screen)

FIG. 20 illustrates an example of a regular game screen which is a screen displayed on the symbol display device 16 during the regular game.

More specifically, the regular game screen is arranged in a center portion, and includes: the display window 150 having the five simulated reels 151 to 155, and the payline occurrence parts 65L and 65R which are arranged on both sides of the display window 150 and symmetrical with respect to the display window 150. Note that FIG. 20 illustrates a regular game screen in which the first to third simulated reels 151, 152, and 153 are stopped, while the fourth and fifth simulated reels 154 and 155 are rotating.

Above the display window 150 are: the credit amount display unit 400, the bet amount display unit 401, a wild symbol count display unit 415, a trigger symbol count display unit 416, and the payout display unit 402. These units 400, 401, 415, 416, and 402 are sequentially arranged in this order from left to right when viewed from a player.

The credit amount display unit 400 displays a credit amount. The bet amount display unit 401 displays a bet amount placed on a unit game in progress. The wild symbol count display unit 415 displays the number of wild symbols 503*a* in a unit game in progress. With this, it is possible to notify the player in advance that there are five wild symbols 503*a* in the regular game. The trigger symbol count display unit 416 displays the number of trigger symbols 503*b* in a unit game in progress. With this, it is possible to notify the player in advance that there are five trigger symbols 503*b* in the regular game. The payout display unit 402 displays the number of coins to be paid out when a winning combination is achieved.

Blow the display window 150 are: a help button 410; a pay-table button 411; a bet unit display unit 412; a stock display unit 413; and a free game repetition count display unit 414. These units 410, 411, 412, 413, and 414 are sequentially arranged in this order from left to right when viewed from the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays an explanatory screen indicating relation of a winning combination to the payout multiplying factor.

The bet unit display unit 412 displays a bet unit (payout unit) at the current point. With the bet unit display unit 412, the player is able to know that, for example, he/she is allowed to participate in a game with a bet in increments of one cent.

The stock display unit 413 displays a bonus game carry-over number. Here, the "bonus game carry-over number" means the remaining number of bonus games runnable subsequently to an end of the currently-run bonus game. That is, when the stock display unit 413 displays "3", three more bonus games are runnable after the currently-run bonus game. Note that the stock display unit 413 displays the number "0" in the regular game.

The free game repetition count display unit 414 displays the total number of times the bonus game is to be repeated, and how many times the bonus game has been repeated. That is, when the free game repetition count display unit 414 displays "0 OF 0," the total number of times a free game is to be repeated ("free game total number") is 0; that is, the game in progress is not a bonus game. Further, when the free game repetition count display unit 414 displays "5 OF 8," during the bonus game, the free game total number is eight, and the current game in progress is the fifth free game.

Further, between the bet unit display unit 412 and the stock display unit 413 are an cumulation level display unit 421 and a time-out display unit 422. The cumulation level display unit 421 is configured to visually display a status of the cumulative value which increases for each unit game of a slot game as the base game by an analog-displayed cumulation level.

Figure 25:
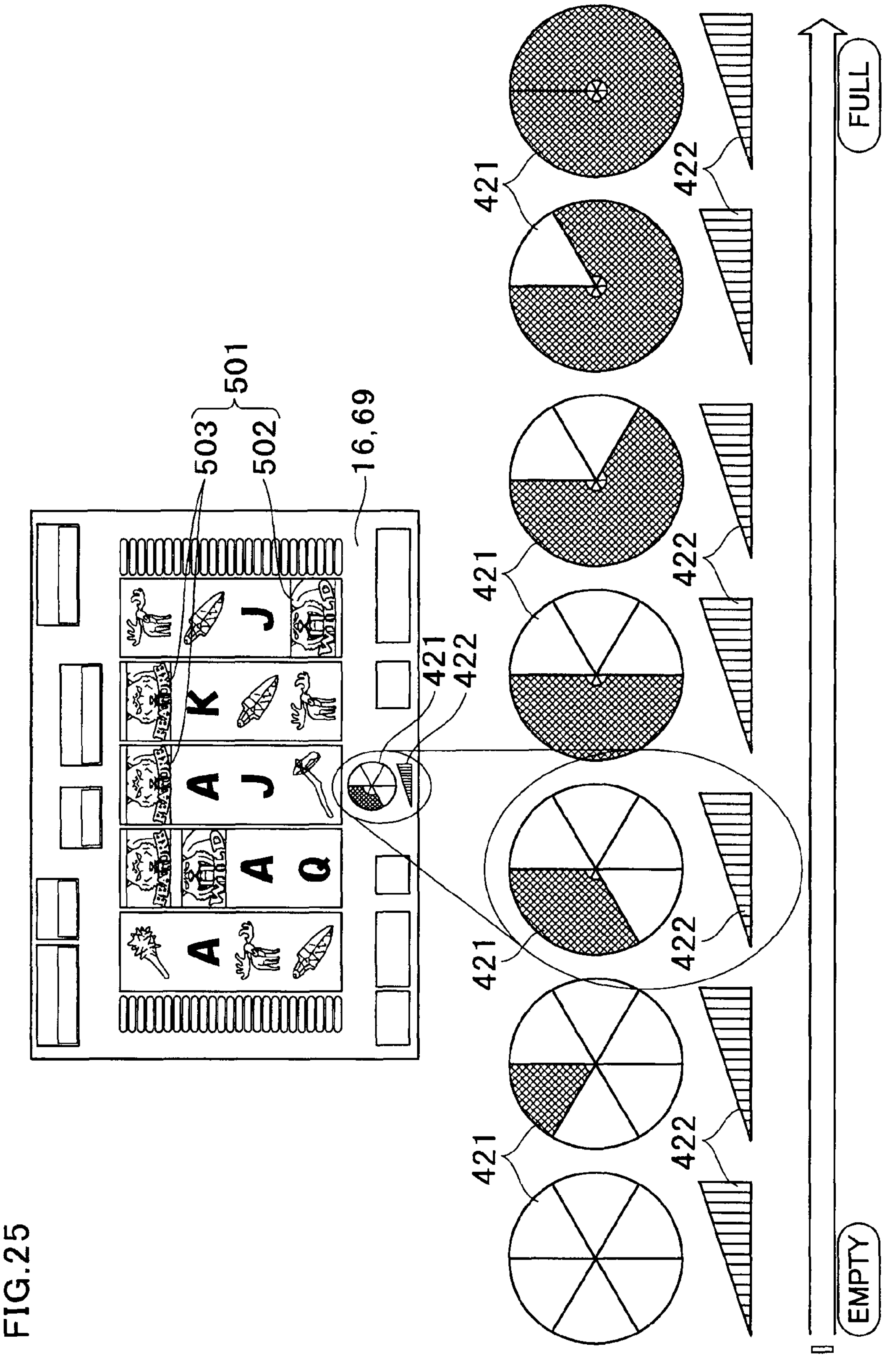
FIG. 25 is an explanatory diagram of a display status of the symbol display device.

Specifically, the cumulation level display unit 421 has a circular outer shape, as illustrated in FIG. 25. An inner circumferential side of the cumulation level display unit 421 is divided into six cumulation display areas by sixty degrees each. Note that the outer shape of the cumulation level display unit 421 is not limited to a circle: The cumulation level display unit 421 may have a polygonal outer shape, or a character-shaped outer shape such as an animal or a gaming machine. The cumulation level display unit 421 is not limited to being divided into six areas, as long as the cumulation level display unit 421 is divided into plural areas. The divided cumulation display areas respectively correspond to certain ranges of cumulative values, the ranges of cumulative values from an empty state where the cumulative value is cleared to zero to a full state with which full cumulative values participation in the common game is permitted. The empty state indicates the cumulative value cleared to zero, which is the initial value of the cumulative value.

Each cumulation display area is capable of independently changing its display status such as a display color and brightness. The display status of each cumulation display area is configured in such a manner that a player is able to confirm whether or not the cumulative value exists in a particular cumulation display area. Accordingly, an empty cumulative value is indicated in such a manner that the cumulation display areas do not indicate any cumulative value. As the cumulative value increases as slot games are repeated, a display status of an accumulation display areas each corresponding to a certain range of cumulative values is sequentially changed into another display status. When the cumulative value eventually reaches a value with which participation in the common game is permitted, that is, when the cumulation display areas indicate a full value, a display status of all the cumulation display areas is switched to another display status. Thus, the cumulation level display unit 421 allows the player to be conscious of the fact that he/she is close to meeting a condition which allows him/her to participate in the common game. Thus, the player constantly holds his/her interest towards the common game.

Note that the cumulation level display unit 421 is reset once it is full, on condition that the common game has begun, irrespective of whether or not the slot machine 10 is to participate in the common game. In other cords, the cumulative value may be cleared to zero. Meanwhile, before the cumulation level display unit 421 reaches its full level, the slot machine 10 is not allowed to participate in the common game, but the display status of the meter may be carried over. In other words, the cumulative value indicated when the common game has ended does not have to be cleared to zero, but it may be an initial value of the cumulative value when a next base game begins.

The time-out display unit 422 is configured to visually display the time-out period by analog-displaying it. Here, the time-out period is a time left before a player is denied his/her participation in the common game if the player does not perform a start operation.

Figure 26:
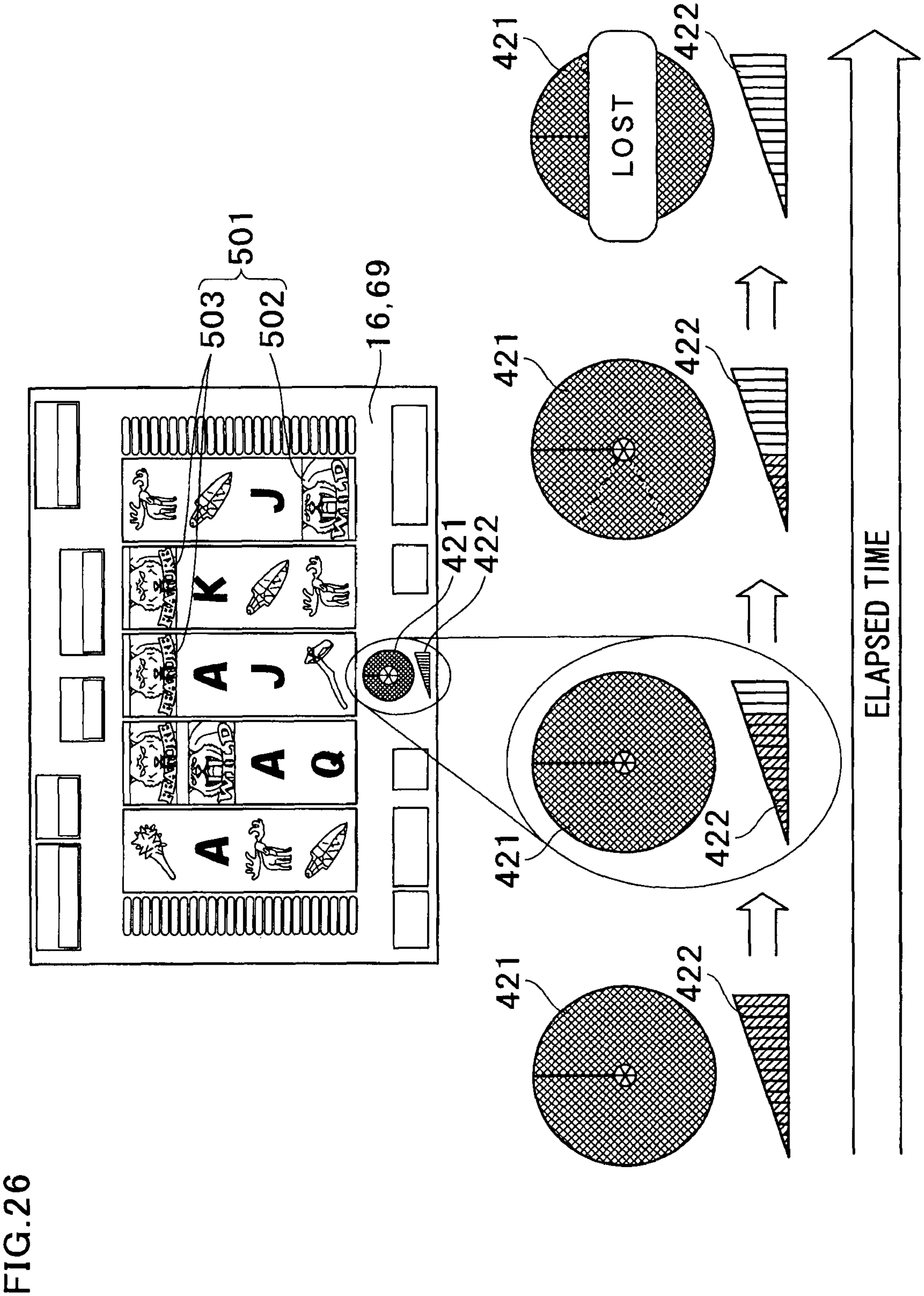
FIG. 26 is an explanatory diagram of a display status of the symbol display device.

Specifically, an outer shape of the time-out display unit 422 is triangle, as illustrated in FIG. 26. An inner side of the time-out display unit 422 is divided into a plurality of time display areas. Note that the outer shape of the time-out display unit 422 is not limited to triangle: The time-out display unit 422 may have a polygonal outer shape, or a character-shaped outer shape such as an animal or gaming machine. Each time display area is capable of independently changing its display status such as a display color and brightness. A display status of each display area allows the player to confirm the time-out period and an elapsed time. Thus, the time-out display unit 422 allows the player to be conscious of the time-out period after which the player is no longer allowed to participate in the common game. Thus, the time-out display unit 422 allows a player to estimate whether the player can take a break from the base game.

Note that the time-out display unit 422 may start counting the time-out period when the base game or the common game is over and the cumulation level indicated by the cumulation level display unit 421 is full, that is, when the credit amount is 0. In this case, the function of the time-out display unit 422 can be used for determining whether the player has finished playing the base game. This prevents a common game from starting when no player is present at lost machine 10. Further, the time-out display unit 422 may be reset to an initial time-out period when the same or a different player resumes the base game, irrespective of the remaining length of the time-out period. Note that the time-out display unit 422 may perform a denial display such as a text "LOST," when the time-out period is completely exhausted.

(Bonus-Win Screen in Regular Game)

Figure 21:
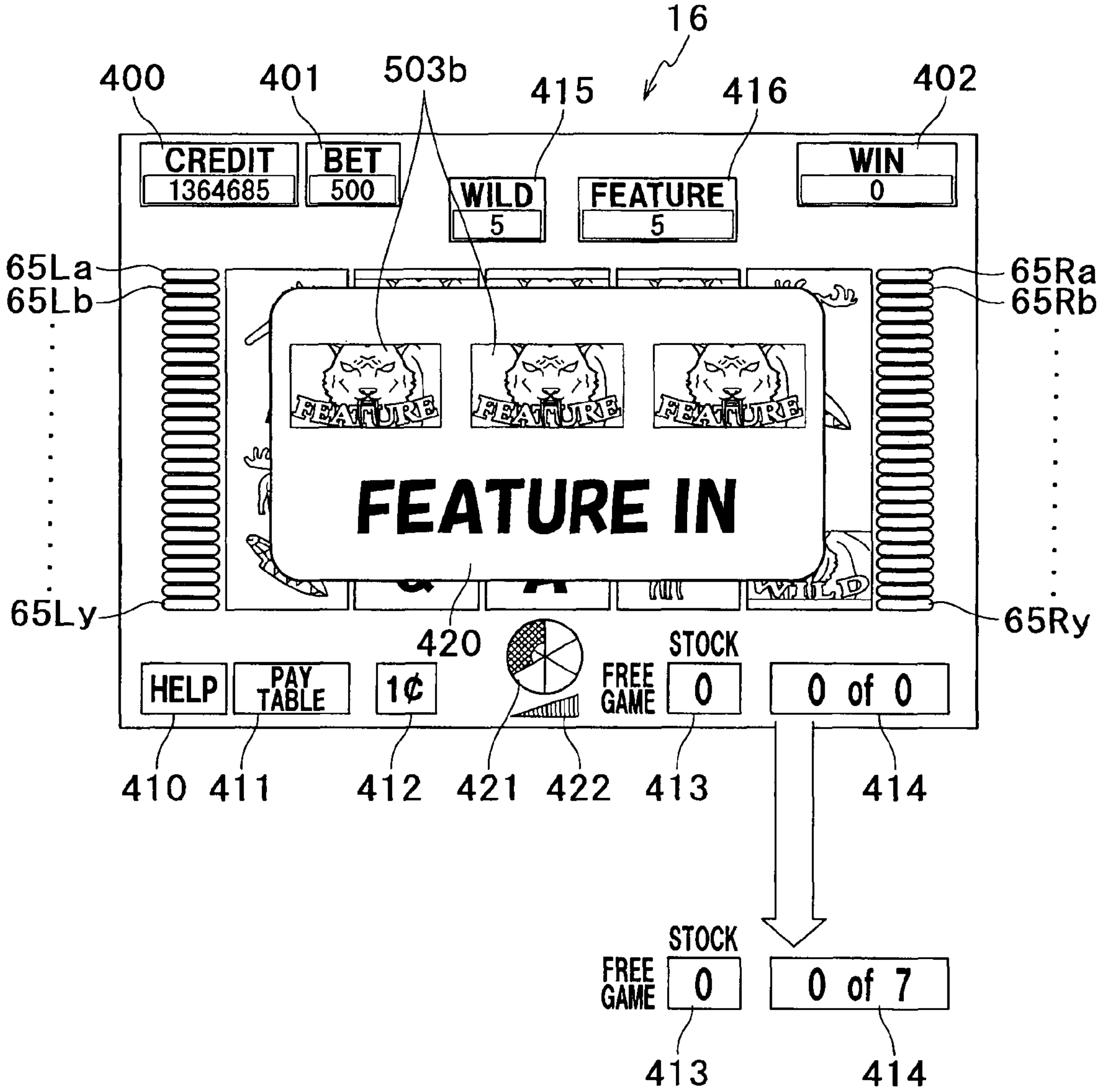
FIG. 21 is an explanatory diagram of a display status of the symbol display device.

FIG. 21 shows a screen displayed for a predetermined period after a winning of bonus. More specifically, the screen shows that a bonus is won with three trigger symbols 503*b* being rearranged. The trigger symbol 503*b* preferably has a readable text such as "FEATURE", so as to have a player clearly understand the symbol relates to a winning of bonus.

On this screen, a bonus-win screen 420 is displayed as a pop-up to notify a player of the winning of bonus using a symbol image and an image of text of "FEATURE IN." Then, at the same time as or immediately after displaying the bonus-win screen 420, the free game total number "0" of the free game repetition count display unit 414 is switched to "7." Thus, the player is able to know that he/she has won a bonus, and that the game will shift to a bonus game in which the free game is repeated seven times.

(Slot Game: Bonus Game Screen)

Figure 22:
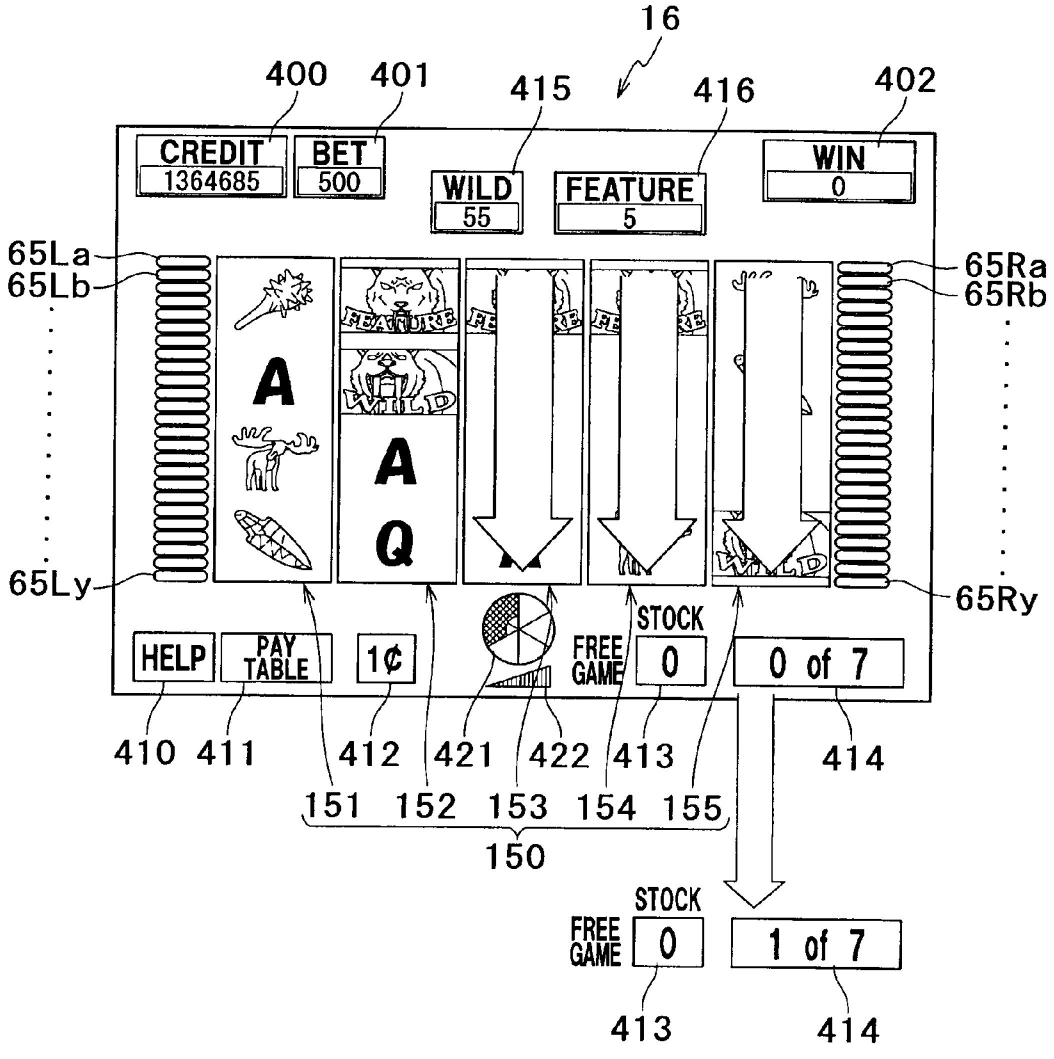
FIG. 22 is an explanatory diagram of a display status of the symbol display device.

FIG. 22 illustrates an example of a bonus game screen which is a screen displayed on the symbol display device 16 during the bonus game.

Specifically, the free game repetition count display unit 414 displays the free game total repetition count and the game repetition count of the current game. For example, the free game repetition count display unit 414 indicates that the first one of seven free games is running. Other operations are the same as those of the regular game.

(Crap Game Screen)

Figure 23:
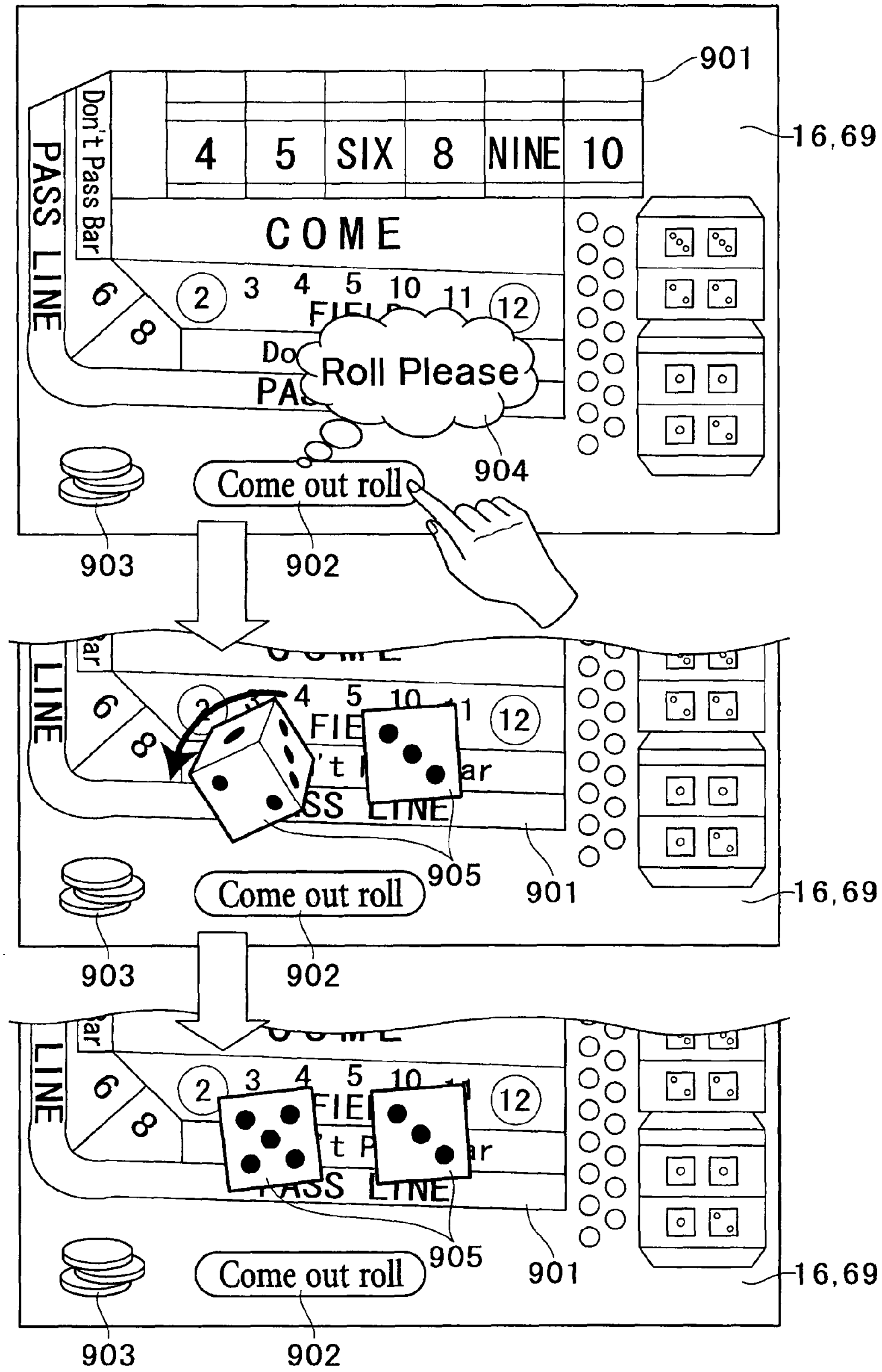
FIG. 23 is an explanatory diagram illustrating a display status of the symbol display device.

FIG. 23 is a display screen for a come-out roll or a point-roll. The screen for come-out roll or the point roll is displayed on the symbol display device 16 when a crap game is run, in place of the slot game screen illustrated in FIG. 20 and the like. Note that this display screen may be exclusively for a roll screen for the professional mode, or may be shared by the professional mode and the easy mode.

Specifically, the roll screen is displayed on the symbol display device 16 when the slot machine is designated to be the shooter. The come-out roll screen has display areas each for a crap game bet table 901 and for a roll button 902 provided below the bet table 901. Note that when the slot machine 10 is designated to be the shooter, the die image may be displayed on the upper image display panel 33.

The bet table 901 allows increase in the bet when the touch panel 69 is pressed. The roll button 902 changes its display mode such as a display color, brightness, shape, size, during the period where an additional bet can be made. Further, a roll screen of the easy mode may merely allow an automatic bet so as to simplify a bet operation. The roll button 902 has a text "Come out roll" displayed on a button face thereof to notify the status of a crap game if a come out roll is performed in the current crap game. Meanwhile, the roll button 902 has a text "Point roll" displayed on a button face thereof to notify the status of a crap game if a point roll is performed in the current crap game. The roll button 902 allows die images 905 to roll when the touch panel is pressed (roll operation). When the roll operation is performed, the die images 905 appear on the bet table 901, and is displayed in the form of a movie illustrating the die images 905 where each die images 905 is rolling, until a win or loss has been resulted in the crap game.

Further, the come-out roll screen has a display area for a balloon 909. The balloon 909 has the text "Roll Please" displayed therein. The balloon 909 appears only when the slot machine 10 is designated to be the shooter. The balloon 909 has functions of notifying the player that he/she is selected to be the shooter, and encourage him/her to perform the roll operation. Further, a shooter screen has a display area for a coin image 903 to a side of the roll button 902. The coin image 903 can increase/decrease the number of coins it shows, in accordance with the bet amount. Note that the coin image 903 may show one coin per one bet, or one coin per N (natural number) bet.

(Operations of Slot Machine 10: Regular Game Running Process)

Figure 27:
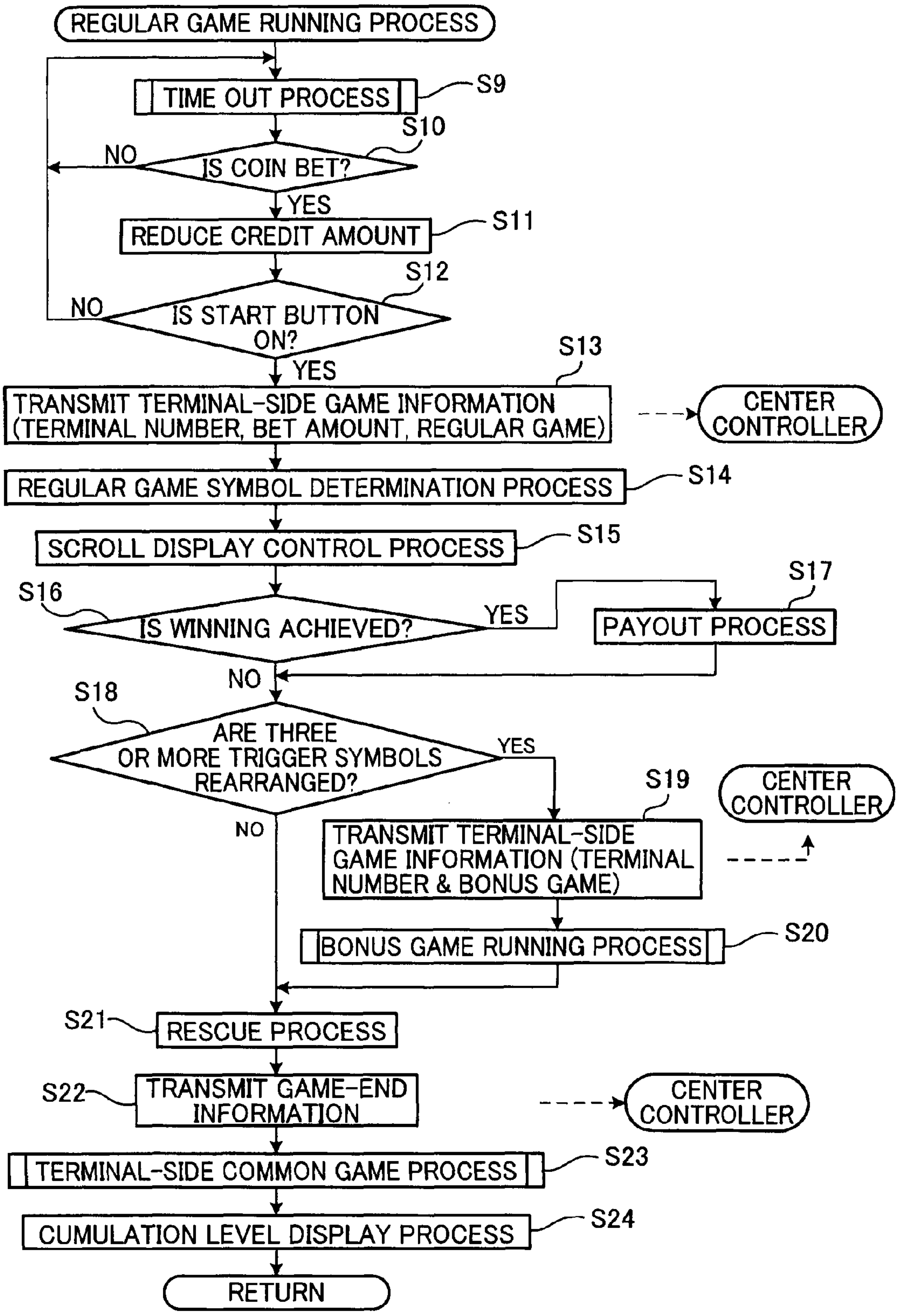
FIG. 27 is a flowchart illustrating a regular game running process.

The following describes an operation of the slot machine 10 having the above structure, with reference to FIGS. 27 to 33. The regular game running process shown in FIG. 27 is run by the main CPU 241 of the slot machine 10. Note that the slot machine 10 is started before this process.

As illustrated in FIG. 27, after running a later-described time-out process (S9), the main CPU 41 determines whether a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process returns to S10.

On the other hand in S10, when it is determined that a coin is bet, the main CPU 41 performs a process of reducing the credit amount stored in the RAM 43, by the number of coins having been bet (S11). Note that when the number of coins bet surpasses the credit amount stored in the RAM 43, the process of reducing the credit amount in the RAM 43 is not performed and the process returns S10. Further, if the number of coins bet surpasses the maximum number of coins bettable on one game (500 coins in this embodiment), the process of reducing the credit amount in the RAM 43 is not performed and the process moves to S12.

Next, the main CPU 41 determines whether the start button 23 is turned on (S12). In this process, the main CPU 41 determines whether an input signal is received, which signal is output from the start switch 23S when the start button 23 is pressed. When it is determined that the start button 23 is not turned on, the process returns to S10. Note that when the start button 23 is not turned on (e.g. when the start button 23 is not turned on, and an instruction to end the game is input), the main CPU 41 cancels the result from the reduction performed in S11.

Meanwhile, when it is determined that the start button is turned on in S12, the main CPU 41 transmits terminal-side game information to the center controller 200 (S13). Here, the terminal side game information includes such information as the machine number of the slot machine 10 which is the origin of the terminal side game information, the bet amount, and the regular game which indicates the type of the current game. Note that part of the bet amount is stored each time a base game is run, and serves as a resource of the crap game.

The main CPU 41 runs a regular game symbol determination process thereafter (S14). In the regular game symbol determining process, the main CPU 41 runs the symbol determination program stored in the RAM 43 to determine a code No. at the time of stopping the symbols. Specifically, the main CPU 41 obtains a random number, and determines the code No. for each symbol column at the time of stopping symbol columns in the display blocks 28, based on the random number obtained, and the regular game symbol table of FIG. 10.

As illustrated in FIG. 10, there are 14 wild symbols (also referred to as specific symbols) in the regular game symbol table. The wild symbol is a symbol substitutable for any symbol.

Next, in S15, the main CPU 41 performs a scroll display control process. This process is a display control whereby scrolling of symbols is started and symbols determined in S14 are rearranged thereafter.

Next, the main CPU 41 determines whether a winning is achieved (S16). In S16, the main CPU 41 counts the number of each type of symbols rearranged along the same payline L in S15, for each payline L. Then, the main CPU 41 determines whether there is a counted value which equals or surpasses "2."

When it is determined that a winning is achieved, the main CPU 41 performs a process related to coin payout (S17). In this process, the main CPU 41 refers to the odds data stored in the RAM 43, and determines the payout multiplying factor based on the number of certain symbols rearranged along a payline L. The odds data is data indicating the number of certain symbols rearranged along a single payline L and the associated payout multiplying factor (See FIG. 16). Note that the payout is doubled for every "WILD" arranged on a winning-achieved payline L. That is, if three "WILD" symbols are displayed along the winning-achieved payline L, the payout is eight times as much as the original payout amount.

The present embodiment deals with a case where it is determined that a winning is achieved when symbols arranged along a single payline L includes at least two symbols of the same type. The present embodiment however is not limited to this. For example, the paylines may be omitted from the present invention, and it is possible to determine that a winning is achieved when symbols rearranged in the display blocks 28 include at least two symbols of the same type.

When it is determined that a winning is not achieved in S16, or after the process of S17, the main CPU 41 determines whether three or more trigger symbols 503*b* are rearranged (S18). In this process, whether or not three or more trigger symbols 503*b* are rearranged in the display blocks 28 is determined, without taking into consideration the paylines L. When it is determined in S18 that three or more trigger symbols 503*b* are rearranged as illustrated in FIG. 21, the main CPU 41 transmits terminal-side game information to the center controller 200 (S19) before running a bonus game running process (S20). In the bonus game running process, the free game is run with an increased number of the wild symbols. The bonus game running process is detailed later.

When it is determined in S18 that fewer than three trigger symbols 503*b* are rearranged, or after S20, the main CPU 41 runs, when a predetermined rescue running condition has been met, a rescue process to rescue the player (S21).

Figure 30:
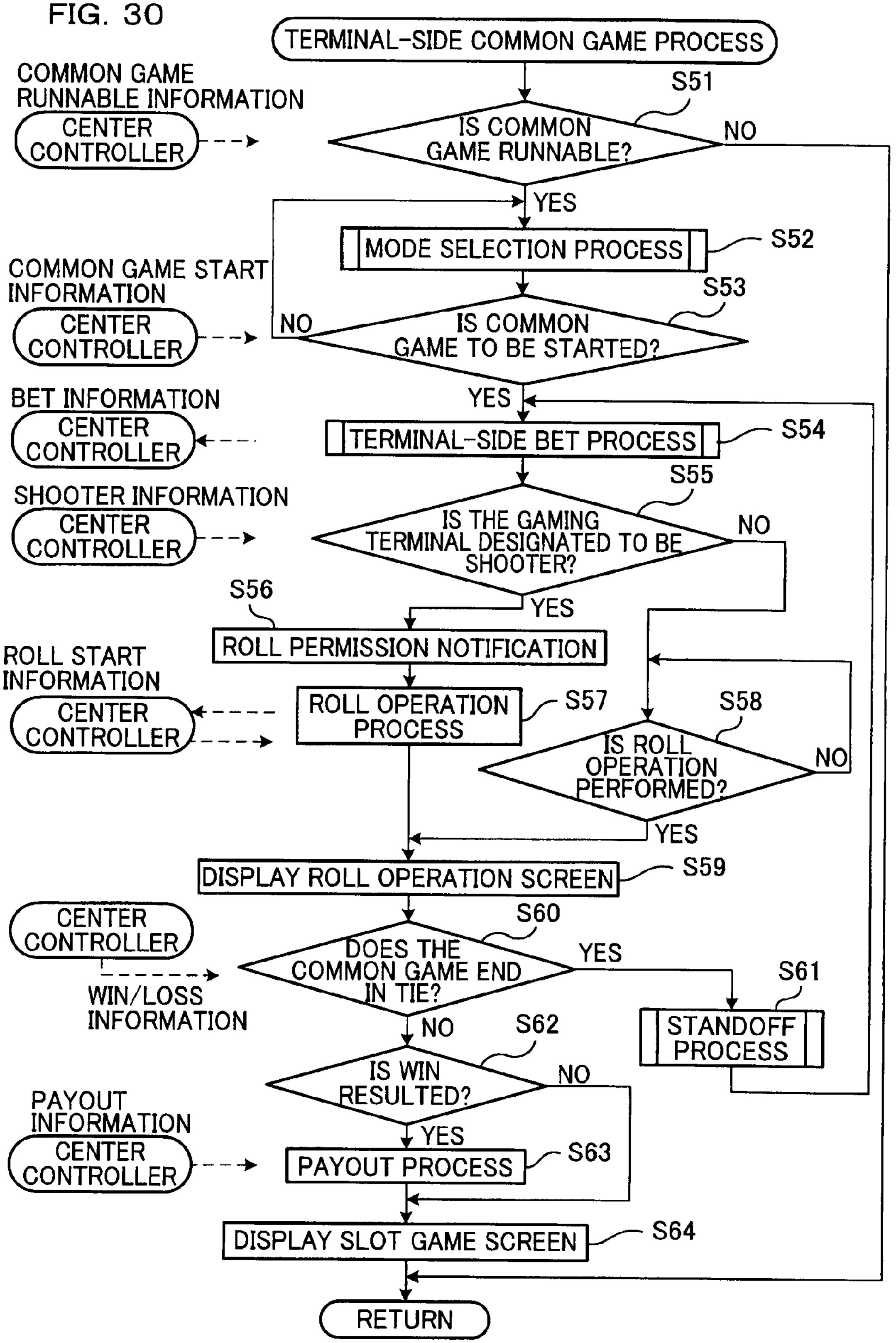
FIG. 30 is a flow chart illustrating a terminal side common game process.

After S21, the main CPU 41 transmits game end information as information for causing all the slot machines 10 to simultaneously start the common game (S22). A terminal-side common game process of FIG. 30 is run thereafter (S23). The main CPU 41 then performs an cumulation level display process (S24) before ending this sub routine.

In the cumulation level display process in S24, the cumulation level indicating the status of the cumulative value is analog-displayed in the cumulation level display unit 421, as illustrated in FIG. 25, the cumulation level increasing each time a unit game of the slot game is run. Thus, the cumulation level approaches to its full displaying status as unit games of the slot game are repeated. This causes the player to be conscious of the fact that he/she is close to meeting a condition which allows him/her to participate in the common game.

(Operations of Slot Machine 10: Time-Out Process)

Figure 28:
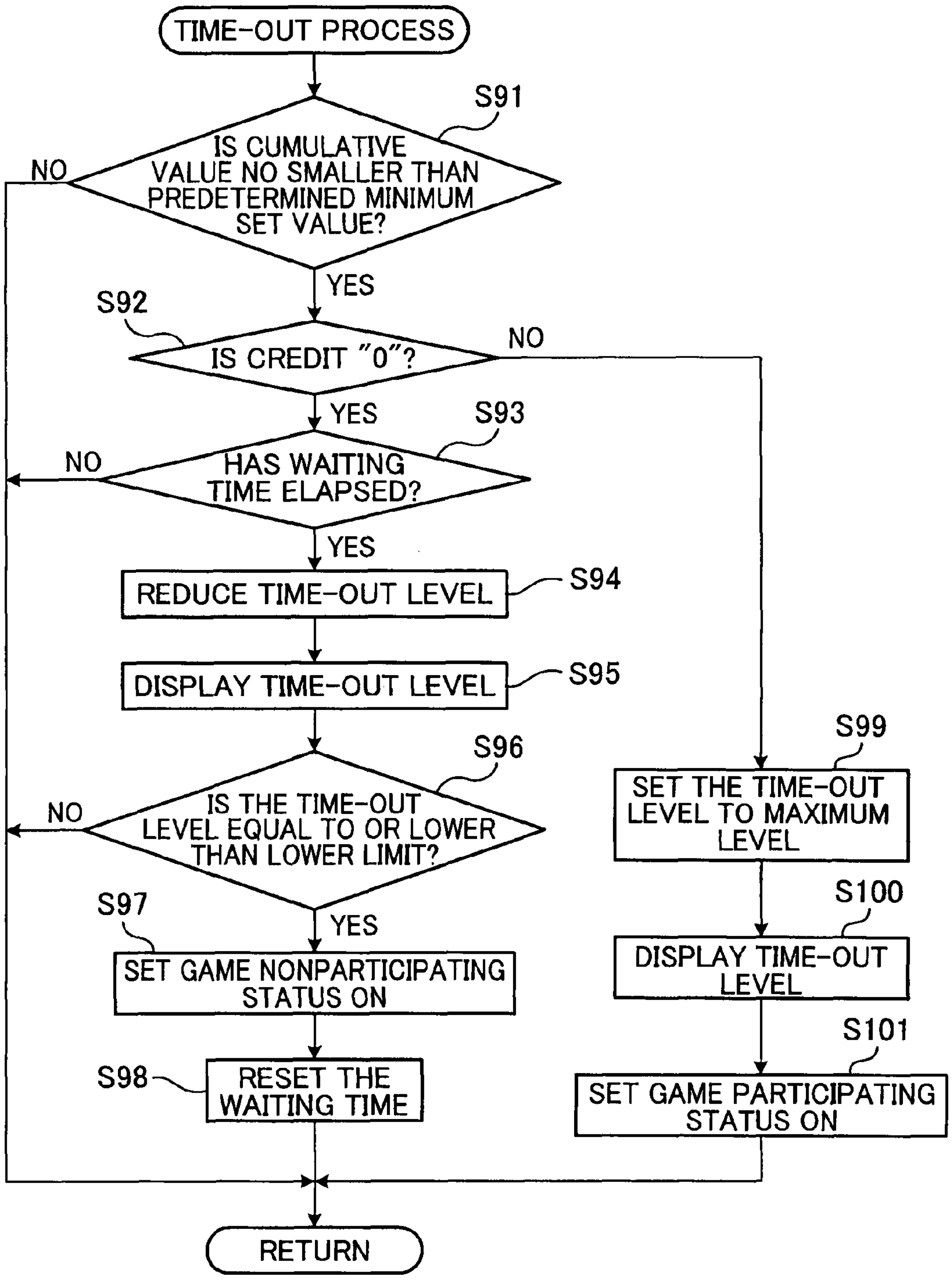
FIG. 28 is a flow chart illustrating a time-out process.

Next, the following describes a time-out process carried out in the above mentioned step S9, with reference to FIG. 28. First, it is determined whether the cumulative value equals or surpasses the minimum set amount (S91). When the cumulative value is smaller than the minimum set value (S91, NO), this routine ends and the process is brought back to the regular game running process of FIG. 27. Meanwhile, when the cumulative value equals or surpasses the minimum set value (S91, YES), it is subsequently determined whether the credit amount is "0" (S92). When the credit is not "0" (S92, NO), the time-out level is set at a maximum value (S99), and the maximum time-out level is displayed (S100). Afterwards, the mode is switched to a game-participating state, that is, a mode which allows participation in the common game (S101), before this routine ends.

Meanwhile, when the credit is "0" (S92, YES), it is subsequently determined whether a predetermined waiting time has elapsed (S93). When the predetermined waiting time has not elapsed (S93, NO), this routine ends. When the predetermined waiting time has elapsed (S93, YES), the time-out level is reduced by one level (S94), and the reduced time-out level is displayed (S95).

Next, it is determined whether the time-out level is equal to or lower than a lowest value (S96). When the time-out level is not equal to or lower than the lowest value (S96, NO), this routine ends. Meanwhile, when the time-out level is not equal to or lower than the lowest value (S96, YES), the mode is switched to a game non-participating status, that is, a mode where participation in the common game is not allowed (S97). Then, the waiting time is reset (S98) before this routine ends.

(Operations of Slot Machine 10: Bonus Game Running Process)

Figure 29:
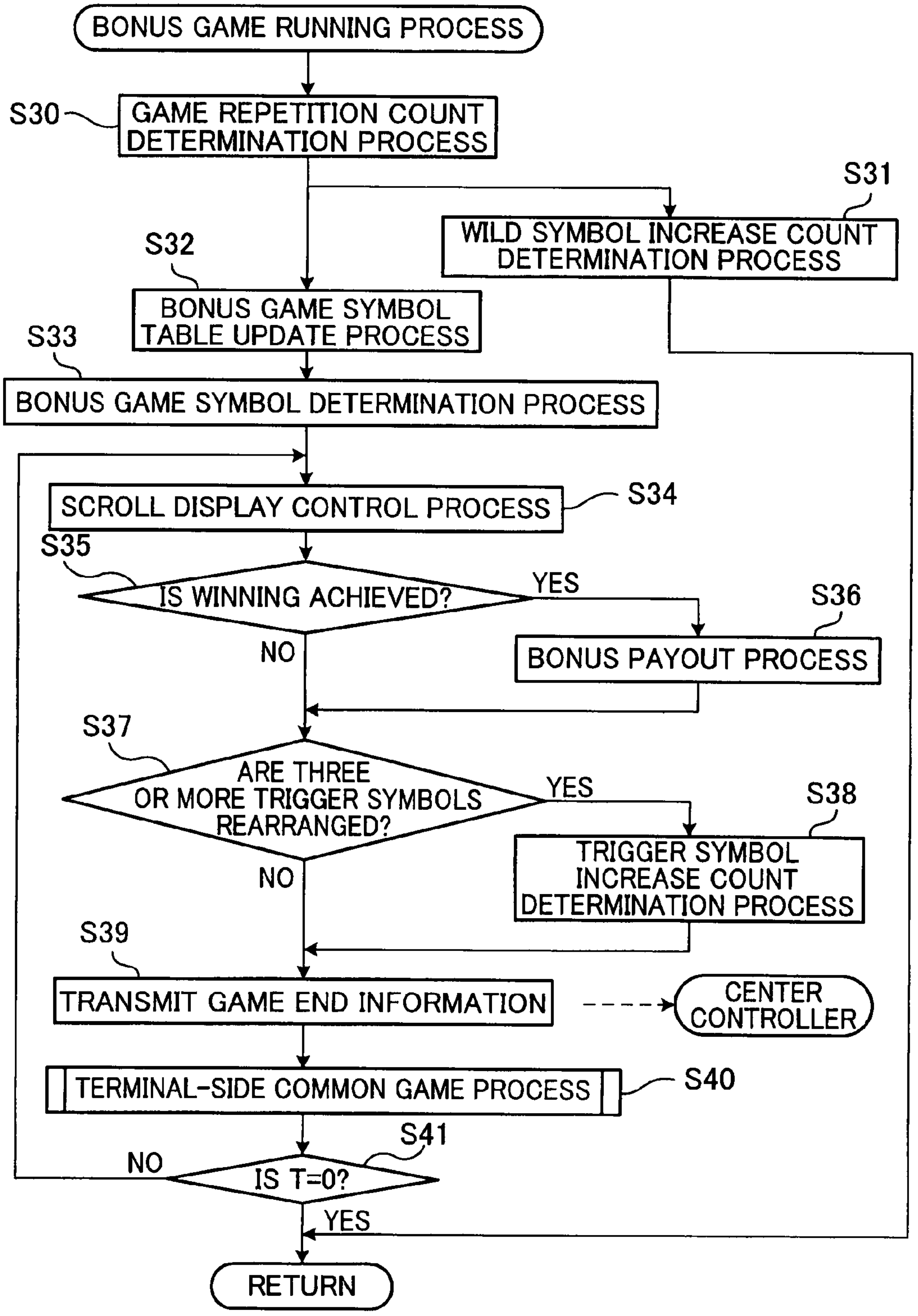
FIG. 29 is a flowchart illustrating a bonus game running process.

Next, the following describes the bonus game running process with reference to FIG. 29. A bonus game is a game which allows the player to play a game without betting a coin.

First, the main CPU 41 sets a remaining free game repetition count T to T=F1 (=specific number of times=7) in the free game repetition count recording region of the RAM 43 (S30). Further, the main CPU 41 causes the bonus-win screen 420 to be displayed as a pop-up on the symbol display device 16, as illustrated in FIG. 21.

Next, the main CPU 41 carries out a wild symbol increase count determining process (S31). Specifically, when three or more trigger symbols 503*b* are rearranged, a random number is obtained first. Then, a total increase in the number of wild symbols is determined based on that random number and the wild symbol increase count determination table. Then, the number of wild symbols is increased stepwise, or increased at once.

Further, the main CPU 41 carries out a bonus game symbol table updating process (S32). In the bonus game symbol table updating process, the main CPU 41 updates the bonus game symbol table based on an increase in the number of wild symbols determined in the wild symbol increase count determining process.

Next, the main CPU 41 carries out a bonus game symbol determining process (S33). In the bonus game symbol determining process, the main CPU 41 determines a code No. at the time of stopping the symbols, by running the symbol determination program stored in the RAM 43. More specifically, the main CPU 41 obtains random numbers, and determines the code No. of each symbol column of the display blocks 28, at the time of stopping the symbols, based on the random numbers obtained, and the bonus game symbol table.

Next, in S34, the main CPU 41 performs a scroll display control process. This process is a display control whereby scrolling of symbols is started and symbols determined in S33 are rearranged thereafter.

Next, the main CPU 41 determines whether a winning is achieved (S35). In the present embodiment, a winning is achieved when symbols rearranged along a payline L includes at least two symbols of the same type, as described above. The "WILD" which is the wild symbol is a symbol substitutable for any type of symbol. In the bonus game, the number of wild symbols is increased compared to that of the regular game. Therefore, the probability of winning is higher than the regular game.

In S35, the main CPU 41 counts the number of each type of symbols rearranged along the same payline L in S34. Then, the main CPU 41 determines whether there is a counted value which equals or surpasses "2."

When it is determined that a winning is achieved, the main CPU 41 performs a process related to coin payout (S36).

When it is determined that a winning is not achieved in S35, or after the process of S36, the main CPU 41 determines whether three or more trigger symbols 503*b* are rearranged (S37). In this process, whether or not three or more trigger symbols 503*b* are rearranged in the display blocks 28 is determined, without taking into consideration the paylines L. In S38, when it is determined that three or more trigger symbols 503*b* are rearranged, the main CPU 41 executes the trigger symbol increase count determining process, adds "1" to the bonus game stock number (carry-over number), and displays the stock number on the stock display unit 413.

The main CPU 41, as in the case of the regular game, transmits game end information as information for causing all the slot machines 10 to start running the common game simultaneously at all the slot machines 10 (S39). Then, the terminal-side common game process of FIG. 30 is run (S40). Thus, all slot machines 10 which are running the bonus game start the common game at a timing that a unit game of the bonus game has ended. For instance, when one or more slot machines 10 running the regular game and another one or more slot machines 10 running the bonus game coexist, all the slot machines 10 start running the common game at a timing that a unit game of the regular game and a unit game of the bonus game have ended.

Next, the main CPU 41 determines whether the remaining free game repetition count (T) is "0," based on the remaining game repetition count data stored in the free game repetition count recording region of the RAM 43 (S41). When it is determined that the remaining free game repetition count (T) is not "0," the main CPU 41 brings the process back to S34. Meanwhile, when it is determined that the remaining time (T) is "0," the main CPU 41 ends the routine on condition that the carry-over number of the bonus game is "0." When the bonus game carry-over number is not "0," the bonus game is run until the carry-over number becomes "0."

(Operations of Slot Machine 10: Terminal-Side Common Game Process)

In the regular game running process or the bonus game running process, when the terminal-side game process is run, it is first determined whether the common game is runnable, based on common game runnable information from the center controller 200 (S51), as illustrated in FIG. 30. When it is determined that the common game is unrunnable (S51, NO), the routine ends and the regular game or bonus game continues.

Meanwhile, when the common game is runnable (S51, YES), a mode selection process is carried out, where a game mode is selected between the professional mode and the easy mode (S52). Thereafter, it is determined whether to start the common game, based on common game start information from the center controller 200 (S53). When the common game is not started (S53, NO), S52 is repeated to cause a stand-by state while the come-out roll screen is being displayed.

When the common game is started (S53, YES), a terminal-side betting process is subsequently run (S54). Next, based on shooter information from the center controller 200, it is determined whether the slot machine 10 is designated to be the shooter (S55). When the slot machine 10 is not designated to be the shooter (S55, NO), it is determined whether a roll operation is performed, based on roll start information from the center controller 200 (S58). When no roll operation is performed (S58, NO), S58 is repeated to cause a stand-by state. When a roll operation is performed (S58, YES), a roll operation image is displayed (S59). Note that a moving image is displayed on the common display device 700, in which moving image the die images 704 appear and roll, as illustrated in FIG. 24.

Meanwhile, when the slot machine 10 is designated to be the shooter (S55, YES), a shooter designation image appears, the shooter designation image notifying the player that the slot machine 10 is designated to be the shooter (S56). Note that as illustrated in FIG. 23, the shooter designation image may be a balloon image 904. Thus, the player can recognize that he/she is designated to be the shooter, by visually confirming the shooter designation image. Then, when the player presses the roll button 902, the roll operation is performed, and the roll start information is transmitted to the center controller 200 (S57). Afterwards, a moving image is displayed on the symbol display device 16, in which moving image the die images 905 appear and roll (S59). Note that the display of the moving image continues until a win or loss is resulted in the crap game.

Next, it is determined whether the crap game ends in a tie, based on win/loss information from the center controller 200

(S60). When the crap game ends in a tie (S60, YES), a standoff process is run (S61). Then, step S54 is repeated.

Figure 39:
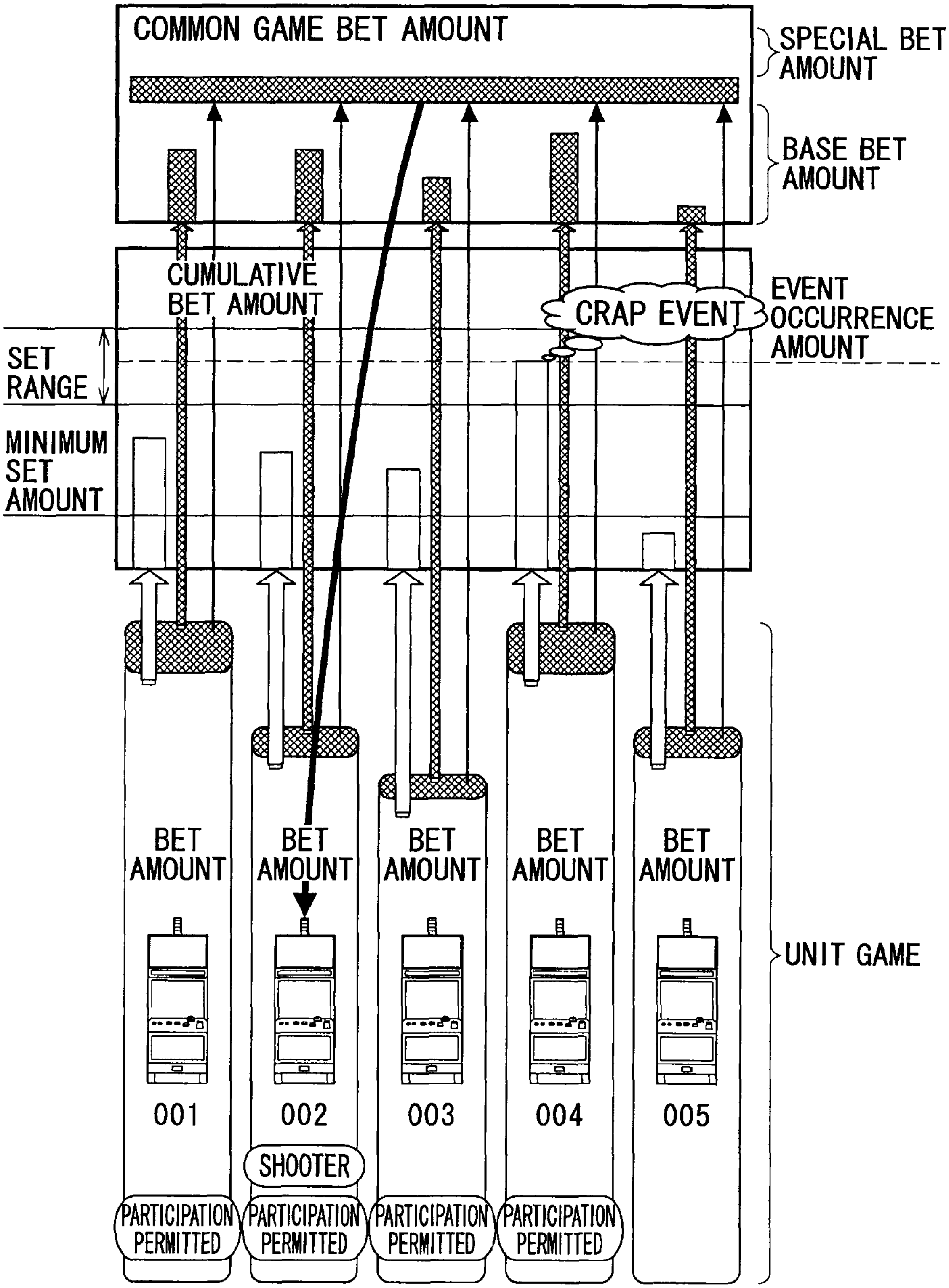
FIG. 39 is an explanatory diagram of a cumulation process of a common game bet amount.

Meanwhile, when the crap game does not end in a tie (S60, NO), it is subsequently determined whether a win is resulted from the crap game (S62). When it is determined that no win is resulted (S63, NO), it is determined that a loss is resulted from the crap game, and the screen is brought back to the slot game screen displayed immediately before the crap game had begun, such as the regular game or the bonus game (S64), and this routine ends. Meanwhile, when the crap game results in a win (S62, YES), a payout process is performed based on payout information from the center controller 200. In other words, as illustrated in FIGS. 1 and 39, a payout process is performed, where a payout is awarded, which payout is an amount where the base bet amount on the common game multiplied by a predetermined multiplying factor such as two. Further, when the slot machine 10 is designated to be the shooter, an amount corresponding to the special bet amount is paid out (S63). The screen is returned to the slot game screen which is displayed in the regular game or the bonus game immediately before the game shifts to the crap game (S64) before this routine ends.

(Operations of Slot Machine 10: Mode Selection Process)

Figure 31:
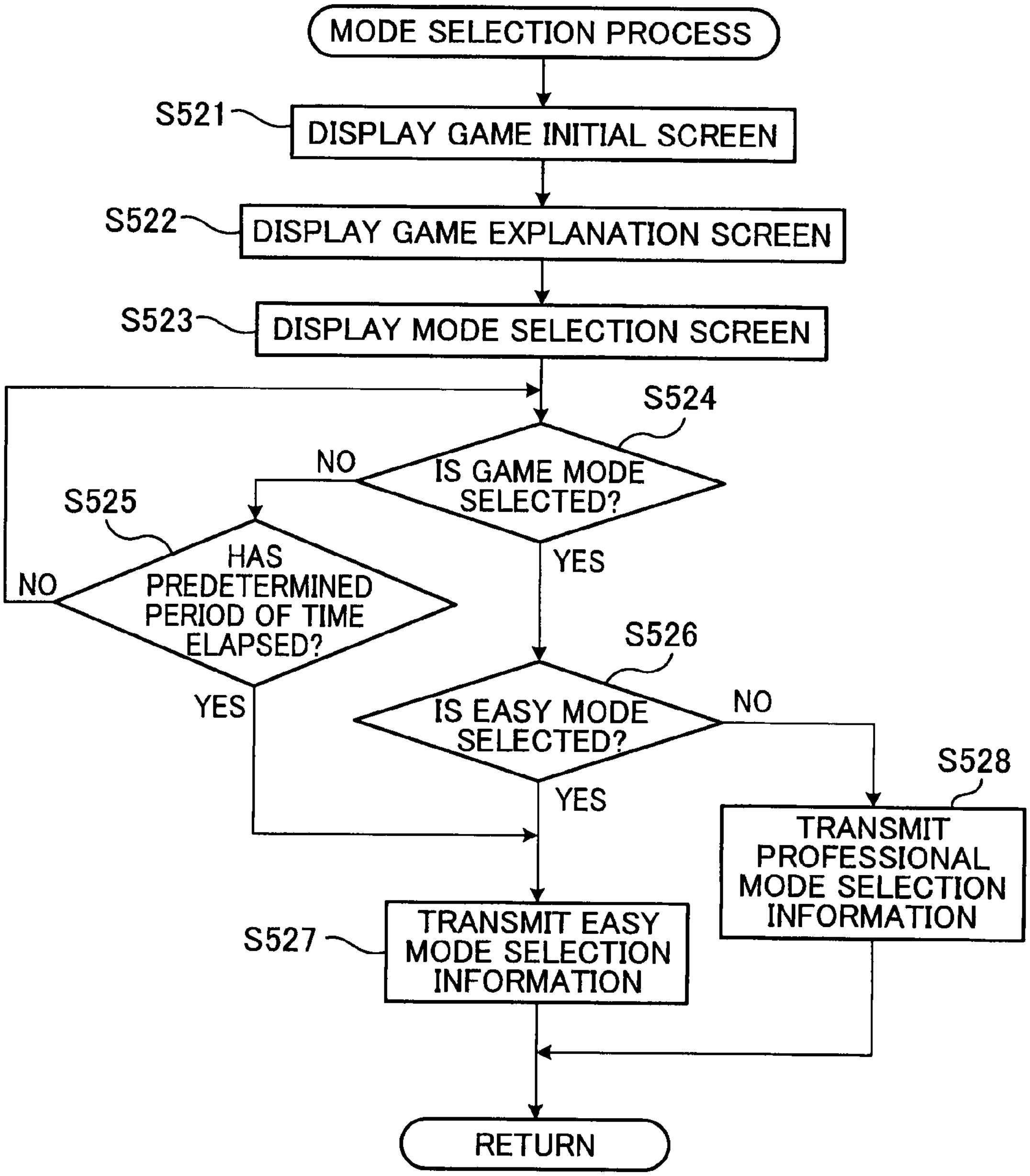
FIG. 31 is a flow chart illustrating a mode selection process.

In the terminal-side common game process in S52, when the mode selection process is run, a game initial screen is displayed as illustrated in FIG. 31 (S521). A game explanation screen is displayed after a certain period of time (S522) before a mode selection screen is displayed (S523).

Next, it is determined whether a mode selection is performed (S524). When no mode selection is performed (S524, NO), it is determined whether a predetermined period of time has elapsed (S525). When the predetermined period of time has not elapsed (S525, NO), 5524 is repeated. Meanwhile, when the predetermined period of time has elapsed (S525, YES), the easy mode is automatically selected, and easy mode selection information is transmitted, the information indicating that the easy mode is selected (S527) before this routine ends.

Meanwhile, when a mode selection is performed within the predetermined period of time (S524, YES), it is sequentially determined whether the mode selected is the easy mode (S526). When the mode selected is the easy mode is selected (S526, YES), easy mode selection information is transmitted (S527) before this routine ends. Meanwhile, when the mode selected is not the easy mode (S526, NO), professional mode selection information is transmitted (S528) before this routine ends.

(Operations of Slot Machine 10: Terminal-Side Bet Process)

Figure 32:
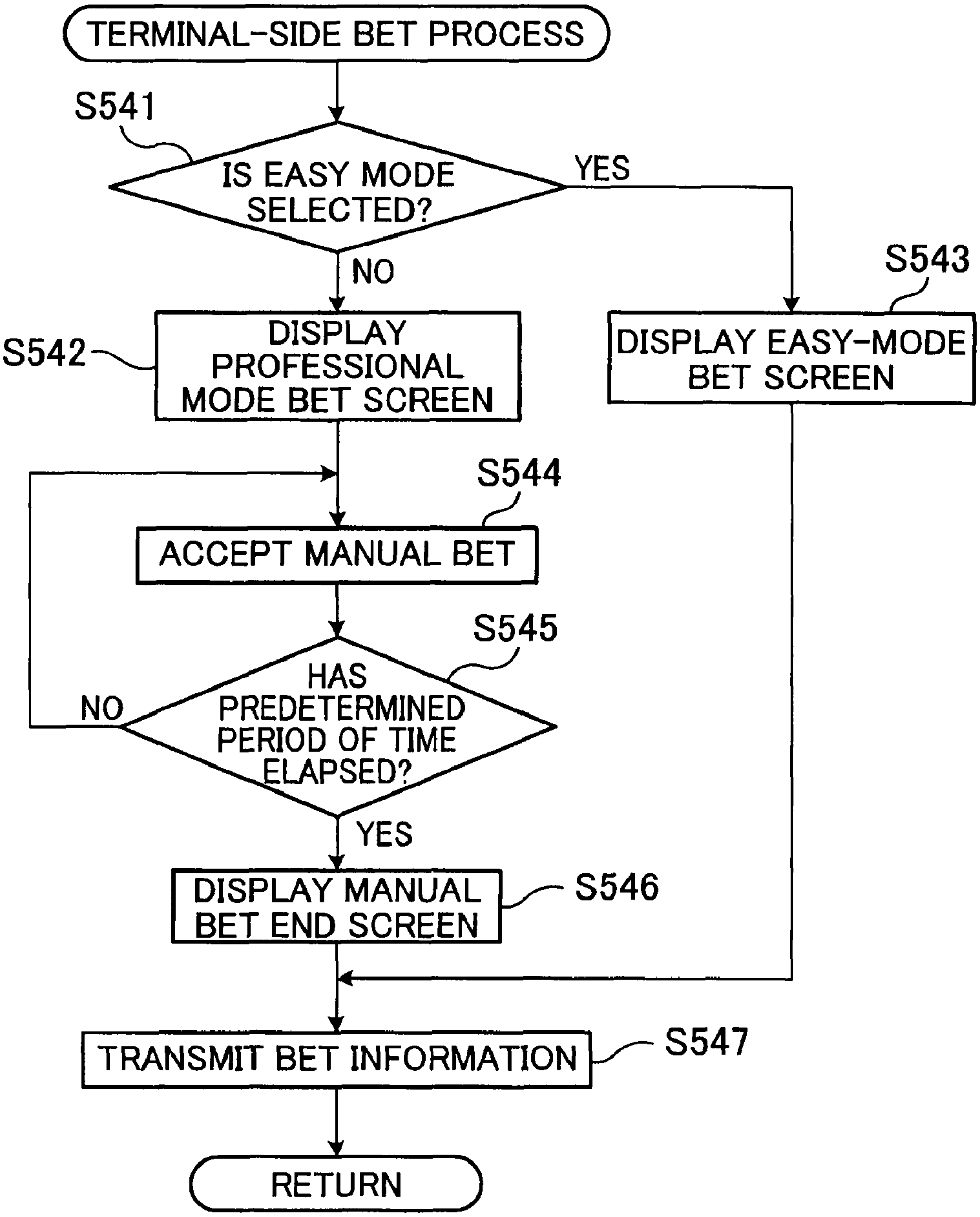
FIG. 32 is a flow chart illustrating a terminal-side bet process.

When the terminal-side bet process is run in step S54 of the terminal-side common game process, it is determined whether the easy mode is selected, as illustrated in FIG. 32 (S541). When the easy mode is selected (S541, YES), an easy-bet screen is displayed, which easy-bet screen allows a beginner to easily carry out a bet operation (S543). Note that the easy-bet screen may merely allow an automatic bet operation, or may switch from a manual bet operation to an automatic bet operation after a certain period of time. Afterwards, bet information related to an automatic or manual bet operation on the easy-bet screen is transmitted (S547), before this routine ends.

Meanwhile, when the easy mode is not selected (S541, NO), a professional bet screen is displayed, which professional bet screen is suitable for a skilled player who is familiar with the game (S542). Afterwards, a manual bet is accepted (S544), and it is determined whether a predetermined period of time has elapsed (S545). When the predetermined period of time has not elapsed (S545, NO), step S544 is repeated. When the predetermined period of time has elapsed (S545, YES), a manual bet end screen is displayed (S546). When a manual bet has been placed under such a circumstance, the manual bet amount placed is maintained. Meanwhile, when a manual bet operation has not been carried out, an automatic bet is placed. Afterwards, bet information related to an automatic or manual bet operation on the professional bet screen is transmitted (S547) before this routine ends.

Figure 33:
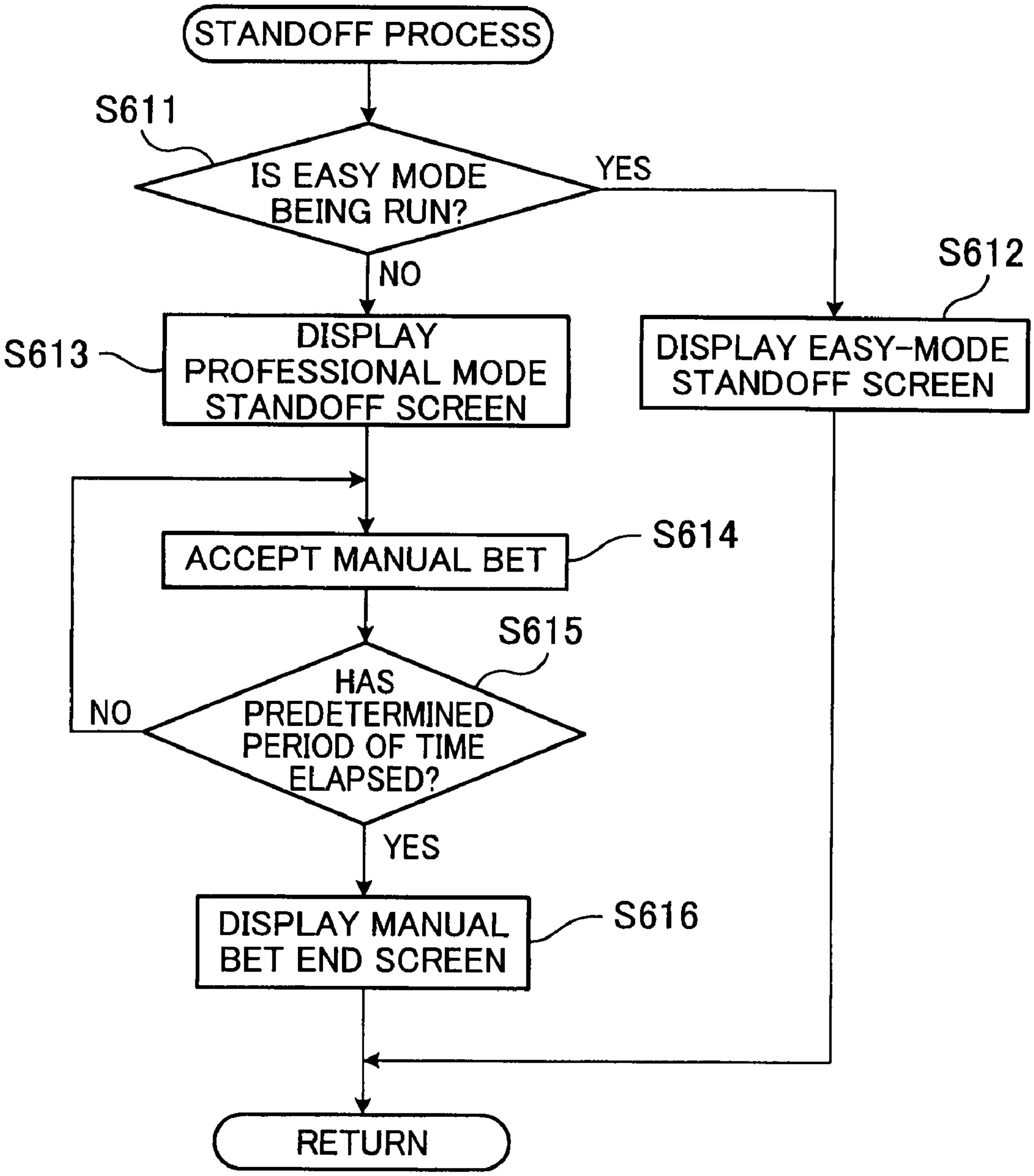
FIG. 33 is a flow chart illustrating a standoff process.

(Operations of Slot Machine 10: Standoff Process) When a standoff process is carried out in step S61 of the terminal-side common game process, it is determined whether the easy mode has been selected, as illustrated in FIG. 33 (S611). When the easy mode has been selected (S611, YES), an easy-standoff screen is displayed (S612) before this routine ends.

Meanwhile, when the easy mode has not been selected (S611, NO), it is determined that the professional mode has been selected, and a professional standoff screen is displayed (S613). Afterwards, a manual bet is accepted (S614), and it is determined whether a predetermined period of time has elapsed (S615). When the predetermined period of time has not elapsed (S615, NO), step S614 is repeated. Then, after the predetermined period of time has elapsed (S615, YES), the manual bet end screen is displayed (S616) before this routine ends.

(Process Operation of the Center Controller 200: Center-Side Common Game Process)

Figure 34:
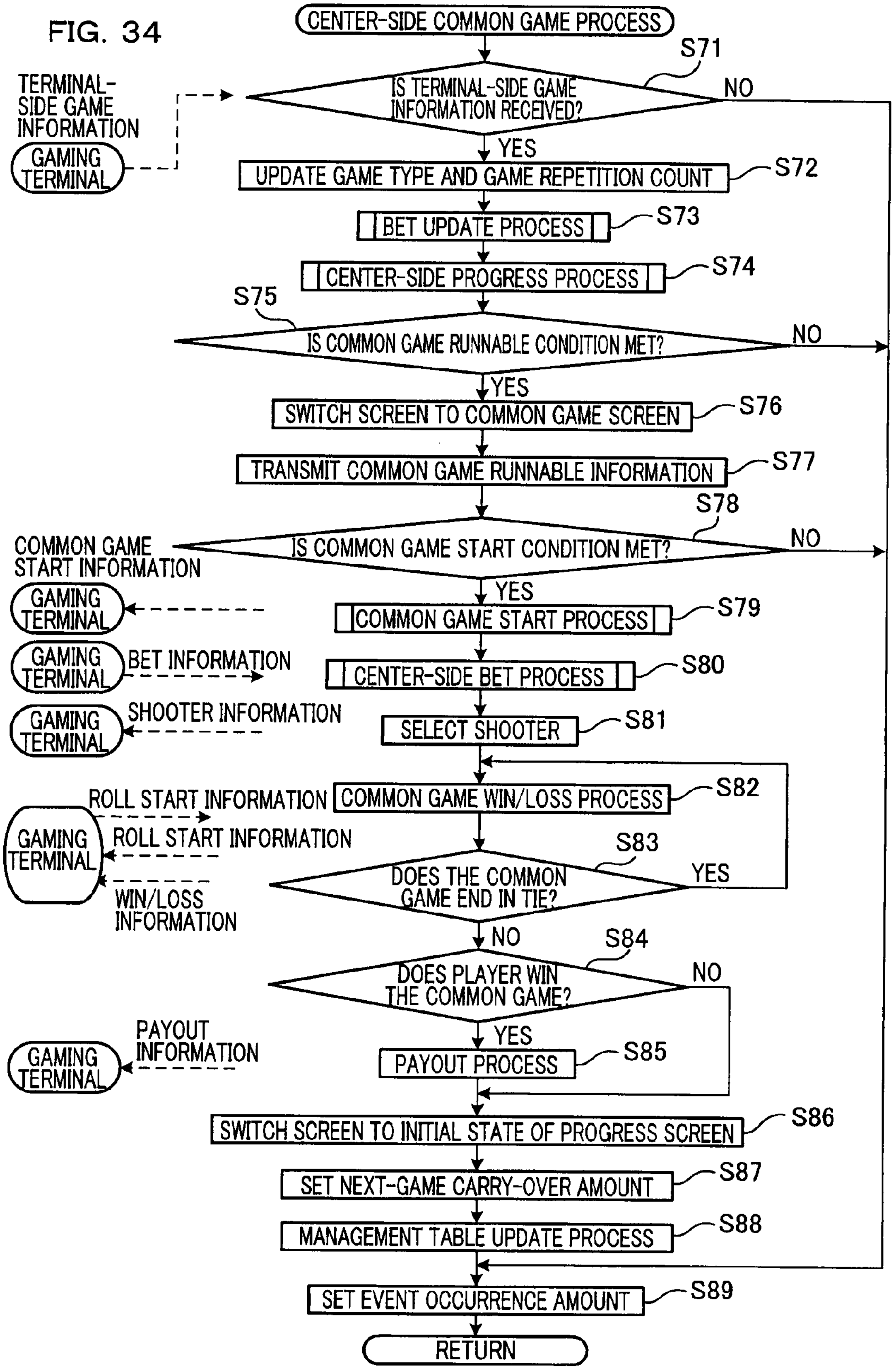
FIG. 34 is a flow chart illustrating a center-side common game process.

As illustrated in FIG. 34, the center controller 200 runs the center-side common game process while performing data communication between each of the slot machines 10. Specifically, it is first determined whether terminal-side game information from each of the slot machines 10 is received (S71). When no terminal-side game information is received (S71, NO), this routine ends. Meanwhile, when the terminal-side game information is received (S71, YES), various types of information included in the terminal-side information is retrieved, and a gaming terminal management table of FIG. 17 is updated, which various types of information includes a game type, a game repetition count, the machine number, and the bet amount (S72).

Afterwards, a bet update process is carried out, and a part of a bet amount is stored for each bet amount Sn on the base game each time a base game is run, and the stored amount serves as a resource of a bet on a cap game and a payout of the crap game (S73).

Figure 35:
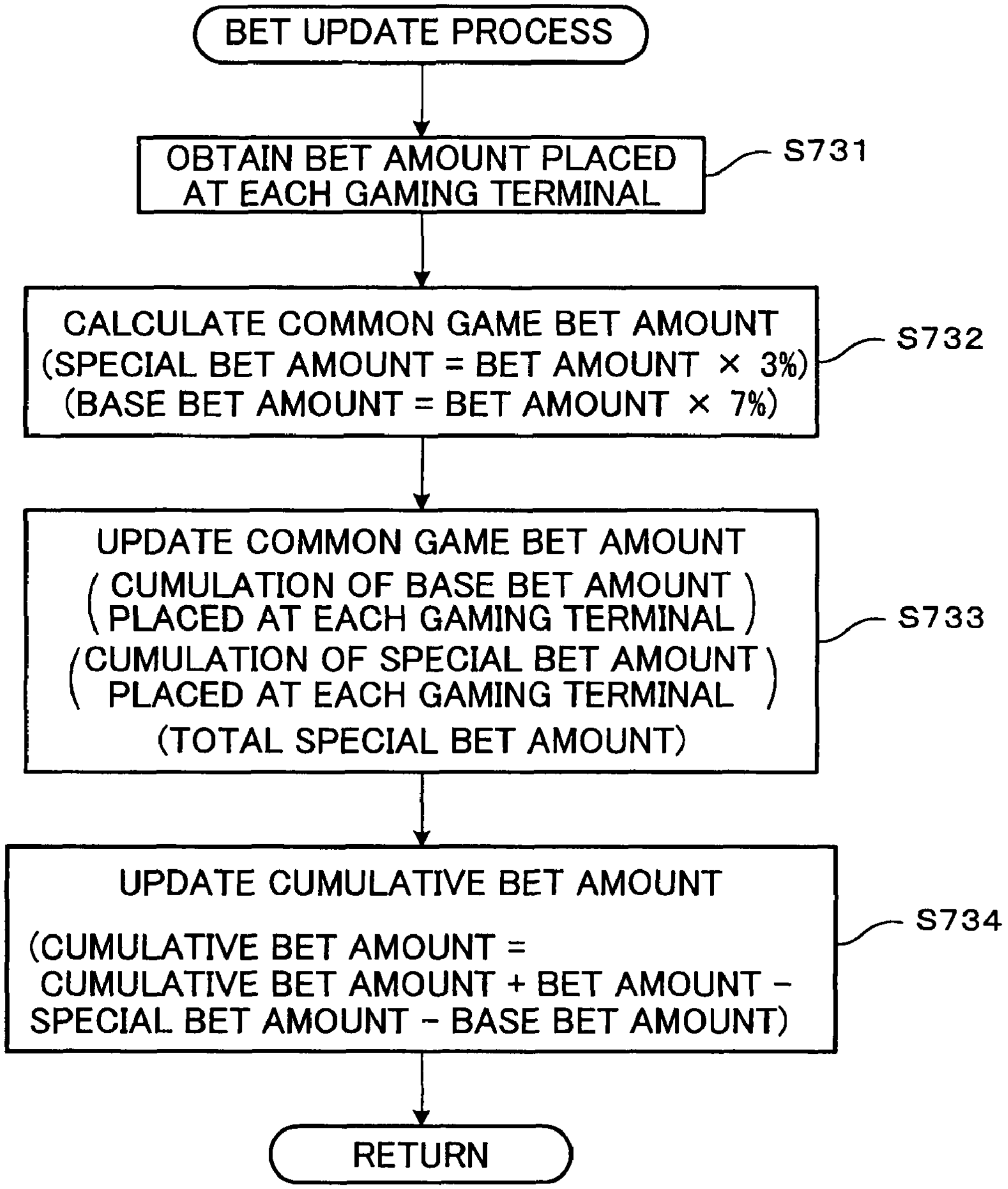
FIG. 35 is a flow chart illustrating a bet update process.
Figure 36:
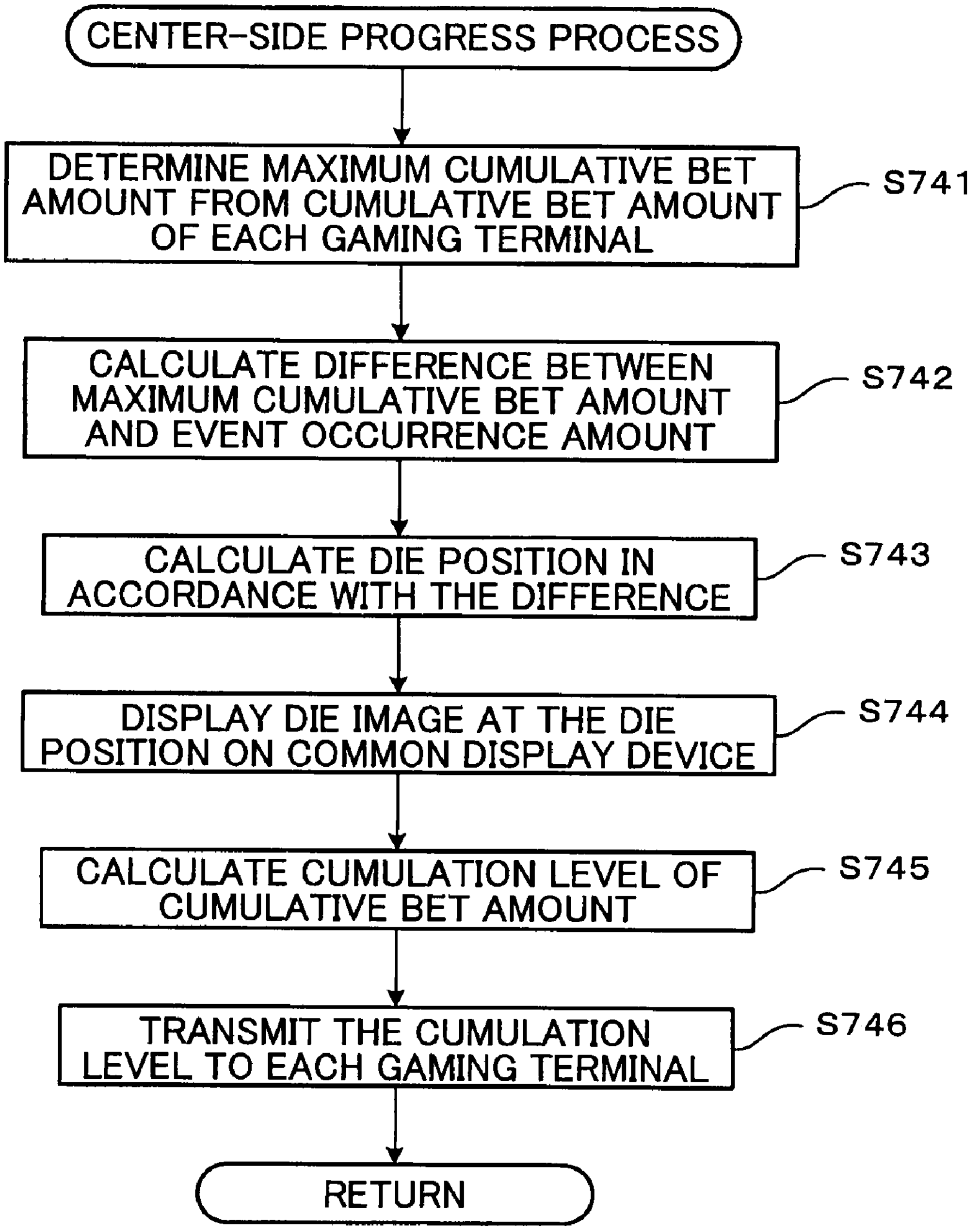
FIG. 36 is a flow chart illustrating a center-side progress process.

Specifically, as illustrated in FIGS. 35 and 39, a bet amount Sn at each slot machine 10 is obtained (S731). Then, a common game bet amount is calculated (S732). For example, the bet amount Sn is multiplied by 3% to produce an individual special bet amount Cn. The bet amount is multiplied by 7% to produce a base bet amount Dn. Note that n is a number corresponding to each slot machine 10. There are five slot machines 10 in the present embodiment, thus n represents one of the numbers 1 to 5. For instance, n corresponding to the slot machine 10 allotted machine number "001" represents 1.

Accordingly, the bet amount placed on the common game is automatically determined in accordance with the cumulative bet amount (cumulative value) which is a total bet amount placed on the base game. In other words, the bet amount placed and a payout awarded at the slot machine 10 where small cumulative bet amounts have been placed on the base game are small. In the present embodiment, a slot machine 10 where cumulative bet amounts placed is smaller than a minimum set value is not qualified to participate in the common game. Thus, a slot machine 10 which would be in a disadvantageous state in the common game is denied participation in the common game.

Afterwards, a common game bet amount Tn is updated. In other wards, a cumulative value of the base bet amount Dn at each slot machine 10 is updated. A cumulative value of an individual special bet amount Cn of each slot machine 10 is updated. Further, a special bet total amount G is updated, which is a total amount of individual special bet amounts Cn (S733). Then, the cumulative bet amount Bn is updated based on the following equation: cumulative bet amount Bn=cumulative bet amount Bn+bet amount Sn−individual special bet amount Cn−base bet amount Dn (S734). In short, the bet amount Sn is cumulatively stored as the cumulative value (cumulative bet amount Bn), in the common game management table illustrated in FIG. 18. Note that the equation for the cumulative bet amount is not limited to the above. The equation may be as follows: cumulative bet amount Cn=cumulative bet amount Cn+bet amount Sn.

Figure 40:
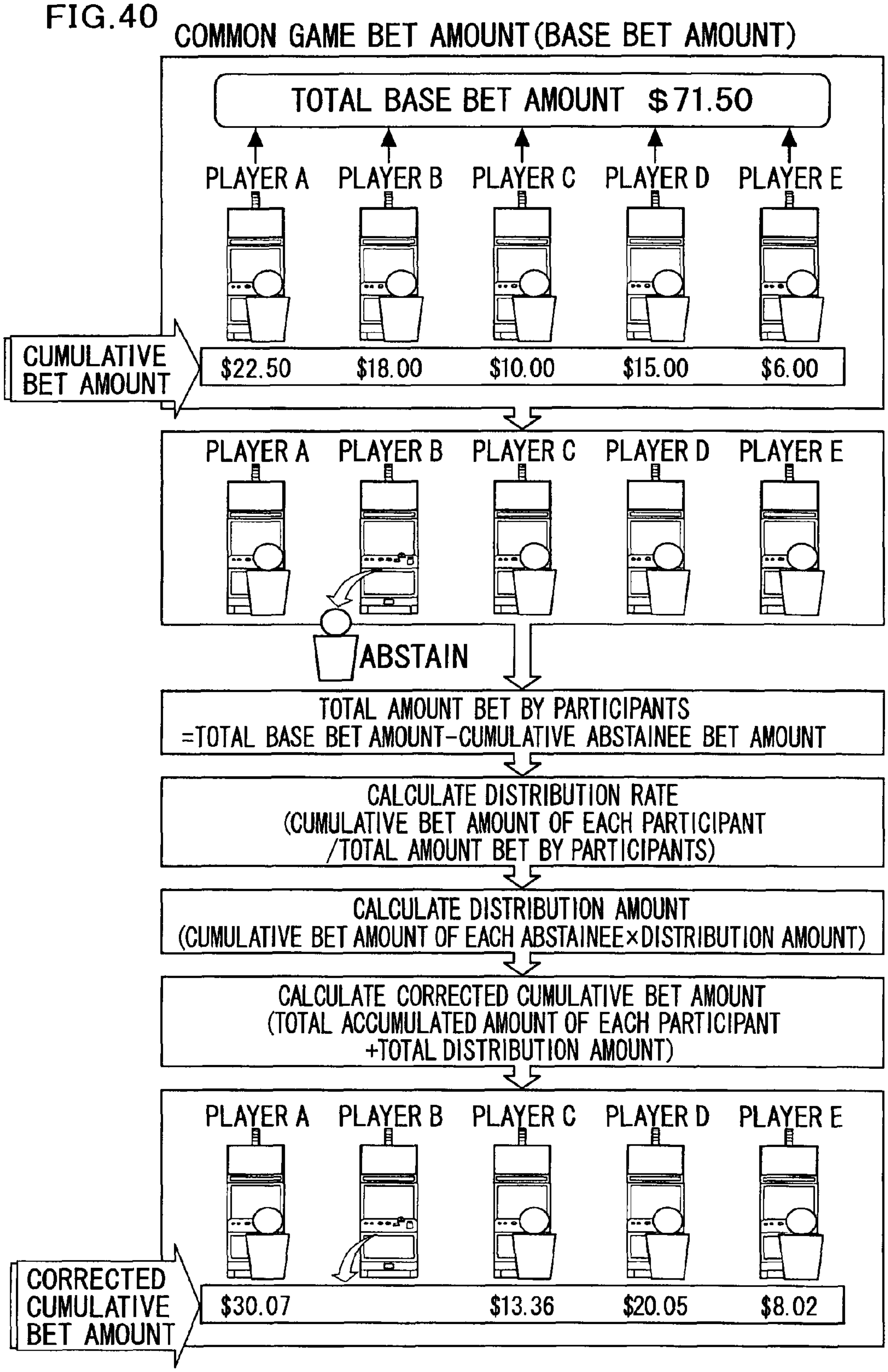
FIG. 40 is an explanatory diagram of a calculation process of a corrected cumulative bet amount.

Note that the player may not desire to participate in the crap game. Accordingly, the gaming machine allows a player to abstain at the will of the player. Then, when the player abstains from the crap game, the cumulative bet amount Bn is corrected, following the procedure illustrated in FIG. 40.

Specifically, first, a total cumulative bet amount Bn at all the slot machines 10 is summed to obtain a base bet total amount of $71.50. Then, a total bet amount placed by participants (hereinafter also referred to as "participant total amount") is calculated by the equation participant total amount=base bet total amount−cumulative bet amount Bn by an abstained player (hereinafter also referred to as "abstainer cumulative bet amount Bn). Then, a total bet amount placed by participants (hereinafter also referred to as "participant total amount") is calculated by the equation participant total amount=base bet total amount−cumulative bet amount Bn by an abstained player (hereinafter also referred to as "abstainer cumulative bet amount Bn"). Afterwards, a cumulative bet amount Bn placed by each participant is divided by the participant total amount to calculate a division ratio. Then, the abstainer cumulative bet amount Bn is multiplied by the division ratio to calculate an amount to be distributed to each participant.

Thus, for instance, suppose that players A, B, C, D, and E each play a slot game at different slot machines 10 at which cumulative bet amounts Bn of "22.50, $10.00, $10.00, $15.00, and $6.00 are respectively placed. When player B abstains from the crap game, corrected cumulative bet amounts Bn placed at the slot machines 10 where players A, C, D, E are present, are respectively $30,07, $13.36, $20.05, and $8.02.

As illustrated in FIG. 34, when the bet update process of step S73 is run, the center-side progress process is subsequently run, which center-side progress process indicates timing at which a game shifts from the slot game to the crap game (S74). In other words, as illustrated in FIG. 39, a maximum cumulative bet amount Bnmax is defined from among the cumulative bet amount Bn placed at each slot machine 10 (S741). A difference between the maximum cumulative bet amount Bnmax and an event occurrence amount is calculated (S742). A die position corresponding to the difference is calculated (S743). The die images 704 are displayed at a die position on the common display device 700 (S744). Thus, the die images 704 are displayed as if they are traveling in the travel area 702 from the start area 701 towards the goal area 703. The player is able to anticipate when the crap game as the common game will start, when he/she visually confirms positions of the die images 704 displayed in the travel area 702.

Further, the cumulation level of the cumulative bet amount Bn is calculated (S745). The cumulation level is transmitted to each slot machine 10 (S746). Thus, the cumulation level is displayed in the cumulation level display unit 421 of each slot machine 10, to allow each player to be conscious of the fact that he/she is close to meeting a condition which allows him/her to participate in the common game.

As illustrated in FIG. 34, the bet update process of step S74 is run as described above, and it is subsequently determined with the cumulative bet amount Bn whether the common game runnable condition has been met. That is, the cumulative bet amount Bn is compared with the event occurrence amount to determine whether the common game runnable condition has been met (S75). When the common game runnable condition has not been met (S75, NO), the routine ends, and the process is repeated from S71. Note that whether the common game runnable condition has been met may be determined by comparing a predetermined value with the total cumulative game repetition count or a total cumulative bet amount.

When the common game runnable condition has been met (S75, YES), the screen is switched from the progress screen to the common game screen (S76). Then, common game runnable information is transmitted to each slot machine 10, the common game runnable information indicating satisfaction of the common game runnable condition (S77).

Next, a game status of a unit game of the regular game or bonus game at each slot machine 10 is retrieved, with reference to the gaming terminal management table of FIG. 17. It is then determined whether all gaming statuses are "stop," that is, whether the common game start condition has been met (S78). When the common game start condition has not been met (S78, NO), the routine ends and the process is repeated from S71.

Figure 37:
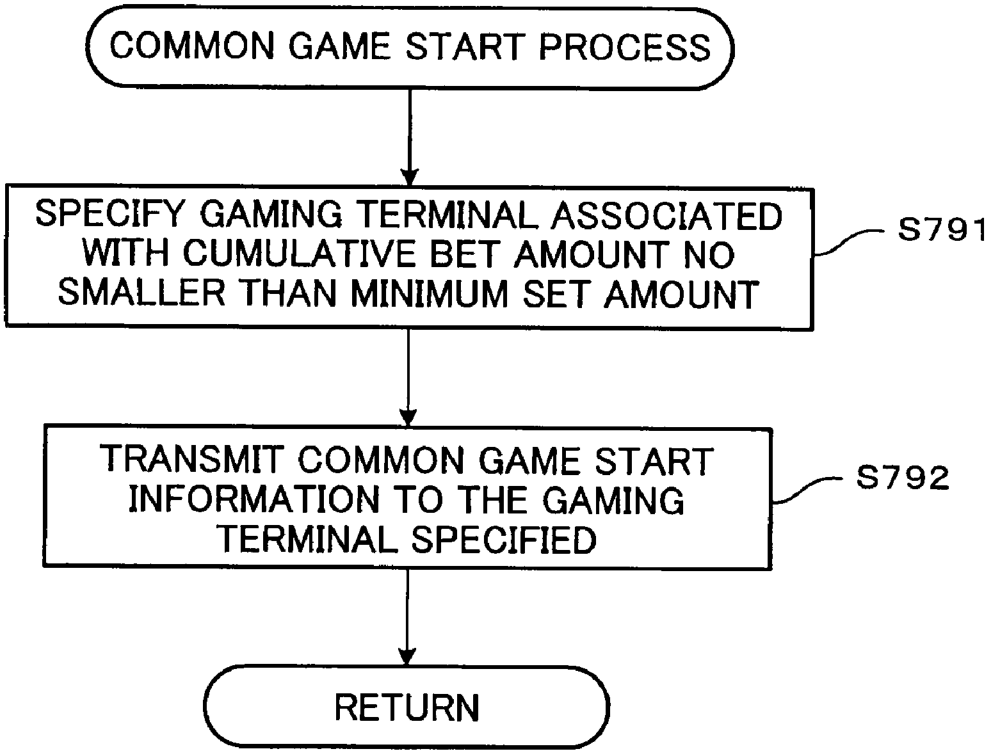
FIG. 37 is a flow chart illustrating a common game start process.

When the common game start condition has been met (S78, YES), a common game start process is run (S79). In other words, one or more slot machines 10 is specified, whose cumulative bet amount equals or surpasses the minimum set amount, as illustrated in FIG. 37 (S791). Common game start information is transmitted to the one or more specified slot machines 10, the common game start information indicating satisfaction of the common game start condition (S792). Afterwards, a center-side bet process is run based on bet information from each slot machine 10, and data of the common game management table of FIG. 18 is updated (S80), as illustrated in FIG. 34.

Figure 38:
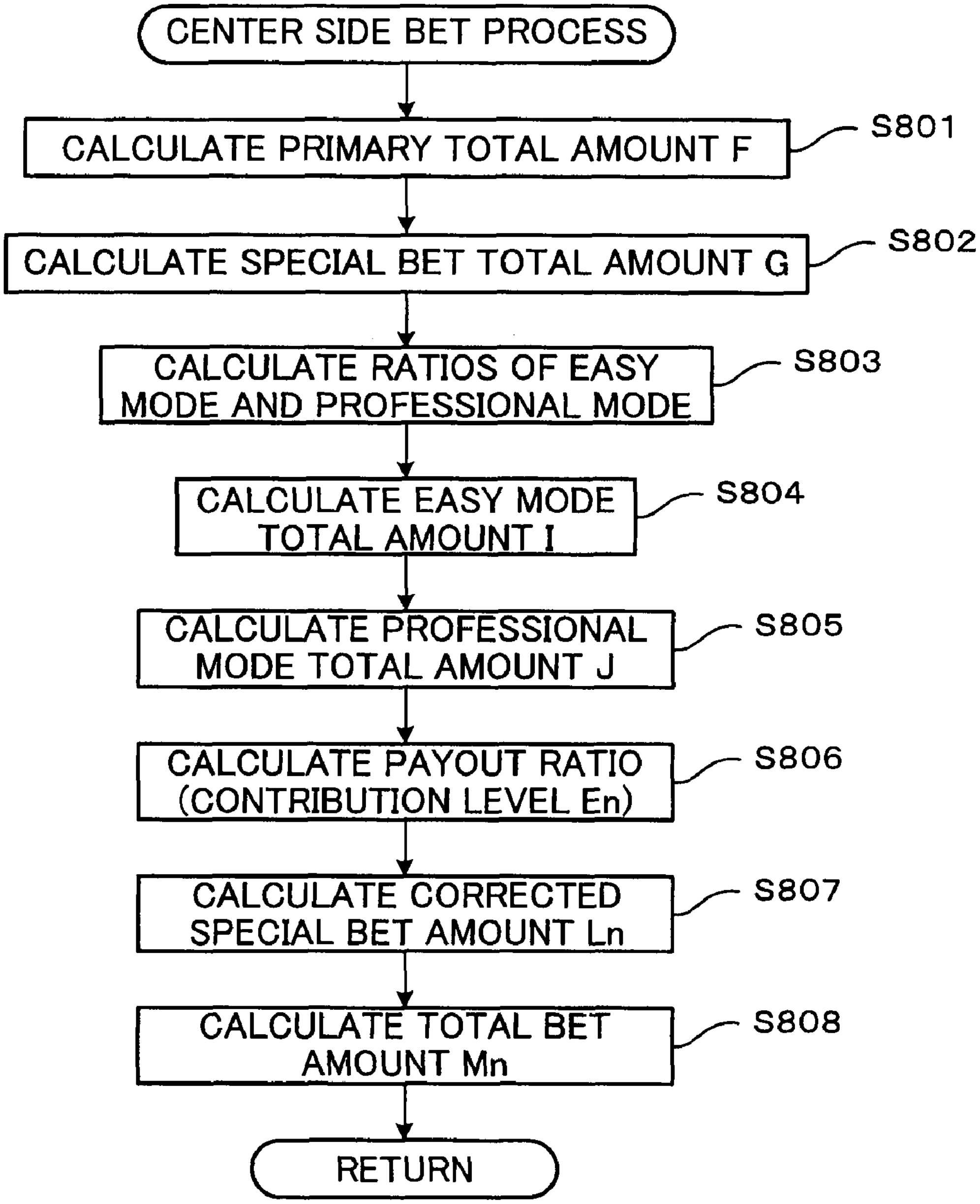
FIG. 38 is a flow chart illustrating a center-side bet process.

In other words, a primary total amount F is calculated by the equation F=ΣDn (S801) as illustrated in FIGS. 38 and 18, and the special bet total amount is calculated by the equation G=ΣCn (S802). Afterwards, the proportion of the easy mode to the professional mode is calculated (S803), and an easy mode total amount I is calculated (S804). Then, calculation of the professional mode total amount J (S805), calculation of the payout ratio Kn (contribution level En) (S806), calculation of the corrected special bet total amount Ln (S807) are performed, before the total bet amount Mn is calculated (S808).

As illustrated in FIG. 34, when the common game bet amount (base bet amount and special bet amount) placed on the common game which is a crap game is updated by the center-side bet process above, a shooter is randomly designated, and shooter information is transmitted to the slot machine 10 designated to be the shooter (S81). Next, a common game win/loss process is run at a timing that roll start information from the specific slot machine 10 has been received (S82).

Specifically, first, the roll start information indicating that a roll operation has been performed is transmitted to all the slot machines 10. Then, a win/loss mode is randomly selected from three types of win/loss mode for the crap game as the common game. The three types of win/loss mode consist of win, loss, or tie. Note that the random selection of a win/loss mode may be different in accordance with the probability of each type being selected. For example, the win/loss mode indicating "tie" may be selected with higher probability than the other types of win/loss mode. When the win/loss mode is selected, win/loss information indicating the selected win/loss mode is transmitted to all the slot machines 10.

Thereafter, it is determined whether the win/loss mode selected in the common game win/loss process is "tie" (S83). When the win/loss mode selected is "tie" (S83, YES), the win/loss process of above step S82 is run with the same shooter. Note that when the win/loss mode selected is "tie," the next shooter may be designated. In this case, the shooter may be (i) randomly selected from all the slot machines 10, (ii) sequentially selected from the slot machines 10 in the descending order of the total value of the bet amount or the game repetition count at the slot game, or (iii) sequentially selected in the order of the arrangement of the slot machines 10, or in the order of machine number.

Meanwhile, when the win/loss mode is not "tie" (S83, NO), it is subsequently determined whether the player wins or not (S84). When the player wins (S84, YES), a payout amount at each slot machine 10 is calculated, and payout information indicating the payout amount is transmitted to each slot machine 10 (S85) before S86 is run. Meanwhile, when the player loses (S85, NO), S86 is immediately run. In other words, the crap game screen is switched to the progress screen at the initial state (S86).

Afterwards, base bet amounts Dn are respectively subtracted from the maximum base bet amount Dmax in the same game mode to calculate next-game carry-over amounts Nn (S87), and the common game management table in FIG. 18 is updated. In other words, the cumulative bet amount Bn and the individual special bet amount Cn are reset to "0," and various bet amounts are updated based on these bet amounts. Afterwards, each next-game carry-over amount Nn is set to be an initial amount of each base bet amount Dn (S88).

Further, an event occurrence amount is randomly determined, which event occurrence amount is a condition of starting the next common game (S89). Specifically, the event occurrence amount is determined using the event occurrence amount determination table illustrated in FIG. 19, based on the random value extracted within the range of 1 to 65535. Accordingly, the common game is started next time any one of the cumulative values (cumulative bet amounts) each associated with a slot machine 10 has reached the event occurrence amount determined in S89. Note that the event occurrence amount may be a predetermined value. This routine ends after S89.

Note that in the present embodiment, the minimum set value required for the slot machine 10 to participate in the common game is set in advance. However, the present invention is not limited thereto: the minimum set value may be determined at a predetermined ratio to the event occurrence amount determined in S89. In this case, the event occurrence amount is determined in S89, and the minimum set amount is determined by multiplying the event occurrence amount by a predetermined percentage (e.g., 70%).

(Game Procedure)

Figure 41:
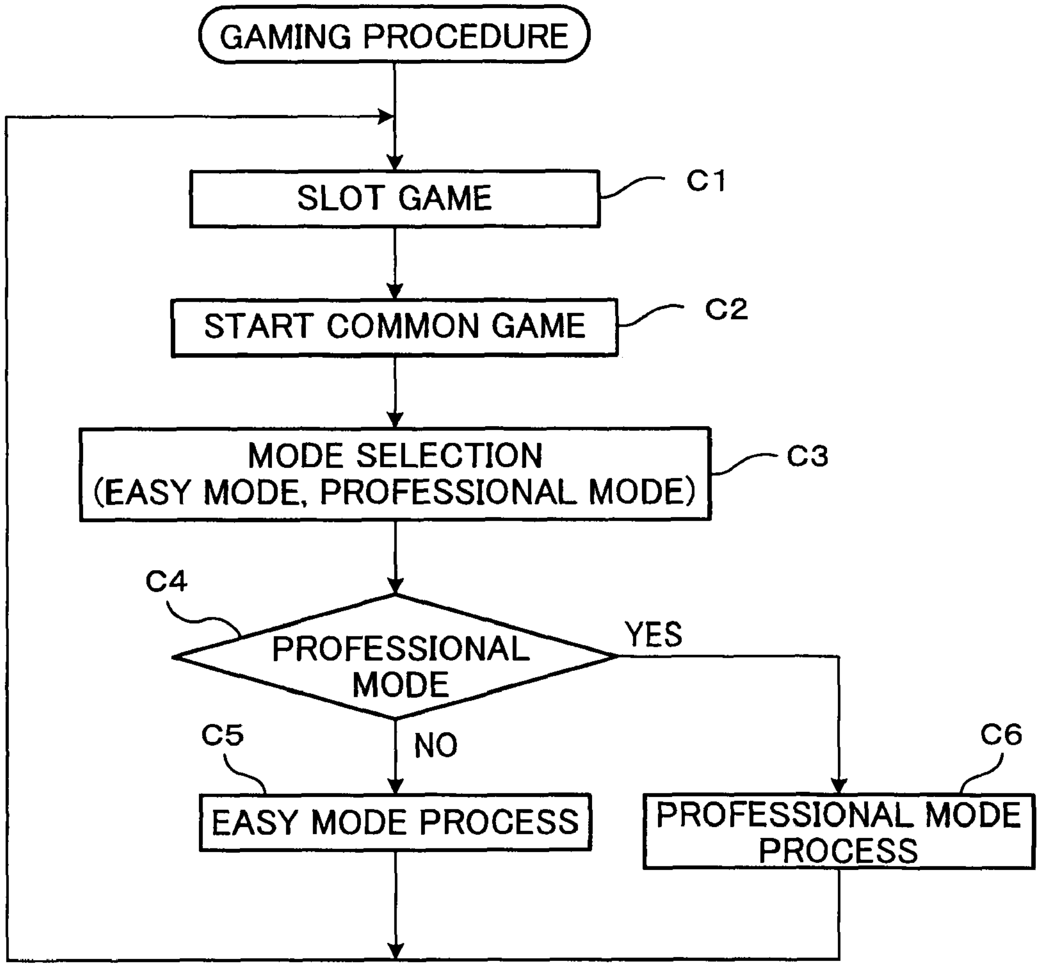
FIG. 41 is a flow chart illustrating a game procedure of a crap game.

The following describes a game procedure realized by each of the above flow charts in detail. A slot game serving as the base game is run, as illustrated in FIG. 41. Thereby, the base bet amount and the special bet amount are collected as a common game bet amount, from the bet amount placed on the slot game (C1). Such slot games are repeated and a crap game is begun when the common game start condition is met (C2). In other words, the screen on the symbol display device 16 is switched from the slot game screen to a crap game start screen, and an explanatory screen is displayed for a certain period of time thereafter, the explanatory screen illustrating game contents.

Afterwards, the screen is switched to the mode selection screen, and it is determined whether the game mode is the professional mode (C4). When an easy mode button is pushed on the mode selection screen, an easy-mode process is run (C5). Meanwhile, when a professional mode button is pushed on the mode selection screen, the professional-mode process is run (C6).

(Game Procedure: Easy-Mode Process)

Figure 42:
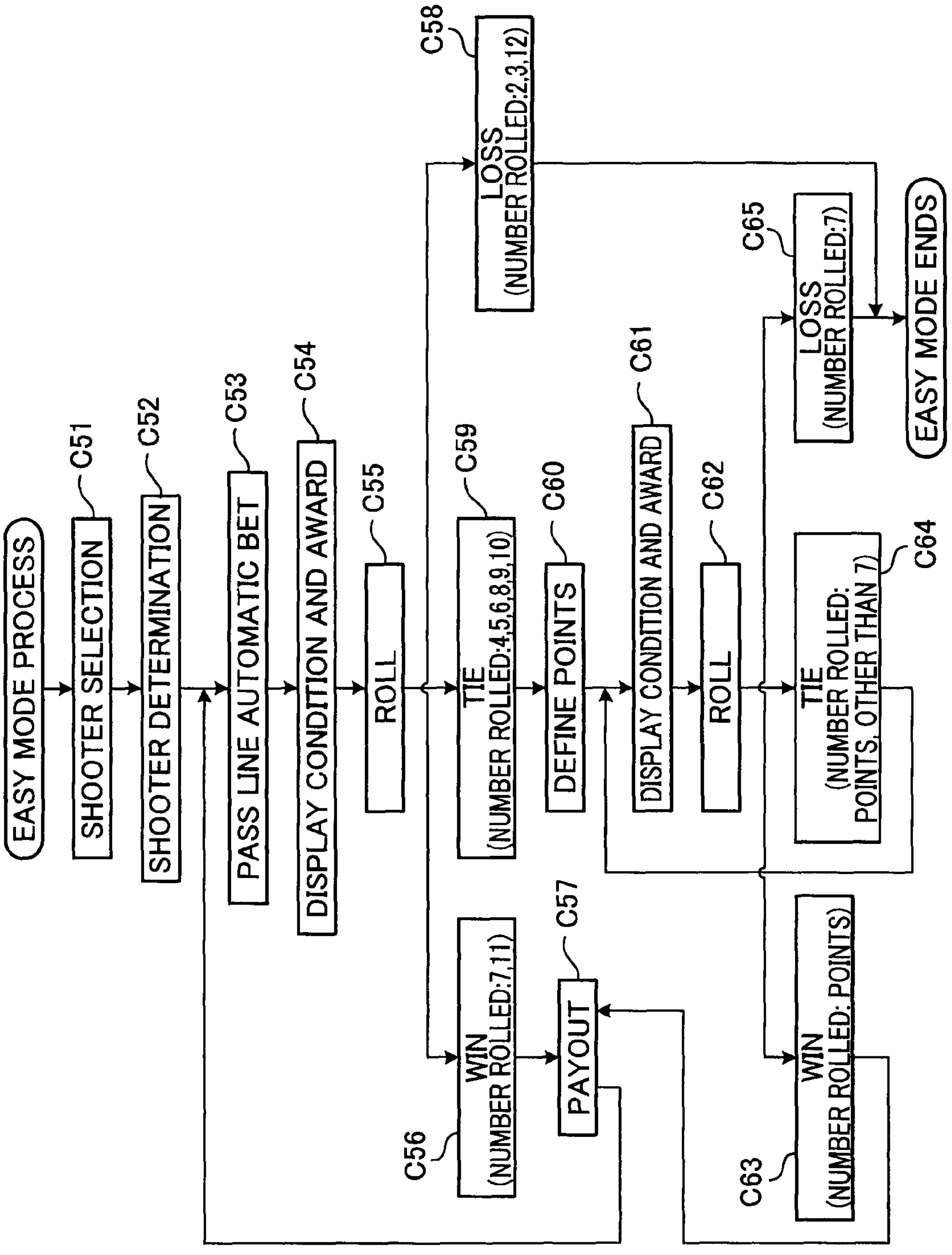
FIG. 42 is a flow chart illustrating an easy-mode process.
Figure 43:
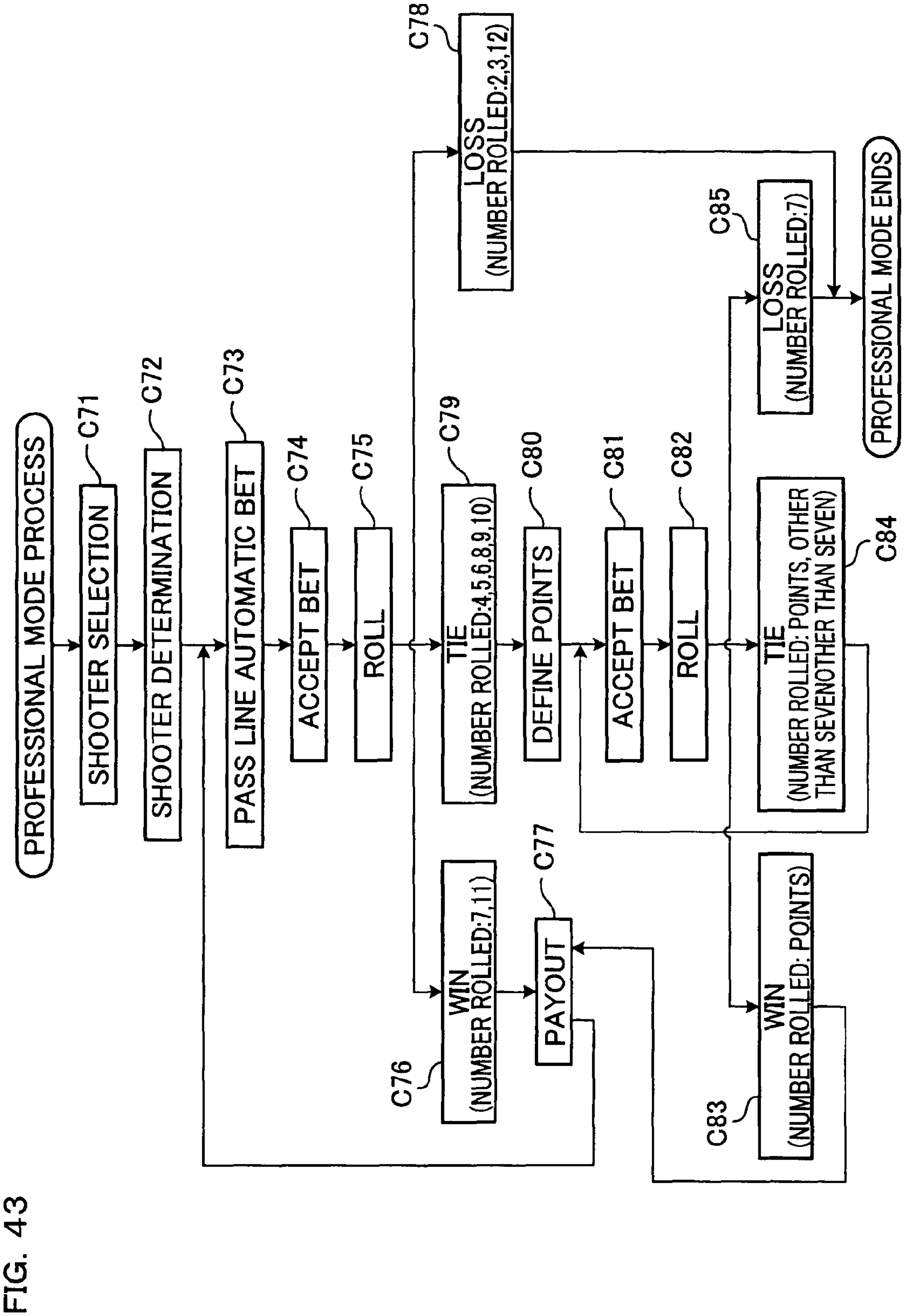
FIG. 43 is a flow chart illustrating a professional-mode process.

When the easy-mode process is selected, a screen illustrating frontal views of aligned slot machines 10 is displayed as illustrated in FIG. 42, and a shooter is selected (C51). A shooter is determined thereafter, and the image of the slot machine 10 designated to be the shooter is highlight-displayed (C52). An easy-mode screen an easy-mode screen where win/loss in the crap game is simplified and displayed, and an automatic bet is placed. Note that an amount of the automatic bet is the base bet amount and the special bet amount collected from a bet placed on the crap game (C53). Then, a condition and an award caused by the automatic bet is displayed. Specifically, conditions for a win, a tie, and a loss are displayed with numeral values and combinations of die images. Further, an award to be gained when the crap game results in a win is displayed (C54).

Next, a roll operation is performed at the slot machine 10 designated to be the shooter. Specifically, a roll screen is displayed at the slot machine 10 designated to be the shooter. The roll screen displays a time remaining where the player is allowed to perform a manual roll operation, to encourage the player to perform a roll operation. Then, when the roll button 902 is pushed during the countdown of the time remaining, a movie illustrating rolling die images 905 is displayed at a timing when the roll button is pushed. Meanwhile, when the roll button 902 is not pushed during the countdown, a movie is automatically displayed to illustrate the die images 905 rolling and moving, at a timing that the countdown reaches zero (C55).

The crap game results in a win when the sum of the numbers rolled by a roll operation is "7" or "11" (C56). Then, an award corresponding to the bet amount is paid out. For instance, when a still image where a combination of numbers shown by the die images 905 is "7" is displayed, an amount such as $150.20 is displayed as a possible award (C57). Afterwards, an automatic bet is placed on the pass line in C53, and the next crap game is run.

Further, when the sum of the numbers rolled by a roll operation is any one of "2," "3," and "12," the crap game results in a loss. For instance, a still image where a combination of numbers shown by the die images 905 is "2" is displayed, then a text image suggesting loss is displayed. Then, an easy mode ends (C58).

Further, when the sum of the numbers rolled by a roll operation is any one of "4," "5," "6," "8," "9," and "10," the cram game ends in a tie (C59). The point is then defined (C60). For example, a still image where a combination of numbers shown by the die images 905 is "5" is displayed before a text image suggesting tie is displayed, and a number "5" indicating the points is displayed as a popup.

A possible award and conditions which allow the next game to end in a win, a tie, and a loss in the next crap game are displayed thereafter. Specifically, conditions for a win, a tie, and a loss are displayed with numeral values and combinations of die images. Further, an award to be gained when the crap game results in a win is displayed (C61).

The roll screen is displayed, and when the roll button 902 is pressed during the countdown, a manual roll operation is performed, and when the countdown reaches "0," an automatic roll operation is performed (C62). When the sum of the numbers rolled by a roll operation is "5," the rolled number equals the point "5." Thus, the crap game results in a win (C63). Then, a payout of the award indicated, which is $150.20, is awarded (C57). Afterwards, the next crap game begins, and an automatic bet on the pass line is placed in C53.

Further, when the sum of the numbers rolled is "7," the crap game results in a loss (C65). An image suggesting loss and the like are illustrated for a certain period of time before the easy mode ends. Further, when the point is other than "7," such as when the sum of the numbers rolled is "9," the crap game results in a tie (C64). In this case, the process is repeated from S61, and a possible award conditions for a win, a tie, and a loss are displayed.

(Game Procedure: Professional-Mode Process)

When the professional-mode process is selected, a screen illustrating frontal views of aligned slot machines 10 is displayed, and a shooter is selected (C71). A shooter is determined thereafter, and the image of the slot machine 10 designated to be the shooter is highlight-displayed (C72).

Next, the professional bet screen simulating a crap table is displayed, and an automatic bet is placed on the pass line. Note that an amount of the automatic bet is the base bet amount and the special bet amount collected from a bet placed on the crap game (C73). Further, a manual bet is permitted. Countdown of the accepting period starts simultaneously with the timing that a manual bet is permitted. When the countdown reaches "0, a manual bet is no longer permitted, and an image informing the player that a manual bet is no longer permitted is displayed as a popup (C74).

Next, the roll screen is displayed at the slot machine 10 designated to be the shooter. Then, a manual roll operation or an automatic roll operation is performed (C75). The crap game results in a win when the sum of the numbers rolled by a roll operation is "7" or "11" (C76). Then, an amount $150.20 according to the bet amount is paid out (C77). The next crap game is run thereafter.

Further, when the sum of the numbers rolled by a roll operation is "2," "3," or "12", the crap game results in a loss (C78). In this case, a game result such as an amount gained in the crap game is displayed, along with an image which informs the end of the crap game. The professional mode crap game thus ends.

Further, the sum of the numbers rolled by a roll operation is any one of "4," "5," "6," "8," "9," or "10," the crap game ends in a tie (C79). In this case, when the sum of the numbers rolled is "5," the point is defined as "5," and a display area corresponding to the point on the bet screen is highlighted (C80). A manual bet is accepted for a certain period of time thereafter (C81). Then, a roll operation is performed manually or automatically (C82). The crap game ends in a win when the sum of the numbers rolled by a roll operation equals the point, i.e., "5" (C83). In this case, a payout is awarded with the game result of the crap game being displayed (C77). The next crap game is run thereafter.

Further, the crap game results in a loss when the sum of the numbers rolled by a roll operation is "7" (C85). In this case, the easy mode is ended. Further, the crap game ends in a tie when the sum of the numbers rolled by a roll operation is other than "5" (C84), and the next crap game is run.

The present embodiment deals with a case where the number of paylines L is 25; however, the number of paylines is not limited to this. For example, the number of paylines may be 30.

The present embodiment deals with a case where a winning of bonus is achieved when three or more trigger symbols are rearranged. However, the winning of bonus is not limited to this. For example, a winning of bonus may be achieved when a predetermined time has elapsed since the last bonus game has ended.

Further, in the present embodiment, the free game is a game in which displaying of symbols in display blocks 28 are moved and stopped, and then a payout amount is determined according to the symbols having stopped or a combination of the stopped symbols (i.e. a game normally run at a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game that awards no game medium. Further, the following is also possible. Namely, a free game is run on condition that the number of regular games counted during the insured mode reaches a predetermined number. Then, when the number of regular games counted during the insured mode once again reaches the predetermined number, a free game which is different from the previous free game is run. The free game in the present invention may be suitably designed, and is not particularly limited, as long as the free game requires no bet of a game medium.

The above embodiment thus described solely serves as a specific example of the present invention, and the present invention is not limited to such an example. Specific structures of various means and the like may be suitably designed or modified. Further, the effects of the present invention described in the above embodiment are no more than examples of most preferable effects achievable by the present invention. The effects of the present invention are not limited to those described in the Embodiment of the present invention described above.

Further, the detailed description above is mainly focused on characteristics of the present invention to fore the sake of easier understanding. The present invention is not limited to the above embodiment, and is applicable to diversity of other embodiment. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The present invention is applicable to a gaming machine in general which run a common game such as carp game at a plurality of gaming terminals.

What is claimed is:

1. A gaming machine comprising:

a plurality of gaming terminals each having an input device through which an external input can be inputted, and a terminal controller programmed to carry out steps (a1) to (a4) below; and a center controller which has a memory and which is connected in communication with the gaming terminals, and is programmed to carry out steps (b1) to (b3) below;

wherein each terminal controller carries out the steps of:

(a1) receiving a bet based on an input through the input device;

(a2) when the bet is received, running a unit game of a base game;

(a3) outputting, to the center controller for each unit game, a piece of bet amount information based on a bet amount corresponding to the bet; and (a4) running a common game in response to a game start command from the center controller;

wherein the center controller carries out the steps of:

(b1) receiving the piece of bet amount information, and cumulatively storing in the memory the piece of bet amount information as a cumulative value in association with the gaming terminal;

(b2) determining whether a common game start condition is met, which common game start condition is a condition for starting the common game, based on a first threshold value and a plurality of cumulative values associated with the plurality of gaming terminals; and (b3) when the common game start condition is met, outputting a common game start command to a gaming terminal which is associated with a cumulative value equal to or greater than a second threshold value, which is equal to or lower than the first threshold value;

wherein the plurality of cumulative values associated with the plurality of gaming terminals serve as a resource for payout of the common game;

wherein a difference between a maximum cumulative value of the plurality of cumulative values and the first threshold value is displayed on a common display;

wherein a difference between each of the plurality of cumulative values and the second threshold value is displayed on a display of each the plurality of gaming terminals; and wherein a predetermined image is movable along a travel area between a start position and an end position on the common display, the end position corresponding to the first threshold value and the predetermined image corresponding to a maximum value of the plurality of cumulative values, and a position of the predetermined image along the travel area corresponding to a difference between the first threshold value and the maximum cumulative value of the plurality of cumulative values.

2. The gaming machine according to claim 1, wherein the center controller, in step (b2), makes it the common game start condition when any one of the cumulative values associated with the plurality of gaming terminals have reached the first threshold value.

3. The gaming machine according to claim 2, wherein the center controller further carries out the step of: (b4) randomly determining the first threshold value within a predetermined range which is equal to or greater than the second threshold value.

4. The gaming machine according to claim 1, wherein the center controller, in step (b1), cumulatively stores in the memory a value indicating the bet amount as the cumulative value.

5. The gaming machine of claim 1, wherein when the maximum cumulative value of the plurality of cumulative values is changed to an other of the plurality of cumulative values, a difference between the other cumulative value and the first threshold value is displayed on the common display.

6. A playing method of a gaming machine having:

a plurality of gaming terminals each having an input device through which an external input can be inputted; and a center controller which has a memory and is connected in communication with the gaming terminals, the playing method comprising the steps of:

each terminal controller carrying out:

a first step of receiving a bet based on an input through the input device;

a second step of, when the bet is received, running a unit game of a base game;

a third step of outputting, to the center controller for each unit game, a piece of bet amount information based on a bet amount corresponding to the bet; and a fourth step of running a common game in response to a game start command from the center controller; and the center controller carrying out:

a fifth step of receiving the piece of bet amount information, and cumulatively storing in the memory the piece of bet amount information as a cumulative value in association with the gaming terminal;

a sixth step of determining whether a common game start condition is met, which common game start condition is a condition for starting the common game based on a first threshold value and a plurality of cumulative values associated with the plurality of gaming terminals; and a seventh step of, when the common game start condition is met, outputting a common game start command to a gaming terminal which is associated with a cumulative value equal to or greater than a second threshold value, which is equal to or lower than the first threshold value;

wherein the plurality of cumulative values associated with the plurality of gaming terminals serve as a resource for payout of the common game;

wherein a difference between a maximum cumulative value of the plurality of cumulative values and the first threshold value is displayed on a common display;

wherein a difference between each of the plurality of cumulative values and the second threshold value is displayed on a display of each the plurality of gaming terminals; and wherein a predetermined image is movable along a travel area between a start position and an end position on the common display, the end position corresponding to the first threshold value and the predetermined image corresponding to a maximum value of the plurality of cumulative values, and a position of the predetermined image along the travel area corresponding to a difference between the first threshold value and the maximum cumulative value of the plurality of cumulative values.

7. The method of claim 6, wherein when the maximum cumulative value of the plurality of cumulative values is changed to an other of the plurality of cumulative values, a difference between the other cumulative value and the first threshold value is displayed on the common display.

* * * * *